United States Patent
Oezer

(10) Patent No.: US 11,797,856 B1
(45) Date of Patent: Oct. 24, 2023

(54) SYSTEMS AND METHODS FOR RESOURCE EFFICIENT MODEL LEARNING AND MODEL INFERENCE

(71) Applicant: System AI, Inc., Los Altos, CA (US)

(72) Inventor: Tuna Oezer, Las Vegas, NV (US)

(73) Assignee: System AI, Inc., Los Altos, CA (US)

( * ) Notice: Subject to any disclaimer, the term of this patent is extended or adjusted under 35 U.S.C. 154(b) by 412 days.

(21) Appl. No.: 16/898,445

(22) Filed: Jun. 11, 2020

Related U.S. Application Data

(60) Provisional application No. 62/861,303, filed on Jun. 13, 2019.

(51) Int. Cl.
*G06F 8/41* (2018.01)
*G06N 3/084* (2023.01)
*G06N 3/048* (2023.01)

(52) U.S. Cl.
CPC .......... *G06N 3/084* (2013.01); *G06N 3/048* (2023.01)

(58) Field of Classification Search
CPC ............................. G06N 3/084; G06N 3/0481
See application file for complete search history.

(56) References Cited

U.S. PATENT DOCUMENTS

2010/0088490 A1\* 4/2010 Chakradhar .......... G06N 3/063
712/34

\* cited by examiner

*Primary Examiner* — Jamal Javaid
(74) *Attorney, Agent, or Firm* — NORTH WEBER & BAUGH LLP

(57) ABSTRACT

Presented herein are framework embodiments that allow the representation of complex systems and processes that are suitable for resource efficient machine learning and inference. Furthermore, disclosed are new reinforcement learning techniques that are capable of learning to plan and optimize dynamic and nuanced systems and processes. Different embodiments comprising combinations of one or more neural networks, reinforcement learning, and linear programming are discussed to learn representations and models—even for complex systems and methods. Furthermore, the introduction of neural field embodiments and methods to compute a Deep Argmax, as well to invert neural networks and neural fields with linear programming, provide the ability to create models and train models that are accurate and very resource efficient—using less memory, less computations, less time, and, as a result, less energy. As a result, these models can be trained and re-trained quickly and efficiently; thereby not only using fewer resources but also providing models that are continually improving. The resource efficiencies herein also allow such models to be trained and/or deployed more widely.

20 Claims, 39 Drawing Sheets

100

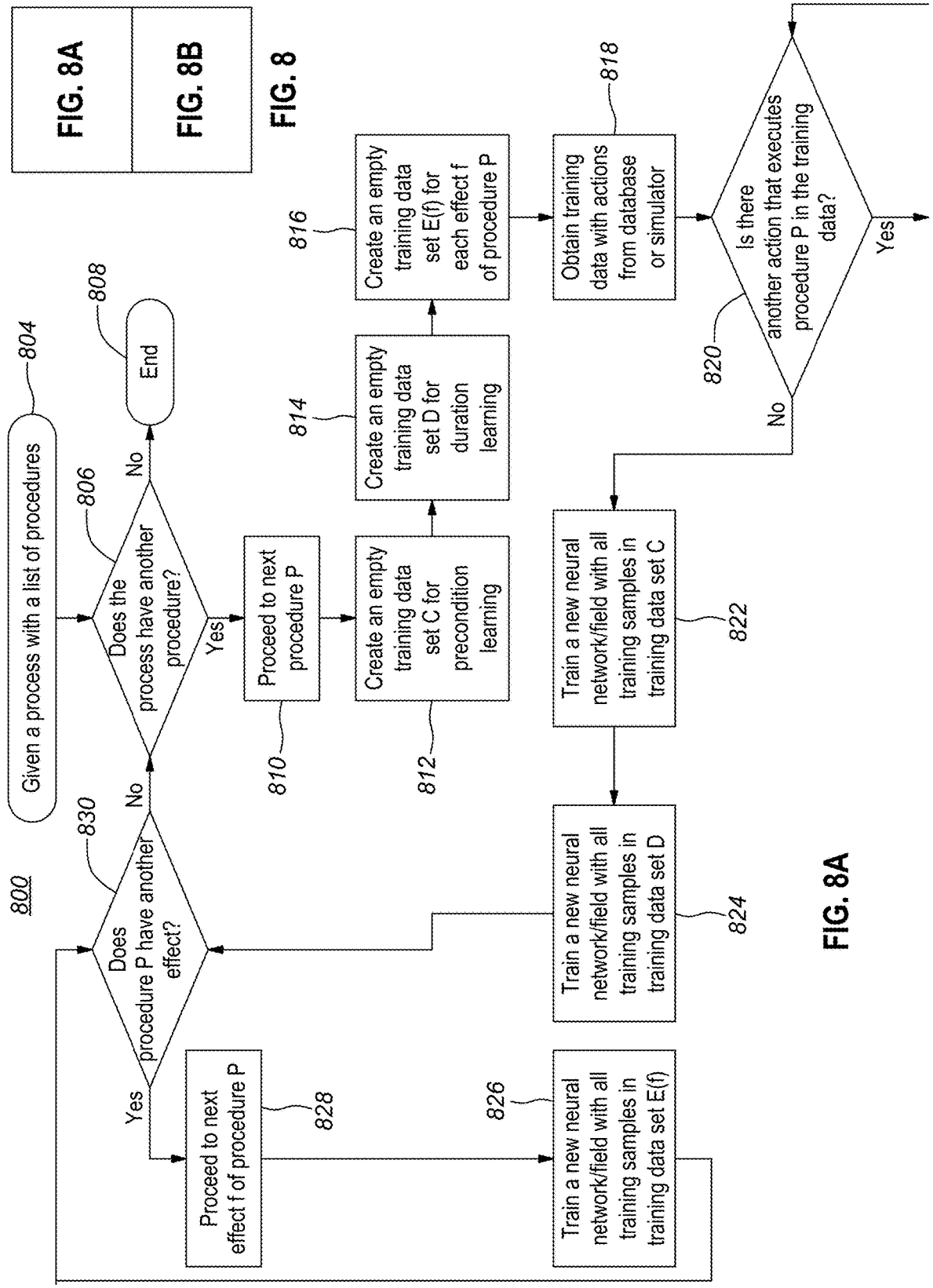

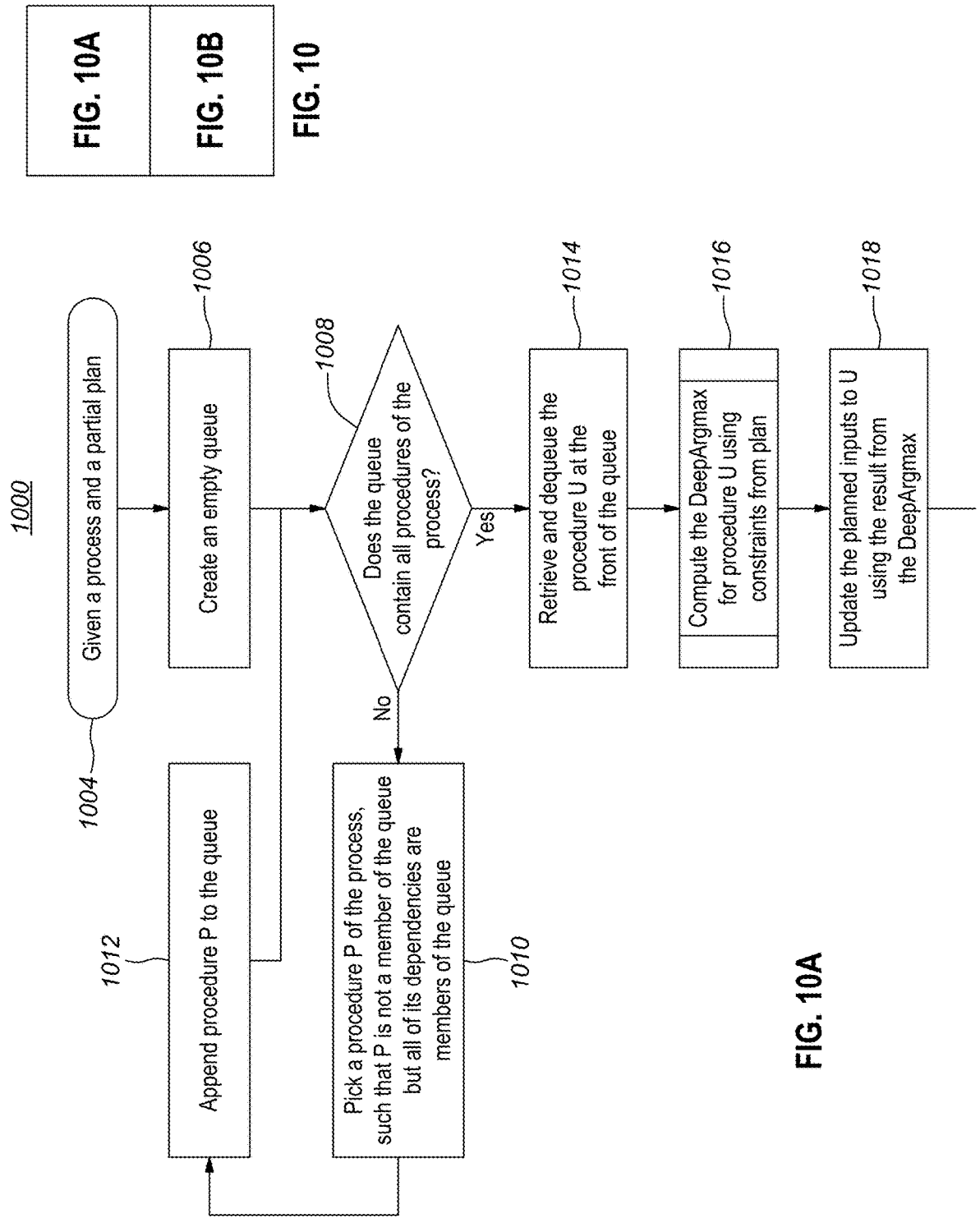

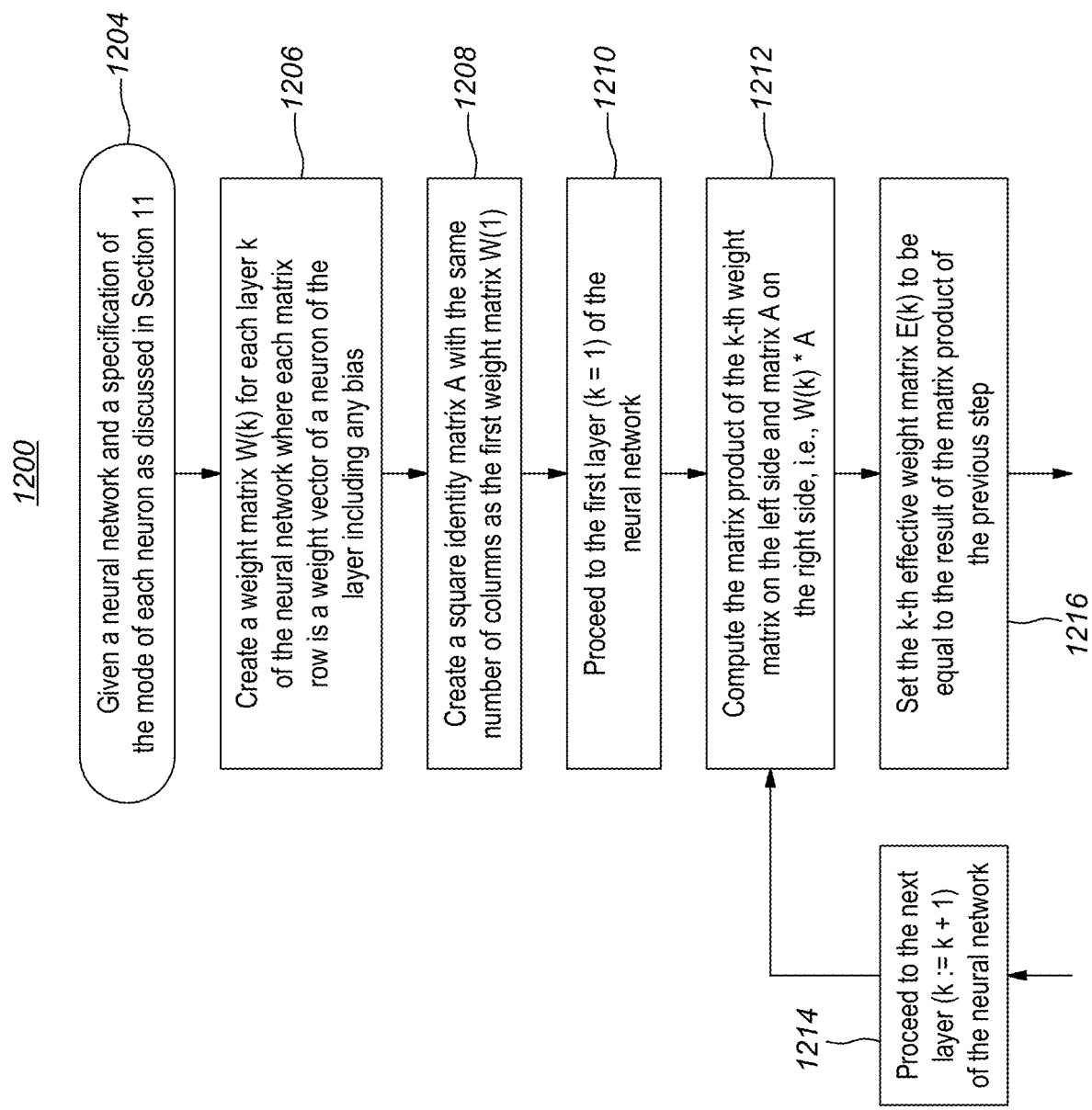

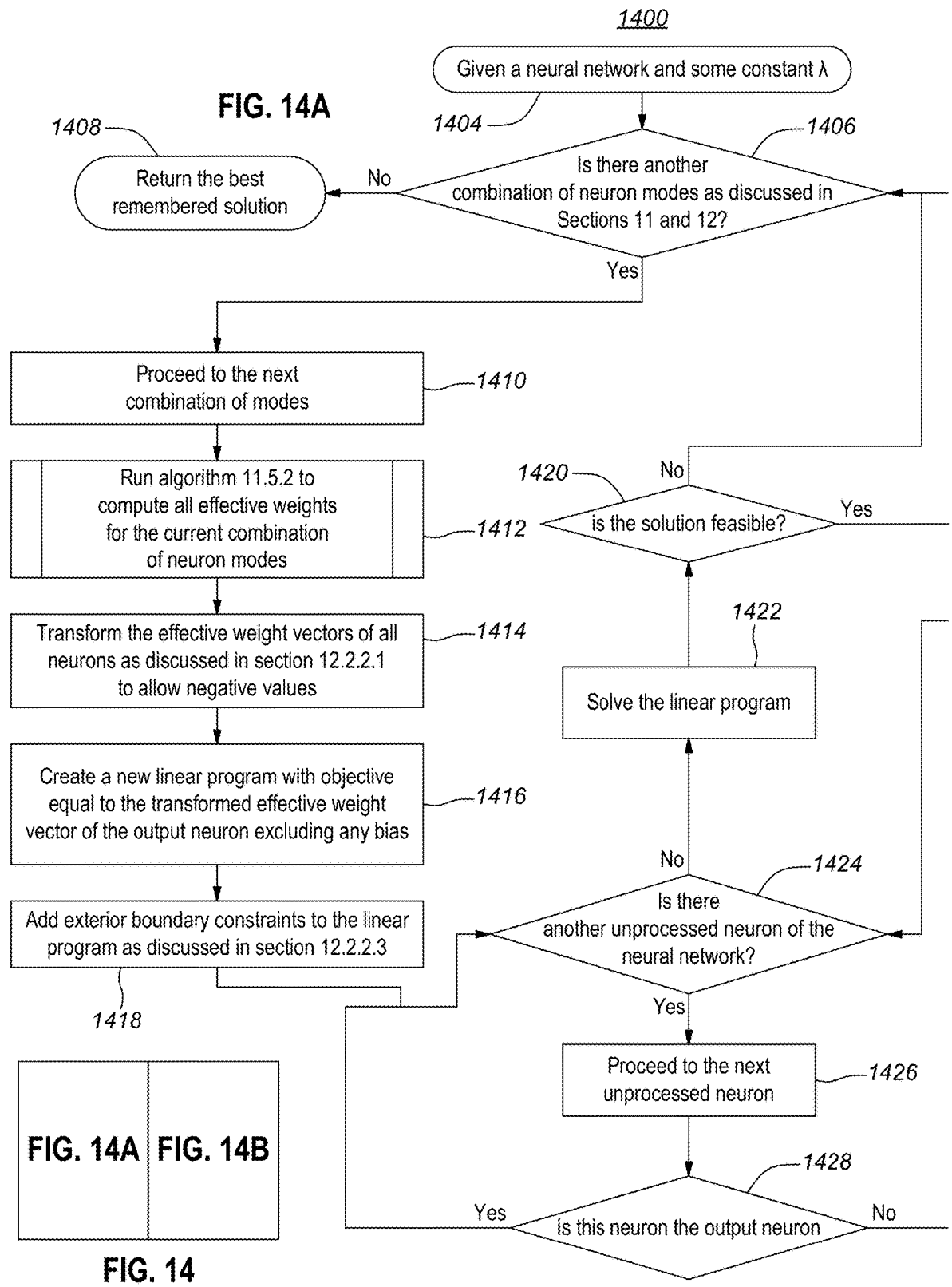

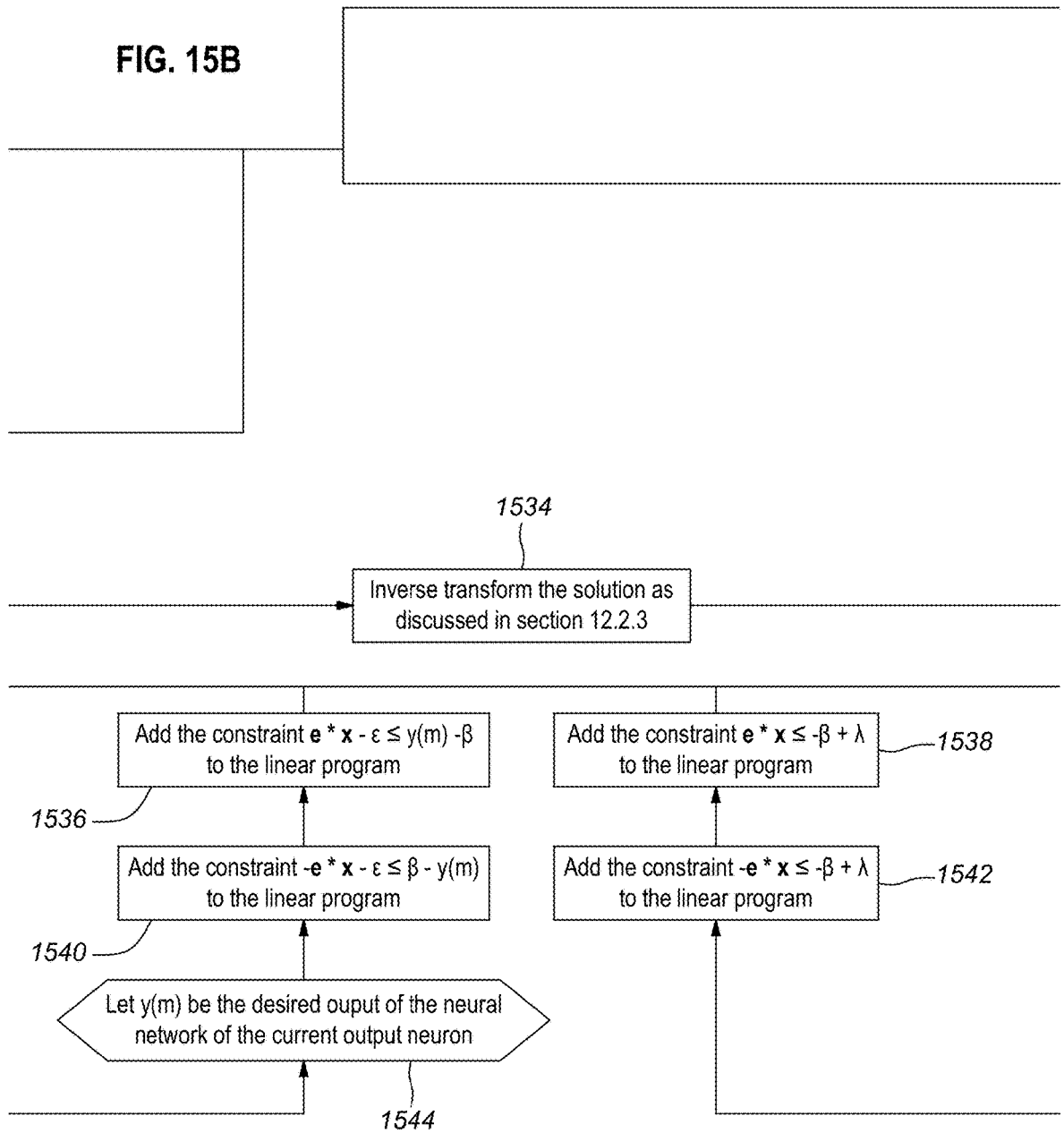

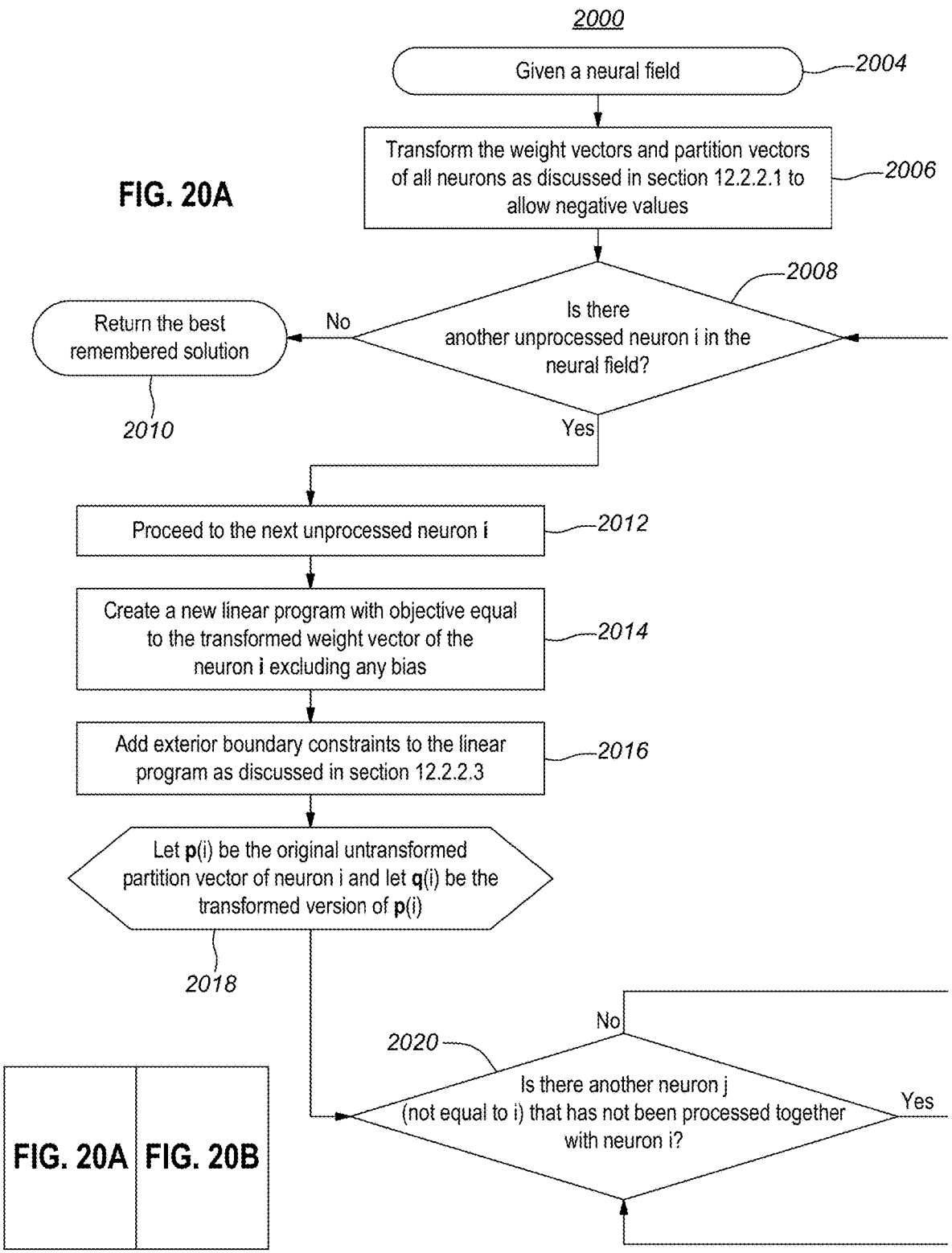

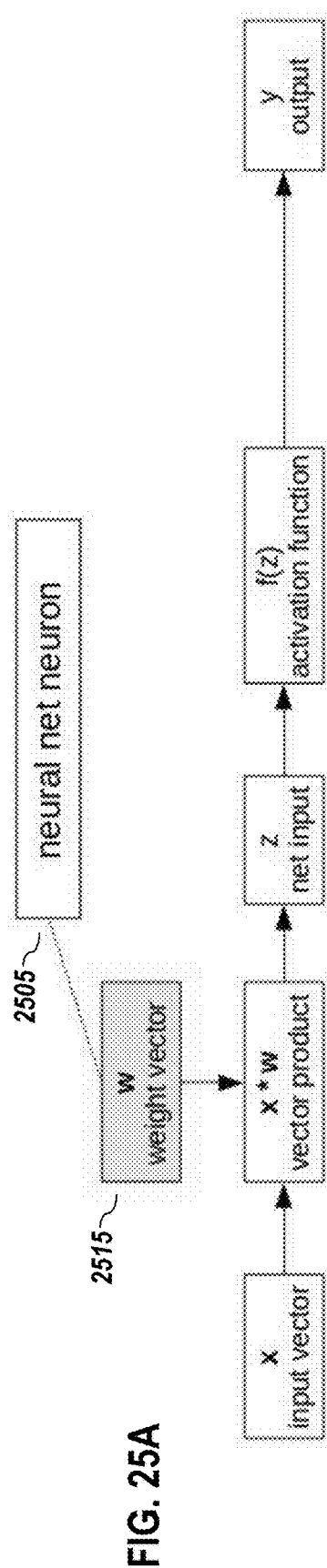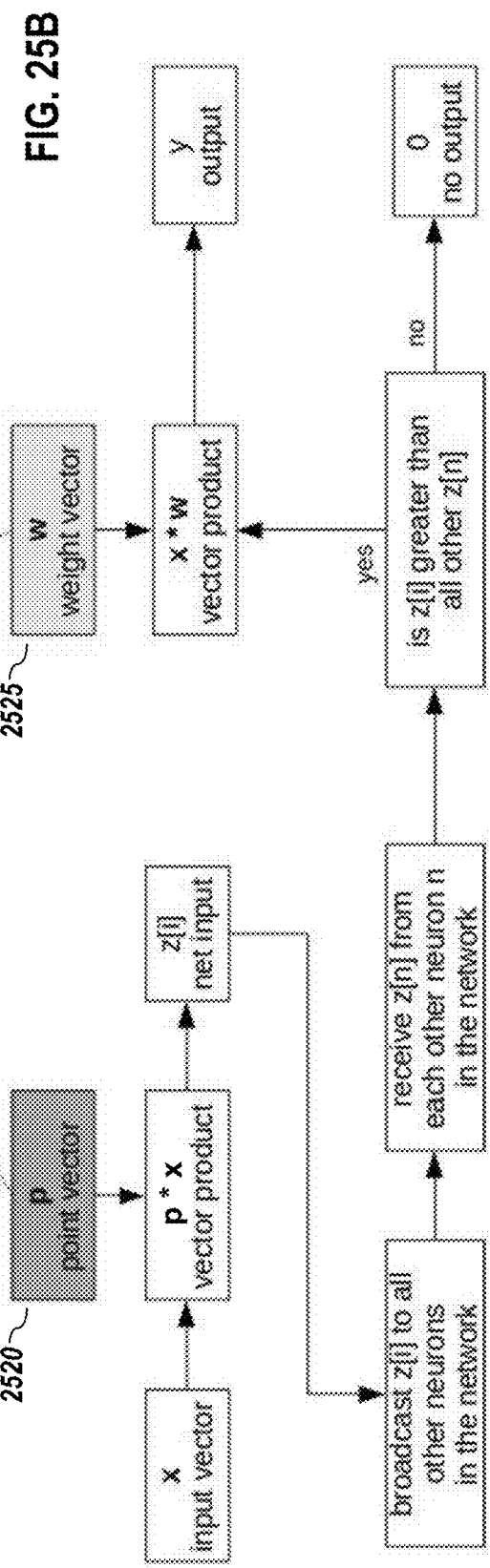
FIG. 25A
FIG. 25B

SYSTEMS AND METHODS FOR RESOURCE EFFICIENT MODEL LEARNING AND MODEL INFERENCE

CROSS-REFERENCE TO RELATED APPLICATION

This application claims the priority benefit under 35 USC § 119(e) to U.S. Prov. Pat. App. Ser. No. 62/861,303, filed on 13 Jun. 2019, entitled "PLANNING, CONTROLLING, OPTIMIZING, OR PREDICTING SYSTEMS OR PROCESSES," and listing Tuna Oezer as inventor. The aforementioned patent document is incorporated by reference herein in its entirety and for all purposes.

COPYRIGHT NOTICE

A portion of the disclosure of this patent document contains material that is subject to copyright protection. The copyright owner has no objection to the facsimile reproduction by anyone of the patent document, as it appears in the Patent and Trademark Office patent file or records, but otherwise reserves all copyright rights whatsoever.

BACKGROUND

Technical Field

The present disclosure relates generally to systems and methods for machine learning that can provide improved computer performance, features, and uses. More particularly, the present disclosure relates to system and methods for improved modeling that is faster and more efficient for representing complex processes and/or system.

Background

Planning or predicting are extremely beneficial tasks. The ability to properly plan or correctly predict can result in more efficient and better use of resources, more resilience of processes or systems, improved timing, and better likelihoods of success in the underlying venture.

While it is undisputed that planning or predicting are beneficial, it is very difficult to plan effectively or to predict accurately. Furthermore, as the underlying systems and/or processes increase in complexity, the complexity of planning or predicting dramatically increases.

The advent of powerful computing devices and the development of machine learning techniques have enabled automating some complex tasks, like language translation, object detection, self-driving vehicles, planning, and predicting. While machine learning and data analyses have helped, most machine learning models that address even moderately complex tasks require vast resources—including, but not limited to, computer processing power, computer memory, time, and power. For example, just to train a model that does language translation may take days of time with several processing cores operating the entire time. Furthermore, once such as model has been trained, it can take substantial resources during the inference process. Thus, there are significant deficiencies in computational techniques that can provide sophisticated functionality but are not so resource intensive.

Accordingly, what is needed are improved systems and methods that provide not only improved computer functionality but also reduce resource requirements and resource consumption.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 depicts a simplified process flow chart, according to embodiments of the present disclosure.

FIG. 8 depicts the relationship between FIG. 8A and FIG. 8B.

FIGS. 8A & 8B depict a flowchart implementation of methodology 8.8, according to embodiments of the present disclosure.

FIG. 10 depicts the relationship between FIG. 10A and FIG. 10B.

FIGS. 10A & 10B depict a flowchart implementation of methodology 10.6, according to embodiments of the present disclosure.

FIG. 12 depicts the relationship between FIG. 12A and FIG. 12B.

FIGS. 12A & 12B depict a flowchart implementation of methodology 11.5.2, according to embodiments of the present disclosure.

FIG. 13 depicts the relationship between FIG. 13A and FIG. 13B.

FIG. 14 depicts the relationship between FIG. 14A and FIG. 14B.

FIGS. 14A & 14B depict a flowchart implementation of methodology 12.3, according to embodiments of the present disclosure.

FIGS. 15A-C depict a flowchart implementation of methodology 12.5, according to embodiments of the present disclosure.

FIG. 20 depicts the relationship between FIG. 20A and FIG. 20B.

FIGS. 20A & 20B depict a flowchart implementation of methodology 14.2, according to embodiments of the present disclosure.

FIG. 25A depicts an example method that a neuron in a neural network model undergoes, according to embodiments of the present disclosure, and FIG. 25B depicts an example method that a neuron in a neural field model undergoes, according to embodiments of the present disclosure.

DETAILED DESCRIPTION OF EMBODIMENTS

Figure 1:
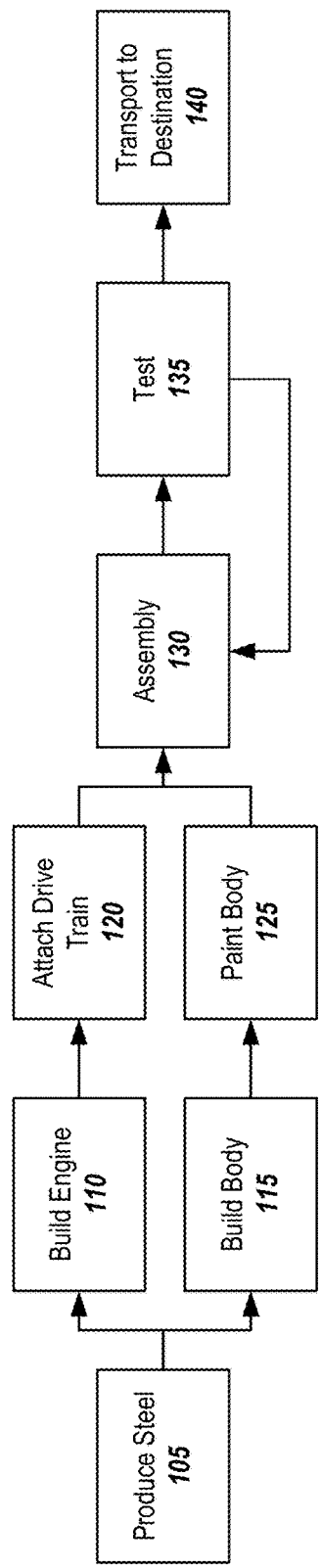

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," "in one or more embodiments," or "in embodiments" means that a particular feature, structure, characteristic, or function described in connection with the embodiment or embodiments is included in at least one embodiment and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. The words "optimal," "optimize," "optimization," and the like refer to an improvement of an outcome or a process and do not require that the specified outcome or process has achieved an "optimal" or peak state. A set or family may comprise one or more elements. One skilled in the art shall recognize references to vector representations shall be construed to cover other representations including scalar and matrix representations.

Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

1. INTRODUCTION—GENERAL SUMMARY

This patent document presents embodiments of systems and methods that provide machine learning techniques that are resource efficient and can be used to address complex processes or system. As will be explained in more detail below, embodiments combine one or more of neural networks, linear programming, and reinforcement learning to plan, control, optimize, and/or predict processes. Experiments done using one or more of the inventive aspects discussed herein show better results—with less resources being used—than the prior approaches that were directly compared with the tested embodiments.

Examples presented herein will be described in context of various processes, but it shall be noted that the systems and methods presented herein are applicable to all types of processes. Processes are typically critical elements and understanding and improving these processes can be very important for improving the performance of any process. Many systems have a lot of data but are unable to fully utilize this data to improve their processes. Embodiments of the machine learning techniques presented in this patent document are able to quickly learn process improvements from data obtained from a variety of sources.

While traditional techniques are rigid and use coarse world models, the use of machine learning allows continuous learning and improvements of processes that automatically capture many detailed nuances of real-world processes. Combined with the fast and flexible planner embodiments presented in this patent document, the example embodiments described herein allow for nearly instant adaptation and reaction to changing conditions. Furthermore, the techniques discussed in this patent document allow adaptive process execution that is responsive to the current situation, rather than a one-size-fits all approach.

This patent document presents embodiments of a framework that allows the representation of complex processes in a way that is suitable for resource efficient machine learning and inference. Furthermore, this patent document discusses new reinforcement learning technique embodiments that are capable of learning, for example, to plan and optimize dynamic and nuanced systems and processes.

One contribution discussed in this patent document is the combination of one or more of neural networks, linear programming, and reinforcement learning. This patent document provides a discussion and analysis of deep neural networks, which may be used to develop a methodology that allows learning with neural networks. Another novel aspect that will be discussed in this patent document is embodiments of ways to invert complex models, which embodiments may be generally referred to for convenience as "Deep Argmax." As illustrated herein, Deep Argmax refers to various computation embodiments that may be used with neural networks and neural fields.

Learning models with standard neural networks can be very inefficient; accordingly, in one or more embodiments, embodiments of new neural-base modeling technique, which may be referred to as "Neural Fields," provide a major improvement over standard neural networks and represents another novel aspect of the present disclosure. In one or more embodiments, Neural Fields dramatically improve the learning and inference efficiency relative to standard neural networks. In one or more embodiments, the Deep Argmax developed for standard neural networks may also be applied to Neural Fields.

Embodiment herein comprise computer-implemented methods for learning and generating plans with model-based-reinforcement learning and linear programming, where the model comprises a set of neural models that jointly represent the dynamics of a world via separate models for state and action transitions. In one or more embodiments, a plan is a directed graph, where each vertex represents the parameters of an action and the edges represent dependencies. In one or more embodiments, a separate neural model is learned for each action effect, and an action model predicts the action effect given a world state and action parameters. In one or more embodiments, plan generation uses linear programming to maximize a reward for a final step of the plan, thereby obtaining a set of constraints for the plan. In one or more embodiments, constraints are "back-propagated" along the directed graph of the plan via linear programming; in one or more embodiments, a newly developed methodology (which may be referred to for convenience as DeepArgmax) is used to compute an inverse, but it shall be noted, as illustrated in more detail below, that the "back-propagation" is not the standard back-propagation methods of current machine learning, which uses error gradients and derivatives instead of linear programming Using the methodologies herein, the plan may be learned in which action parameters are selected to satisfy "back-propagated" constraints.

As illustrated herein, a neural model may be a neural network or may be a neural field. In one or more embodiments, a neural field is a fully connected neural network with neurons that have two distinct vector parameters, where a first parameter is used for input space partitioning and a second parameter is used for approximation. In one or more embodiments, the first vector (partitioning) may be learned via clustering and the second vector (weight vector for approximation) may be learned via a linear least squares method. In one or more embodiments, a reinforcement reward may be represented by one or more world state properties (e.g., property of an object). In one or more embodiments, for plan generation, the neural models may be inverted via piecewise linear programming and piecewise linear programming may apply linear programming to each partition of the neural model. It should be noted that, in one or more embodiments, a neural field partition may be explicitly represented by the first (partition) vector.

2. INTRODUCTION—GENERAL OVERVIEW

One skilled in the art shall recognize that embodiments herein can be applied in a variety of applications and in numerous ways. By way of illustration and not limitation, FIG. 1 depicts a simplified process flow chart for a car manufacturing process, according to embodiments of the present disclosure. A process may be represented via a directed graph 100 that may have cycles. In one or more embodiments, the vertices (e.g., 105-140) of the graph 100 represent procedures, while the directed edges represent the flow of execution.

In one or more embodiments, a procedure may be a step in the process. In one or more embodiments, a procedure may be a simple step or may represent a sub-process. The edges of the graph may specify the execution order of the procedures. In one or more embodiments, the execution of a procedure, P, starts when all procedures associated with edges directed towards P have completed; however, edges may also be used to represent conditional execution flow. For example, in FIG. 1, the "Test" procedure 135 may return to "Assembly" 130 or proceed with "Transport to Destination" 140, depending on the result of the "Test" procedure 135.

In one or more embodiments, a cycle in the graph represents a loop in which a set of procedures is repeatedly executed until a loop termination/stop condition occurs. Thus, a procedure may be executed multiple times. A set of procedures may be also executed in parallel as shown in FIG. 1 (e.g., procedures 110 and 120 may be executed in parallel with procedures 115 and 125). Many processes eventually terminate, but in one or more embodiments, a process may be executed indefinitely.

In one or more embodiments, in addition to representing execution flow, a process graph may also be used to represent the flow of key resources or objects. The key objects are typically passed from one procedure to the next. For example, in a car assembly line process, each station along the assembly line may be represented with a procedure and the car would be the key object that moves along the assembly line from one procedure to the next. As can be seen in FIG. 1, a key object may be split and merged during the execution of the process. A key object may be tangible or intangible.

In one or more embodiments, in addition to operating on key objects, a procedure may utilize or consume other objects and resources. This includes machines, tools, and workers used for the execution of the procedure as well as materials consumed by the procedure. Procedures may also require space such as a particular room, access to infrastructure such as rail tracks, or may require certain rights such as intellectual property rights.

A procedure may accept a set of parameters that control its execution. For example, a bake procedure may accept the oven temperature and bake time as parameters. In one or more embodiments, procedure parameters may be a key focus of a method or methods, and examples are discussed herein. While the basic procedures of a process are typically known, there may be uncertainty about the parameters. For example, it is usually known that making bread requires baking. However, there may be less certainty about the best temperature, which in practice may depend on the specific dough mixture, type of oven, current ambient conditions, etc.

Furthermore, while the general process may be fixed, procedure parameters may need to be constantly adapted to the current situation. The same process may be used to serve multiple different instances, but each instance may require a personalized set of parameters for the same process. Being able to quickly finetune procedure parameters to the current situation allows for rapid adaptation to changing conditions and provides specialized products and services.

In one or more embodiments, procedure parameters may be determined by trial and error, prior models, data analysis, or via some theory. Embodiments herein describe methods to determine the best procedure parameters with machine learning.

In addition to parameters, the execution of a procedure is likely to depend on the properties of the objects involved in the procedure execution. This includes key objects as well as other objects that are used or consumed by the procedure. Furthermore, the execution of a procedure may depend on many other factors in addition to object properties and parameters. Procedures may be affected by the environment, depend on records in a database, or be influenced by other factors. For example, a transport procedure may react to weather or traffic information or even news about unsafe conditions on a route. A procurement procedure may consult an inventory database, bank records, as well as supplier reviews.

In one or more embodiments, at the same time, procedures may produce data by affecting the environment as well as objects with which they interact with. Production of information may be one of the primary goals of some procedures, such as measurement and test procedures. Thus, the execution of a procedure is usually associated with significant amounts of data that may be both consumed and produced by the procedure. Embodiments of machine learning methods discussed herein make use of this data.

In one or more embodiments, each execution of a procedure is an action. In one or more embodiments, the sequence of actions due to the execution of an entire process is a plan. An entity may be interested in both:

expected or predicted results of a proposed plan execution; and generation of a plan (planning)

This patent document includes embodiments that address prediction and embodiments that address plan generation. It shall be noted that a plan may refer to a model or models for any of variety of desired automated tasks, including (by way of illustration and not limitation), image processing, autonomous motion, robotics, security, sentiment analysis, classification, speech recognition, resource optimization, prediction, and information retrieval.

In general, planning is a complicated problem and involves:

selection of procedures to be executed
ordering and scheduling of procedure executions
assignment of resources to each procedure
specification of procedure parameters Embodiments herein focuses primarily on the last issue (specification of parameters) and discusses selection of resources for assignment. Embodiments discussed herein may be used in situations in which the general process is known, i.e. a process graph is specified. Thus, in one or more embodiments, selection, ordering, and scheduling of procedures may be performed as pre-processing steps. In one or more embodiments, a process graph may be specified by an entity or determined by some other means.

It should be noted that the selection of resources to be assigned has similarities to the selection of parameters and is addressed herein; and thus, one skilled in the art shall recognize that methods related to one aspect (e.g., parameters) may be adapted to another aspects (e.g., resources).

One goal of a planner is to generate optimal plans. The definition of optimality is very flexible and depends on the objectives. Among other things, optimality may involve:

metrics such as costs
efficiency metrics such as execution speed, latency, or utilization
quality goals such as reduction of defect rates
quantity goals such as production yield
design goals such as weight reduction
customer satisfaction
entity goals
environmental goals such as reduction in pollution
risk minimization such as avoidance of accidents Entities may define optimality in terms of one or a mixture of objectives. Different levels of importance may be assigned to each objective within a mixture. However, it is assumed that any optimality metric can be measured (or approximated/estimated) and recorded.

3. INTRODUCTION—SOME MAJOR CONTRIBUTIONS

Disclosure herein are a number of inventive concepts, which include at least the following:
1. Neural Fields
2. Deep Argmax
3. Piecewise linear programming with neural networks
4. Reinforcement learning with linear programming
5. Model-based policies in reinforcement learning
6. Model-based reinforcement learning with graphs
7. Interpretation of neural networks as piecewise linear function approximators
8. Approximation of neural networks via modulated weight vectors
9. Use of an object-oriented graph representation in planning The following chapters provide technical details for each of these inventive concepts. This Section 3 provides a brief overview for convenience, but additional details are provided in subsequent sections.

3.1. Neural Field Embodiments

Neural fields represent a major upgrade to standard neural networks. While it might be thought that certain aspects of neural field embodiments have a rough similarity to Self-Organizing Maps (SOM), there are major differences between neural fields and SOM. SOM is an unsupervised machine learning technique, while embodiments of neural fields are supervised machine learning techniques. As a consequence, the training method or methods of a neural field are very different from a SOM. Furthermore, neural fields embodiments are designed to provide function approximation, while a SOM usually provides dimensionality reduction.

Embodiments of neural fields may be useful on their own—i.e., useful in applications separate from other inventive concepts disclosed herein. Experiments have shown that neural fields can be 100 times more efficient than standard neural networks.

3.2. Deep Argmax Embodiments

In one or more embodiments, the Deep Argmax methodology is a very useful computation for using neural networks or neural fields. Deep Argmax embodiments may be useful on their own—i.e., useful in applications separate from other inventive concepts disclosed herein. Embodiments may be used with neural networks, neural fields, or in other applications.

3.3. Embodiments of Piecewise Linear Programming

Linear programming is a useful optimization methodology and is widely used in industry and academia. However, as its name applies, linear programming solves linear problems. At the same time, the world is mostly non-linear. Despite this fact, linear programming has proven itself very useful in practice. Nevertheless, standard linear programming cannot be used to solve highly non-linear problems.

In one or more embodiments, techniques presented herein split highly non-linear problems into small linear sub-problems using neural networks. Each of the linear sub-problems may be solved via linear programming In addition, in one or more embodiments, the neural network is used to learn the constraints of the linear program. This allows the use of linear programming even when there is uncertainty or lack of knowledge about all constraints.

In one or more embodiments, instead of a neural network, a neural field may be used to both convert a highly non-linear problem into a set of linear sub-problems and to learn the constraints of the linear program.

While linear programming has been used to analyze or verify neural networks, most notably in adversarial machine learning, this application is at best a reverse use case.

3.4. Embodiments of Reinforcement Learning with Linear Programming

Standard reinforcement learning is typically based on Markov decision processes and the Bellman equation. Many reinforcement methodologies are based on dynamic programming or a variation of dynamic programming Embodiments of the reinforcement learning methodology introduced herein are not based on the standard formulation with Markov decision processes or the Bellman equation and do not make use of dynamic programming Instead, the embodiments herein are based on linear programming Reinforcement learning embodiments may use a Deep Argmax embodiment.

3.5. Embodiments of Model-Based Policies in Reinforcement Learning

In one or more embodiments, a standard reinforcement learning policy is a function that maps a state to an action. Standard reinforcement learning policies may be trained for a fixed goal.

Embodiments presented herein learn policies that allow the goal to be variable. For instance, the policy maps a state and a goal to a sequence of actions. In embodiments, no re-learning is required if the goal changes. These embodiments allow for very fast re-planning in dynamic conditions.

In one or more embodiments, the policies learned by the methods discussed herein make active use of the world model and thus may be referred to as "model-based policies."

3.6. Embodiments of Model-Based Reinforcement Learning with Graphs

Embodiments of the reinforcement learning methodology discussed in this patent document use model-based learning. Most popular methods are typically model-free and based on value iteration or policy iteration. The approaches used by embodiments discussed herein are new, including using graphs in model-based reinforcement learning.

3.7. Interpretation of Neural Networks as Piecewise Linear Function Approximators Standard neural networks may be considered as piecewise linear function approximators. While it is known that neural networks are function approximators, there appears to be a lot of confusion on how deep neural networks work and no good descriptions exist in the literature. The "piecewise linear function approximator" description herein provides useful technical insights regarding how neural networks function are leveraged for various embodiments.

3.8. Approximation of Neural Networks via Modulated Weight Vectors

In conjunction with the interpretations of section 3.7, embodiments herein may be used to approximate the output of a neural network via modulated weight vectors. While standard neural networks assume fixed weight vectors, modulated weight vectors depend on the input and are thus variable.

Modulated weight vectors are known in the neuro-science community but are mostly unknown in the machine learning community Modulated weights have been used as better models for biological neurons, but there are very few machine learning methods that utilize this concept. Even to the extent that modulated weight vectors have been used in other fields, the use of modulated weights in the description of neural networks as piecewise linear function approximators is new to the author.

3.9. Use of an Object-Oriented Graph Representation in Planning

The method embodiments used in this patent document represent the world state as a graph of objects. This world state may be used in planning and reinforcement learning. The object-oriented representation discussed in this document may be considered to have similarities to object-oriented programming languages.

4. GENERAL SYSTEM

Figure 2:
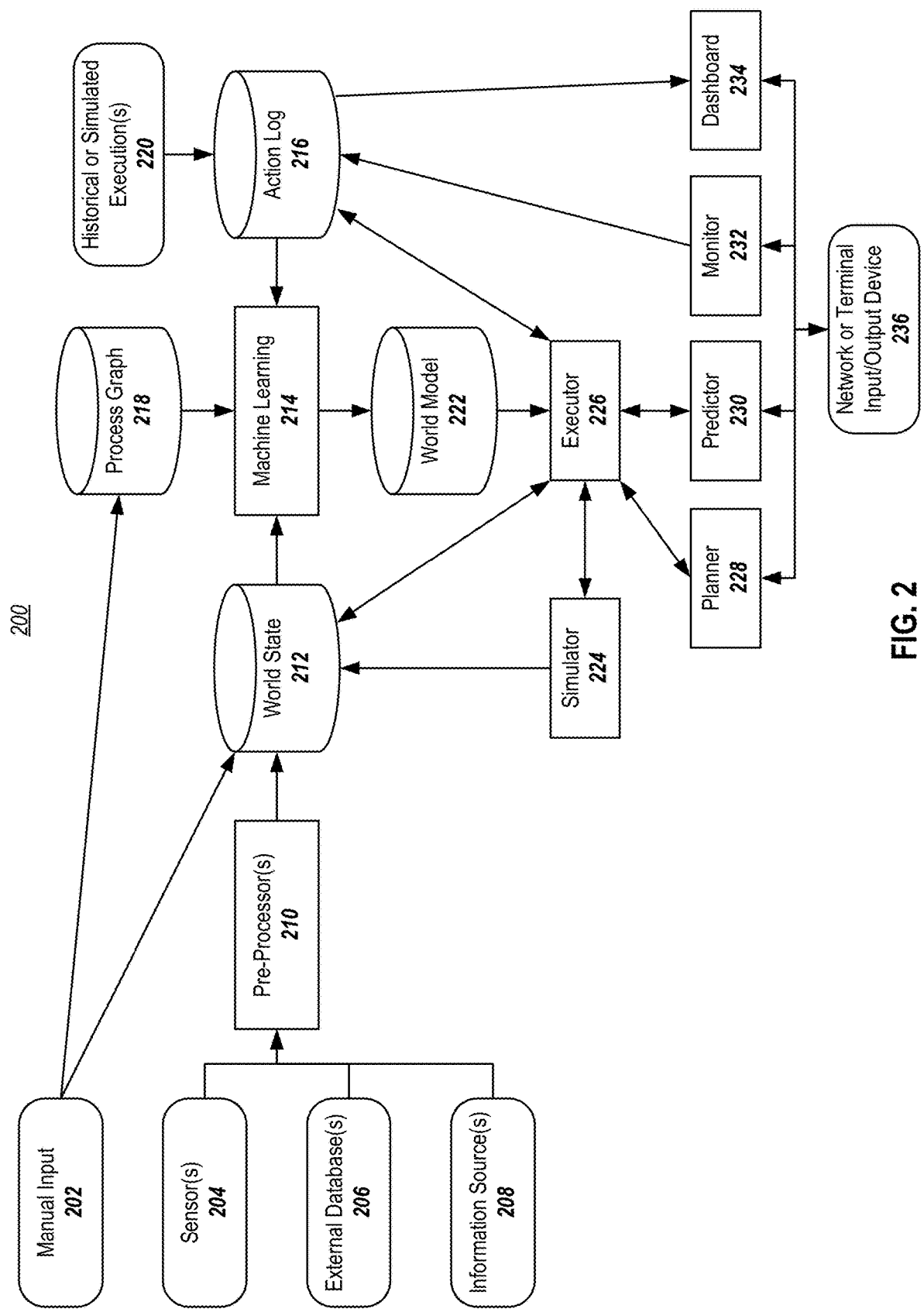
FIG. 2 depicts an overview of a general system used to plan and/or predict processes, according to embodiments of the present disclosure.

FIG. 2 depicts an overview of a general system used to plan and/or predict processes, according to embodiments of the present disclosure.

The rounded boxes in the left side of FIG. 2 show various data sources. Data may be collected from an array of sensors, external databases or obtained from a variety of information streams (e.g., manual input 202, sensor(s) 204 (e.g., Internet of Things (IoT), cameras, machine data, global position systems (GPS) information, etc.), external database(s) 206, information source(s) (e.g., news, stock, weather, traffic, social media, etc.) 208). Sensors may be used to measure machine status, object properties or environmental conditions. Sensor data may come in different forms, such as voltage readings or images from a camera (still and/or video cameras). External databases 206 may include a warehouse inventory database, worker data or financial records. Other information sources may provide less structured data, such as news articles or comments on social media.

The data collected from the data sources may be used to construct and keep track of the world state 212. In one or more embodiments, the world state 212 is stored in one or more databases. Depending on the nature of the data, some input data may require pre-processing 210. Examples of pre-processing may include but are not limited to computer vision methods to analyze video streams or natural language processing performed on freeform text. A specific implementation may use a number of different pre-processors.

In one or more embodiments, the world state database 212 provides access to the current world state as well as to historic world states recorded in the past. Thus, in embodiments, the database provides the world state at any particular time. The world state database may be continuously updated as new data is received. Each update will typically involve a small subset of the world state.

The world state 212 may also be specified via manual input 202, which may include upload via a file or files.

In one or more embodiments, the process graph database 218 is a graph database that stores the process graph, i.e. all procedures and execution flows. As discussed in Section 2, it may be assumed that the process graph is known and specified by the user via manual entry or otherwise, which includes a file upload.

In one or more embodiments, the action log 216 is another database that stores all past and current procedure executions. Action log entries includes information about:
  start and end times of actions;
  procedure parameters; and
  list of objects assigned to the action, including quantities.

The information above may be spread over multiple log entries. If available, historic action execution data is provided from an external database or recorded over a period of time.

In one or more embodiments, the process graph 218, world state 212, and action logs 216 together form the training data used by the machine learning method or methods to learn the world model. The world model 222 learned by the machine learning method or methods may be output to a world model database 222. Some examples of methods described herein use standard neural networks or neural fields.

In one or more embodiments, machine learning may be continuously performed as the world state and action logs are updated. Machine learning may also be carried out periodically in batches.

Instead of using real data, in one or more embodiments, a simulator may be used to generate a simulated world state and simulated actions 220. Furthermore, the simulator may be used to estimate any missing data not collected from the real world. It should be noted that, in embodiments, methods discussed herein operate with simulated data in the like manner as with real data. The simulator may be useful in machine learning and the simulation of plans.

In one or more embodiments, the executor 226 is a component that uses the world model 222, world state 212, and action log information 216 to keep track of the world dynamics. The executor may carry out computations for a planner 228, a predictor 230, and a simulator 224. The executor may update the world state database 212 with predicted states and may add entries to the action log database 216. In one or more embodiments, one of the tasks of the executor 226 is to evaluate expressions that may be used in the definition of procedures.

In the depicted embodiment in FIG. 2, the bottom row of FIG. 2 shows various user services (e.g., planner 228, predictor 230, monitor 232, and dashboard 234). A service may be accessed either directly via the command line of a computer that stores one or more of the databases or via a network request from another device such as a server or phone.

Given a proposed execution plan, the prediction service 230 returns a predicted future world state after plan execution. In one or more embodiments, the prediction service utilizes the executor to predict the effects of actions specified in the plan. Example of how prediction is performed are discussed herein.

As discussed in Section 2, in one or more embodiments, the planner 228 primarily focuses on selection of procedure parameters. Given a partial plan, the planner service may generate a complete plan by selecting appropriate parameters for the plan and, if necessary, by aiding in the selection of resources.

Essentially, in one or more embodiments, a partial plan specifies the process graph 218 to be executed. The process graph already specifies all procedures and their dependencies. A partial plan may also specify some procedure parameters and object assignments and include other constraints. In one or more embodiments, a plan request includes the plan objective, i.e. a definition of optimality as discussed in Section 2.

In one or more embodiments, the planner completes the partial plan by filling in unspecified parameters and assignments in a way that tries to maximize the specified plan objective. The planner may utilize the executor to predict the effects of actions. In one or more embodiments, the planner accesses both the world model 222 and the world state 212 through the executor 226.

The monitor service 232 may be used to keep track of procedure execution and update the action log as procedures are started and completed. Updates to the action log may be performed directly via a request to the monitor. Alternatively, the monitor may also consult world state data sources such as sensors and databases. The latter is not shown in FIG. 2.

A dashboard 234 may be used to provide access to the current state of the system and possibly other information.

The next sections will discuss machine learning, planning, and prediction and associated databases in more detail.

5. EXAMPLES

Before a more technical discussion, this section provides a few examples on how a system, such as the one 200 depicted in FIG. 2 may be used. The examples cover various use cases: (1) manufacturing; (2) transportation; (3) robotics; and (4) computer/network functionality.

The examples describe some possible use cases and do not cover all possibilities.

5.1. Manufacturing

Figure 3:
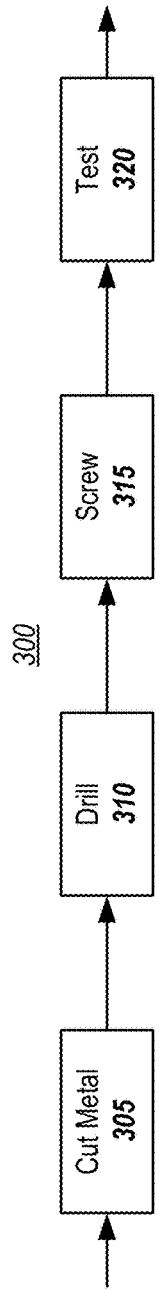
FIG. 3 shows part of a manufacturing process, according to embodiments of the present disclosure.

FIG. 3 shows part of a manufacturing process, according to embodiments of the present disclosure. The process shown in FIG. 3 produces pieces of metal that are attached to each other via some screws. This could be a part of a process that produces a larger product. The procedures together with some of their parameters are:

cut_metal_sheet(sheet, piece_size) 305;

drill_holes(piece, hole_width, hole_angle) 310;

screw_pieces(pieces, screw_width, screw_length) 315; and test_stress(part) 320.

Parameters are listed in parentheses, similar to procedure arguments in programming languages. For clarity, only parameters discussed here are shown. Note that some parameters are objects and other parameters are primitive values.

Assume that the objective is to produce parts that can tolerate a high amount of mechanical stress, but at the same time limit production cost by cutting as many pieces from the metal sheet as fast as possible. Thus, this objective balances quality with cost.

A wider and shorter screw can tolerate a higher amount of stress, but requires a larger hole possibly at an angle, which requires a larger piece, thus limiting the number of pieces obtained from the sheet, which in turn increases cost. Also, the hole angle may make drilling and screwing more difficult, limiting the number of pieces that can be produced per unit time, thus increasing the cost per part.

This case demonstrates a situation in which the parameters of different procedures within a process depend on each other.

As discussed before, it is assumed that the four steps above are fixed. However, the best values of some parameters are not known. Specifically, the best combination of values for the parameters piece_size, hole_width, hole_angle, screw_width, and screw_length are unknown.

If some values are randomly selected for the five unknown parameters, the predictor discussed in chapter 4 may be used to predict the amount of mechanical stress the part can tolerate and amount of time it would take to produce the part. This could be used to experiment with different values using the simulator.

Alternatively, the planner discussed in Section 4 may be used to automatically determine the best values for the five parameters.

In order to be able to use the predictor and planner, the manufacturer would first conduct a number of experiments with various values for the five parameters and then test the stress for each parameter combination. The data from the experiments may then be used by the machine learning component discussed in Section 4, to learn the relationship between mechanical stress measured in the last step and the five unknown parameters. The machine learning component produces a world model that may be used to both predict stress and find the best values for all parameters.

The above may be accomplished by conducting a test for every combination of the five parameters. If only ten different values are tested for each parameter, then there are $10^5=100,000$ combinations. In this case, the hole_width may need to be at least as large as the screw_width, but it may be meaningful to experiment with holes that are slightly larger than the screw to allow faster screwing. It is easy to see that, in a more complex manufacturing process, it quickly becomes intractable to exhaustively test every combination of parameters.

However, with machine learning, experiments for only a small subset of combinations have to be performed. In this case, it might be sufficient to perform just a few hundred experiments. None of the experiments may involve the perfect combination of parameters. But with machine learning and the planner, the best combination would still be quickly identified.

Moreover, the manufacturer may use the world model learned by the machine learning component in the production of different parts in the future, avoiding the need to perform new experiments. In fact, the simulator may now be used to predict quality and cost during the design stage of a new product.

5.2. Transportation of Goods

Figure 4:
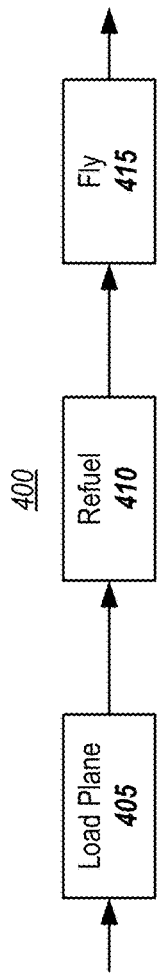
FIG. 4 depicts an air transport process, according to embodiments of the present disclosure.

FIG. 4 shows an air transport process, according to embodiments of the present disclosure. The procedures together with their parameters are:

load_plane(cargo_weight) 405;

refuel_plane(gallons) 410; and fly_plane(altitude, speed) 415.

The cargo is continuously received, and the transport process is periodically executed with the cargo waiting to be delivered. The objective is to deliver the cargo as soon as possible after it has been received while minimizing cost.

The cost is a function of the fuel consumed among other things. The amount of fuel consumed depends on the altitude and speed of the plane. The speed of the plane affects the duration of the flight.

The process could be executed each time some cargo is received, i.e. with a small cargo_weight. This would ensure that cargo is delivered quickly, but would require more flights increasing cost. On the other hand, the process could be executed when sufficient cargo has been received to fill the entire plane, i.e. with a maximum load weight. This reduces the number of required flights, but also increases the average delivery time. Furthermore, a larger cargo weight requires more fuel increasing cost and may affect the maximum altitude of the plane.

The best altitude and speed of the plane may also depend on current weather conditions and air traffic conditions. Costs may be reduced by selecting an altitude with tail wind or avoiding a congested flight altitude allowing a faster speed while still maintaining adequate aircraft separation.

Given current weather and traffic conditions, the predictor can be used to predict the time and cost of a cargo delivery when all parameters are specified. The planner can be used to automatically find the best parameter values for the current situation. Since, weather and traffic conditions are variable, the best combination of parameter values may change each day.

Data would be collected over a period time with different values for the parameter values. Each flight could be considered an experiment. Once sufficient amount of data has been collected, the machine learning module can be used to learn a world model that allows both prediction and planning As with the manufacturing example, it is not tractable to experiment with every combination of parameter values. Furthermore, in this example it is not possible to control environmental conditions such as weather or traffic. It is usually not possible to try every parameter combination under every weather and traffic condition.

However, with machine learning only a small set of examples is needed to learn a model. Once a model has been learned, it can be used to find the best parameter values even with new weather and traffic conditions.

5.3. Robotics

Figure 5:
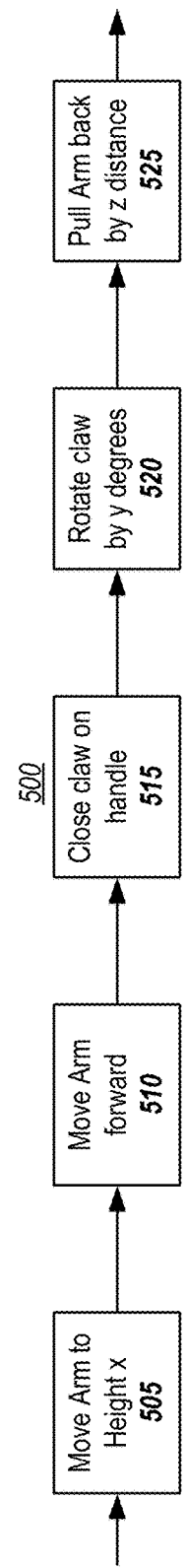
FIG. 5 depicts a method for moving a robotic arm to open a door, according to embodiments of the present disclosure.

FIG. 5 depicts a simplified method for a robotic arm to open a door, according to embodiments of the present disclosure. Together with the parameters, the procedures may be:

move_arm_vertical(initial position, end position) 505;
move_arm_horizontal(initial position, end position) 510;
pincher_claw(initial position, end position) 515;
rotate_claw(degrees, direction) (color) 520; and
move_arm_arc (initial position, end position, arc) 525.

An objective of the robotic device is to use its arm to smoothly open the door. The robot's owner would like to avoid the robot damaging the door, the door handle, or both.

Models may be developed so that the robot can learn trained models the produce desired effects for component procedure. Given the trained procedures effects models and initial constrains (e.g., current position of the robot relative to the door, type of door, type of door handle, etc.), an entire process model can be configured for opening the door.

In one or more embodiments, the robot may repeatedly use a planner to update the plan after each step of the process, particularly if one or more conditions change. For example, as the robot approaches the door, it may get a better measure of the position of the handle or may change recognition of the type of handle based upon its object recognition model. The added information may be used to produce a better plan for the remaining steps. In one or more embodiments, the plan may be updated after each step of the plan. With embodiments of the fast planner described in this patent document, frequent re-planning can be accomplished in a fraction of a second.

Learning may be accomplished by collecting data. Over time, the machine learning component would learn which combinations of parameters produce the best output state for the process.

5.4. Computing Services

Figure 6:
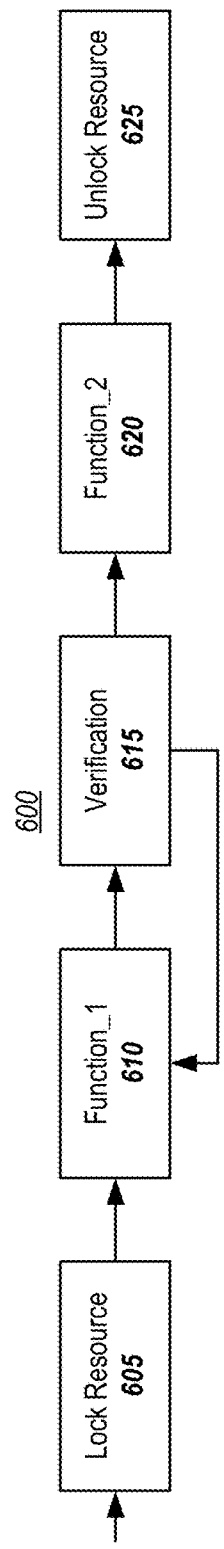
FIG. 6 depicts part of a services plan, according to embodiments of the present disclosure.

FIG. 6 shows part of computation plan, according to embodiments of the present disclosure. The procedures with their parameters are:

lock_resource(resource ID) 605;
function_1(file, transfer location, pathway) 610;
verification(successful) 615;
function_2(notification) 620;
unlock_resource(resource ID) 625.

In one or more embodiments, the process may be any computation process. By way of illustration, consider a process for updating files of a database system. The computation plan has a conditional branch. The first part of the plan is executed periodically, until a verification is performed after some repetitions of the plan. Depending on the outcome of the verification, the process may end and unlock the resource, or the plan may continue.

In the depicted example, an objective is to transfer files from one resource to another location, making sure that all the files are transferred successfully before unlocking the resource for changes.

As before, the general treatment plan may be known. However, there is uncertainty over the procedure parameters, such as time to transfer, pathway to use to transfer between resources, etc. In fact, procedure parameters may depend on which resource (source and/or destination) and may need to be customized Again, there may be interdependence between the various parameters, e.g., the source resource may influence the time or pathway used to transfer the file(s). Furthermore, there may be a number of possible destination resources that may be selected. Thus, this example shows a case in which some parameters require a selection of an object. In this case, a selected object is the destination. The destination may be selected based on properties of the destination or properties of the pathway(s) between the source and the destination.

Data may be collected during the verification and may be also collected at other times. Given data from many files transfers, a machine learning module can produce a world model that allows prediction of the timeliness or efficiency of the transfer (so that the resource is locked for as little time as possible) and may help in improving the plan by adjusting procedure parameters or the selections.

6. NOTATION

This section summarizes the notation used by the subsequent sections. Vectors and matrices have their standard mathematical meaning. All vector and matrix indices are zero-based, i.e. the first element is element number zero. Loop ranges are inclusive, i.e. the upper bound of a loop range is iterated.

| Concept | Format | Example |
| --- | --- | --- |
| scalar variable | small case letter | y = 2 |
| vector variable | small case, bold, underlined | $\underline{x}$ |
| vector element | zero-based index in brackets | $\underline{x}[0]$ |
| explicit vector | comma separated elements, enclosed in brackets | $\underline{x}$ = [0, 1, 2, 3] |
| empty vector | empty brackets | [ ] |
| range of vector elements | lower and upper index separated by dots | $\underline{x}[0 \ldots 2]$ = [ $\underline{x}[0]$, $\underline{x}[1]$, $\underline{x}[2]$ ] |
| vector dot product | * | $\underline{w} * \underline{x}$ |
| vector length | \|\| vector \|\| | \|\| $\underline{x}$ \|\| = squareRoot($\underline{x} * \underline{x}$) |
| vector at time t | time specified in parentheses | $\underline{x}(t)$ |
| matrix | upper case, bold | A |
| matrix element | row index followed by column index in brackets | A[row, column] |
| matrix row vector | row index in brackets, dots for range of columns | A[row, . . . ] |
| range of matrix elements | lower and upper indices separated by dots | A[0 . . . 1, 1 . . . 2] = rows 0 and 1, columns 1 and 2 |
| function | small letter or phrase followed by parameters in parentheses | f(x) |
| array parameter or variable | name followed by square brackets | sort(items[ ]) |
| argument that maximizes an expression | argument is specified in curly braces, maximized expression in parentheses | argmax{$\underline{x}$}($\underline{w} * \underline{x}$) = vector $\underline{x}$ that maximizes the dot product |
| for loop | inclusive range separated by dots | for i = 0 . . . 3 { print i } = 0, 1, 2, 3 |

7. REPRESENTATION EMBODIMENTS

This section discusses embodiments of the representation of actions and states.

7.1. Processes

As discussed in previous sections, processes may be represented via process graphs. The vertices may represent procedures and the directed edges may specify the flow of execution. In principal, the process graph may contain cycles, which indicate loops.

7.2. Procedure

In one or more embodiments, a procedure represents one step in a process and may specify an entire sub-process. Procedures may be defined in way similar to procedures or methods in programming languages. In one or more embodiments, a procedure may comprise the following components:

a name
a set of parameters
a set of preconditions (may be learned)
a set of effects (may be learned)
a duration (may be learned)

In one or more embodiments, each procedure parameter has a type and a name. The type of procedure parameter may be a primitive value type, such as a number, or represent a class of objects. If a distinction is necessary, parameters of primitive value type will be called "control parameters," while parameters of class type will be called "object parameters."

In one or more embodiments, a procedure may be executed only if all of its preconditions are satisfied. Procedure preconditions may include:

completion of some other procedures of the process as specified by the process graph; and
requirements on object parameters.

Alternatively, if a precondition or preconditions have not been satisfied, the procedure may be executed but it results may be limited based upon the lack of certain preconditions. Additionally, or alternatively, assumptions could be made regarding preconditions (e.g., as if they have been completed), which assumptions may be later tested, changed, or qualified.

In general, a procedure P may be executed if all procedures with edges directed towards P have completed execution. If the graph contains loops, a procedure may be executed multiple times, but during each iteration of the loop all preconditions must be satisfied.

The requirements on object parameters may be a conjunction of Boolean expressions that evaluate to true if all requirements are satisfied. Requirements on object parameters may include:

requirements on object quantity;
requirements on object properties (may be learned); and
requirement of exclusive access to the object (i.e. object cannot be concurrently used by other procedures).

Requirements on object parameters may be learned, manually specified by the user, or both.

In one or more embodiments, procedure effects specify the result of procedure execution. A procedure may include the following types of effects:

modification of the properties of an object passed to the procedure as a parameter (may be learned);
creation or destruction of an object; and
execution of a sub-procedure.

In one or more embodiments, procedures have direct access to objects passed to the procedure as a parameter. However, a procedure may be able to access other objects indirectly through objects to which it has access.

The effects of procedures on object properties may be learned or manually specified.

The execution of a procedure requires time. Each execution of a procedure may require a different amount of time depending on the procedure parameters and the world state. The duration of a procedure may be specified manually via an expression or may be learned.

7.3. Action

In one or more embodiments, an action is one execution of a procedure with specific parameter values. In programming languages, an action corresponds to a procedure call. An action may include the following elements:

specification of the executed procedure;
an assignment for each procedure parameter, which includes both object and control parameters;
a start time; and
an end time.

Control parameters may be assigned specific values, and object parameters may be assigned specific objects. The start and end times of an action may be anticipated future times.

If the process contains loops, each execution of a procedure in each iteration may be considered a separate action.

7.4. Plan

In one or more embodiments, a plan consists of a set of actions. A plan represents the execution of an entire process. The actions of a plan may be scheduled to be executed in the future or may have already been executed.

In one or more embodiments, the actions of a plan are executed in an order that satisfies the procedure preconditions. Multiple actions of a plan may be executed concurrently.

A full plan specifies all parameter assignments for each action. In one or more embodiments, prediction may require a full plan.

A partial plan specifies a subset of parameter assignments. The remaining parameter assignments may be completed by the planner. In one or more embodiments, at a minimum, a partial plan specifies the procedures to be executed and does not specify any parameter assignments.

73. World State

In one or more embodiments, the world state comprises a set of objects. In one or more embodiments, the world state is specified by the values of all object properties. As object property values change, the world state changes over time.

7.6. Objects

In one or more embodiments, an object is any concept with properties. The term "object" is used similar to objects in programming languages. However, in one or more embodiments, unlike in standard programming languages, the objects discussed here have properties and no behavior. In one or more embodiments, procedures are not members of objects. Objects are most similar to a "struct" in the C programming language and may be compared to records of a database.

In one or more embodiments, an object can be used to represent any concept with properties. This includes both physical concepts as well as more abstract ideas. For example, products, workers, and buildings may be considered as objects with a physical form. At the same time, abstract concepts such as contracts or rights may be modeled as objects. Even imagined things, such as pink unicorns, can be modeled as objects.

Since an object may be anything that can be imagined, in one or more embodiments, objects may be described as mathematical structures. In one or more embodiments, an object is an instance of a class, and a class defines a set of properties. In one or more embodiments, each property may have a type and a name Similar to procedure parameter types, property types may be either primitive or represent a class of objects. Primitive property types may include numbers, enumerations and strings.

While a class defines the set of properties, in one or more embodiments, each object of the class specifies specific values for each property. If the property type is primitive, the object specifies the primitive value. If the property type is a class, the object specifies a pointer to another object of the property class or the null pointer.

A single object instance may have a quantity property that is used to represent a set of items. Object quantities may be discrete, such as number of nails, or continuous, such as amount of oil.

Objects may contain other objects or be linked to other objects via properties of class type. For example, a shipping container would be an object that can contain a set of other objects. A wheel may be an object attached to a car object.

7.7. Goals

In one or more embodiments, a goal state is a desired world state. In general, a goal state specifies a relevant subset of a full world state. Thus, multiple independent goals may be pursued at the same time with no conflicts.

A goal may be specified explicitly by specifying a desired value for a subset of the properties of some objects in the world. Properties and objects not specified in the goal may be ignored for the purposes of the goal. Goals may refer to properties indirectly. For example, an indirect reference would be the wheel of the current car, rather than specifying a very specific wheel with an identification number.

A goal may also be specified functionally via a mathematical function of the properties of some objects in the world. For example, the goal may be to maximize a certain property or to minimize the sum of a set of properties. In such a case, no specific value is specified, but the intent is to produce a state that is better according to the function.

In general, all goals may be modeled as functional goals. Explicit goals may be modeled via a function that computes the difference between the current state and the desired state, i.e. the "error." An explicit goal tries to minimize this error.

More generally, the goal function may be considered to compute a utility of a state. In one or more embodiments, the goal function returns a higher utility value for a state closer to the goal.

In the case of an explicit goal, in one or more embodiments, the utility is essentially the inverse of the error, i.e. a low error has high utility. In other cases, such as maximization of a value, the utility may be unbounded but a higher value is interpreted as better.

A goal may also depend on time. For instance, the same world state may be associated with a different utility depending on the time of the world state. The goal may be to reach a certain world state as fast as possible.

In summary, in one or more embodiments, a goal function returns a utility value given a world state or a subset of a world state at a particular time.

7.8. State Vectors

At least some of the method embodiments described in the following sections operate on input vectors that represent a relevant subset of the world state. This section discusses embodiments of how the state vectors are computed. Methodology 7.8.1 shows how an object may be converted into a vector according to embodiments of the present disclosure. The conversion uses the world state at the specified time t.

Methodology 7.8.1:

```
objectToVector(object, time t, vector x) {
    for each (relevant) property of object {
        if the property has class type {
            if the property object has not already been converted {
                objectToVector(property, t, x)
                remember that property object has been converted
            }
```
```
        } else {
            append numeric representation of the property value at time t to x
        }
    }
}
```

Vector $x$ is initialized to be the empty vector H. Since an object may be referenced by multiple other objects, methodology 7.8.1 keeps track of all objects that have already been converted in some appropriate data structure.

If a primitive property is a number, the numeric representation is just the number. Otherwise, the property may be converted into a numeric value, which may use a conversion method appropriate for the specific implementation. In general, the bits representing the property value may be interpreted as a number.

In one or more embodiments, a procedure may convert all or a subset of its parameters into a vector. Methodology 7.8.2 shows how a set of parameters may be converted into a vector according to embodiments of the present disclosure.

Methodology 7.8.2:

```
parametersToVector(parameters, time t) {
    x = [ ]
    for each parameter {
        if the parameter is an object {
            objectToVector(parameter, t, x)
        } else {
            append numeric representation of the parameter value to x
        }
    }
    return x
}
```

8. PREDICTION EMBODIMENTS

In one or more embodiments, given a specified plan, prediction computes the expected future world state when the plan is executed given a current or initial world state.

In one or more embodiments, by definition, the world state is changed by actions. It is generally taken for granted that changes in the world state are governed by some rules, such as a law or laws of nature. Let $\underline{s}(t)$ be a vector that represents the world state at time t and let $\underline{a}(t)$ be a vector of all actions executed at time t. The world state changes according to some function f, such that after some period of time A the state becomes:

$$\underline{s}(t+\Delta)=f(\underline{s}(t),\underline{a}(t))$$

The function f represents the true world model.

In practice, the true world model is usually unknown. Instead, the true model f may be approximated by another typically simpler function h, such that $h(\underline{s}(t), \underline{a}(t))\approx f(\underline{s}(t), \underline{a}(t))$. The function h may be chosen manually according to some theory. In one or more embodiments, a machine learning method or methods may be used to find h. For example, the world model may be approximated with a neural model that comprises a set of neural networks or neural fields.

In one or more embodiments, an action represents the execution of a procedure. Thus, predicting the future may involve making predictions about procedures. For example, the following procedure predictions may be learned by the methods discussed in this patent document:

1. changes to the property values of object parameters;
2. duration of a procedure; and/or
3. whether the pre-conditions of a procedure are satisfied.

The following sections discuss each prediction in turn.

8.1. Predicting Effects on Properties

In one or more embodiments, the execution of a procedure may affect the properties of one or more objects that are accessible to the procedure. In one or more embodiments, an object is accessible to the procedure if:

the object is a parameter of the procedure; or the object is a property value of an accessible object.

Thus, a procedure may have an indirect effect on an object if there is a chain of references to the object from one of the object parameters of the procedure. Changes to object property values may be learned as described in this section.

As discussed in Section 7.2, a procedure may have other effects, which are not learned. An example includes construction of a new object. However, such effects may be manually defined and still used for prediction by the executor.

In one or more embodiments, to simplify the problem, two assumptions are made:

1. each action affects an exclusive subset of the world state; and
2. the effects of an action are independent of each other.

The two assumptions (above) are reasonable for the example problems addressed herein. A procedure has access to the world through its object parameters. In one or more embodiments, a procedure has exclusive access to any object properties that are modified by the procedure. For instance, an object property modified by one procedure cannot be concurrently modified by another procedure. However, a different property of the same object may be concurrently modified by another procedure. Furthermore, the same property may be modified by another procedure after completion of the first procedure.

As an example, a product assembled along an assembly line may be assumed to be modified only by one step along the assembly line at a time. Similarly, it may be assumed in one or more embodiments that machines, workers, or ingredients may be assigned to one action at a given time.

The second assumption is not necessary in all embodiments; however, for some embodiments simplifies the discussion. In fact, if the assumption is violated, it may be fixed via the following transformation:

let $\gamma_1$ and $\gamma_2$ be two effects of the execution of a procedure $P_0$ and assume $\gamma_2$ depends on $\gamma_1$ violating the second assumption split the procedure $P_0$ into a sequence of two procedures $P_1$ and $P_2$, such that the effect of $P_1$ is $\gamma_1$ and the effect of $P_2$ is $\gamma_2$ and $P_2$ depends on $P_1$ in the process graph Thus, effect dependencies can be modeled via procedure dependencies.

In one or more embodiments, the two assumptions presented above also allow learning a distinct model for each effect of a procedure independent of other effects of the same and other procedures.

Thus, instead of learning one full world model $h(\underline{s}(t), \underline{a}(t))=\underline{s}(t+\Delta)$, for all actions and effects at the same time, a family of functions $h_{P,\gamma}$ may be learned, where P is a procedure and $\gamma$ is one effect of the procedure. For an action of P, the input to $h_{P,\gamma}$ is the current state and the vector of control parameters $\underline{\theta}$ of the action. $h_{P,\gamma}$ has one output for the predicted value of the learned effect. For instance, $h_{P,\gamma}(\underline{s}(t), \underline{\theta})$ is the effect of an action of P with control parameters $\underline{\theta}$ in state $\underline{s}(t)$. The vectors $\underline{s}(t)$ and $\underline{\theta}$ may be appended to each other to form a joint vector $\underline{x}=[\underline{s}(t), \underline{\theta}]$.

The effect $\gamma$ simply specifies the index of the affected object property in the state vector $\underline{s}$. For instance, $\underline{s}[\gamma]=h_{P,\gamma}(\underline{s}(t), \underline{\theta})=h_{P,\gamma}(\underline{x})$.

In one or more embodiments, a procedure has access to the world state through its object parameters. Thus, the relevant world state $\underline{s}(t)$ may be obtained via methodology 7.8.2 (parametersToVector) discussed above using the objects assigned to the action. In fact, the action parameters specify both the objects assigned to the action as well as the control parameters $\underline{\theta}$. Thus, methodology 7.8.2 returns the vector $\underline{x}$ defined above.

Methodology 8.1 predicts the effect of a plan starting in state $\underline{s}$ according to embodiments of the present disclosure. The embodiments in this section assume that all actions in a plan have been properly ordered based on dependencies and all action start and end times are provided (denoted start_time and end_time).

Methodology 8.1:

```
predictPlanEffects(plan, s) {
    for each action α in the plan {
        for each effect γ of α {
            s(α.end_time)[γ] = h_{P,γ}(parametersToVector(α.parameters, α.start_time))
        }
    }
}
```

In one or more embodiments, if the plan completes at time r, then s(r) is the predicted effect of the plan.

8.2. Learning Effects on Properties

Each function $h_{P,\gamma}$ used by methodology 8.1 may be learned by one neural network or neural field. Each neural network or field may be trained with training data. Any standard neural network training methodology may be used. Neural field training is discussed later in this patent document. Thus, a main remaining issue is creating the training data.

Both neural networks and neural fields are supervised machine learning methodologies that can learn to approximate an unknown function. Training data comprising a set of samples with both the function input and the expected function output. As described in methodology 8.1, the function input is a vector of values $\underline{x}$. The function output may be a scalar value y, i.e. $y=h_{P,\gamma}(\underline{x})$. Thus, the training data comprises a set of pairs $(\underline{x}_i, y_i)$.

For uniformity, the training data will be represented by an input data matrix D and an expected value vector $\underline{y}$. In one or more embodiments, both D and $\underline{y}$ have one row for each training data sample, and the number of columns of D is equal to the input data dimension plus 1. The input data dimension is essentially the number of values in the function input. In one or more embodiments, an extra dimension may be added for bias values. It should be noted that bias may be handled in other ways but including it in D simplifies the discussion.

As discussed in Sections 4 and 5, the training data may be obtained from historic data or alternatively from simulation.

It may be assumed that a set of fully executed plans together with all associated world state information exists that may be used for training purposes. This data may be retrieved from the world state and action log databases discussed in section 4. The process graph database may provide information about procedures.

Methodology 8.2.1 shows how each function $h_{P_\gamma}$ may be learned according to embodiments of the present disclosure.

Methodology 8.2.1:

```
learnProcedureEffect(P, γ) {
    D = new empty matrix
    y = new empty vector
    s = training world state obtained from database or simulator
    for each training action α from the database or simulator {
        if α is an action of P {
            append i-th row to D and y
            D[i, . . .] = parametersToVector(α.parameters, α.start_time)
            D[i, last_column] = 1 // constant bias input
            y[i] = s(α.end_time)[γ]
        }
    }
    h_{P_γ} = new neural network or neural field
    train h_{P_γ} using D and y
    return h_{P_γ}
}
```

In the embodiment depicted in Methodology 8.2.1, a constant 1 is appended as a bias input value to all rows of D which is done for correctness here, but other approaches to deal with bias may be used.

Methodology 8.2.2 learns the effects of all procedures of a process according to embodiments of the present disclosure.

Methodology 8.2.2:

```
learnProcessEffects(process) {
    for every procedure P in the process {
        for every effect γ of P {
            h_{P_γ} = learnProcedureEffect(P, γ)
            add h_{P_γ} to the world model
        }
    }
}
```

In one or more embodiments, procedure effects may be either manually specified in the procedure definition or discovered via some method. In one or more embodiments, the effects may be stored in a data structure, such as a list, that is enumerated. In general, procedure effects may be discovered by comparing the world state before and after the execution of actions of the procedure. Properties that consistently appear to change are likely to be effects of the procedure.

It should be also noted that Methodology 8.2.2 may not be the most efficient approach since it loops over all actions for each procedure effect. In one or more embodiments, a practical implementation may be employed that efficiently loops over the data. For example, in one or more embodiments, one or more iterations of the loop may be executed in parallel. The embodiments presented herein are presented to help provide clarity in describing aspects of the embodiments; thus, it shall be noted that the presented methodologies may be optimized for a particular implementation.

8.3. Predicting Duration of a Procedure

Embodiments in Sections 8.1 and 8.2 have assumed that both the start and end times of all actions are known. However, prediction may be performed even if these values are unknown by, for example, predicting the duration of each action.

In one or more embodiments, an expected duration Δ of each procedure P may be independently predicted via a function $h_{P_\Delta}$. Each execution of the procedure may have a different duration depending on the world state and control parameters.

Assuming the start times of all actions have been specified, methodology 8.3 predicts the end time of the action α of procedure P according to embodiments of the present disclosure.

Methodology 8.3:

```
predictActionEndTime(action α) {
    α.end_time = α.start_time + h_{P_Δ}(parametersToVector(α.parameters, α.start_time))
}
```

Methodology 8.3 may be run before methodology 8.1 if action end times are unknown. If action start times are also unknown, in one or more embodiments, each action may be assumed to start as soon as all of its dependencies have completed. Thus, both action start and end time may be predicted.

8.4. Learning Duration of a Procedure

Procedure durations may be learned in the same manner as property effects are learned in section 8.2. Specifically, each duration function $h_{P_\Delta}$ may be learned by a neural network or neural field. In one or more embodiments, the input data matrix D is identical to the matrix discussed in section 8.2. The expected value vector y now contains action durations extracted from the training data. Embodiments of this approach are summarized by methodologies 8.4.1 and 8.4.2.

Methodology 8.4.1:

```
learnProcedureDuration(P) {
    D = new empty matrix
    y = new empty vector
    s = training world state obtained from database or simulator
    for each training action α from the database or simulator {
        if α is an action of P {
            append i-th row to D and y
            D[i, . . .] = parametersTo Vector(α.parameters, α.start_time)
            D[i, last_column] = 1 // constant bias input
            y[i] = α.end_time – α.start_time
        }
    }
    h_{P_Δ} = new neural network or neural field
    train h_{P_Δ} using D and y
    return h_{P_Δ}
}
```

Methodology 8.4.2:

```
learnProcessDurations(process) {
    for every procedure P in the process {
        h_{P_Δ} = learnProcedureDuration(P)
        add h_{P_Δ} to the world model
    }
}
```

8.5. Predicting Procedure Preconditions

In at least some of the embodiments discussed above, it has been assumed that procedure preconditions are satisfied. In many processes, it may be possible to manually require a set of preconditions. However, in some processes, the full set of procedure preconditions may be unknown. This is usually the case if an entity has no defined formal process.

Trying to manually identify preconditions in informal processes may not be practical. Thus, it is very desirable to be able to learn these preconditions from training data. Precondition learning may also be used to learn conditional branches in the process graph. Each branch may be associated with a condition that may be learned like any other precondition.

The preconditions of a procedure P may be independently predicted via a function $h_{P\lambda}$. In one or more embodiments, the preconditions of a procedure depend on the procedure parameters and may be either satisfied or not satisfied. Thus, $h_{P\lambda}$ may be a classifier function that returns either true or false. Both neural networks and neural fields may be used to learn classifier functions.

Methodology 8.5 predicts whether action a can run given the current world state according to embodiments of the present disclosure.

Methodology 8.5:

```
canRun(α) {
    return h_Pλ(parametersToVector(α.parameters, α.start_time))
}
```

8.6. Learning Procedure Preconditions

Procedure preconditions may be learned in much the same way as property effects and procedure durations. In one or more embodiments, a classifier is learned in which an expected value is 1 if preconditions are satisfied and −1 if one or more preconditions are not satisfied.

Examples with satisfied preconditions may be directly obtained from the action log. However, actions for unsatisfied preconditions may be harder to obtain since, by definition, these actions have not executed. Unfortunately, neural networks typically use negative examples for classifier training However, embodiment of neural fields may be trained with only positive examples.

There are a few general ways to deal with the lack of negative examples:
1. use neural fields or another methodology that may be trained with only positive examples;
2. record failed actions with unsatisfied preconditions in the action log; and/or
3. randomly generate actions parameters and assume that if the action log does not already contain a similar action (e.g., based on parameter vector distance), it is likely to have unsatisfied preconditions.

Methodology 8.6.1 presents a learning approach that uses both positive and negative examples that will work with both neural networks and neural fields according to embodiments of the present disclosure.

Methodology 8.6.1:

```
learnProcedurePreconditionsPositiveAndNegative(P) {
    D = new empty matrix
    y = new empty vector
    s = training world state obtained from database or simulator
    for each training action α from the database or simulator {
        if α is an action of P {
            append i-th row to D and y
            D[i, ...] = parametersToVector(α.parameters, α.start_time)
            D[i, last_column] = 1 // constant bias input
            if α has successfully executed {
                y[i] = 1
            } else {
                y[i] = -1
            }
        }
    }
    h_Pλ = new neural network or neural field
    train h_Pλ using D and y
    return h_Pλ
}
```

Methodology 8.6.2 presents a solution if only positive examples are available according to embodiments of the present disclosure. Note that methodology 8.6.2 may not work with neural networks but will work with neural fields.

Methodology 8.6.2:

```
learnProcedurePreconditionsPositiveOnly(P) {
    D = new empty matrix
    y = new empty vector
    s = training world state obtained from database or simulator
    for each training action α from the database or simulator {
        if α is an action of P {
            append i-th row to D and y
            D[i, ...] = parametersToVector(α.parameters, α.start_time)
            D[i, last_column] = 1 // constant bias input
            y[i] = 1
        }
    }
    h_Pλ = new neural field
    train h_Pλ using D and y
    return h_Pλ
}
```

Methodology 8.6.3 learns the preconditions of a process according to embodiments of the present disclosure. In one or more embodiments, methodology 8.6.3 makes use of either methodology 8.6.1 or 8.6.2, depending on whether negative examples are available.

Methodology 8.6.3:

```
learnProcessPreconditions(process) {
    for every procedure P in the process {
        if negative examples are available {
            h_Pλ = learnProcedurePreconditionsPositiveAndNegative(P)
        } else {
            h_Pλ = learnProcedurePreconditionsPositiveOnly(P)
        }
        add h_Pλ to the world model
    }
}
```

8.7. Full Prediction of Plan

The methodologies discussed in Sections 8.1, 8.3, and 8.5 are combined in an embodiment methodology 8.7 to predict the procedure preconditions, durations, and effects. If some preconditions are predicted to be unsatisfied, methodology 8.7 predicts that a plan cannot be executed according to embodiments of the present disclosure.

Methodology 8.7 assumes that action start times have been manually chosen and are fixed according to embodiments of the present disclosure. In principal, it may be possible to also predict when an action can start. However, this may be treated as a scheduling problem rather than a simple prediction problem.

The parameter s is the initial world state.

Methodology 8.7:

```
predictPlan(plan, s) {
    Q = new priority queue
    insert all actions in the plan into Q and sort based on specified start time
    while Q is not empty {
        α = pop Q
        if α has been marked as running {
            for each effect γ of α {
                s(α.end_time)[γ] = h_{P_γ}(parametersToVector(α.parameters,
α.start_time))
            }
        } else {
            if canRun(α) returns false {
                return that action (or plan) cannot be executed
            }
            if no end time is specified for α {
                predictActionEndTime(action α)
            }
            mark α as running
            insert α back into Q, but now sort α based on its end time
        }
    }
}
```

If the plan completes at time $\tau$, then $\underline{s}(\tau)$ is the final predicted effect of the plan.

Figure 7:
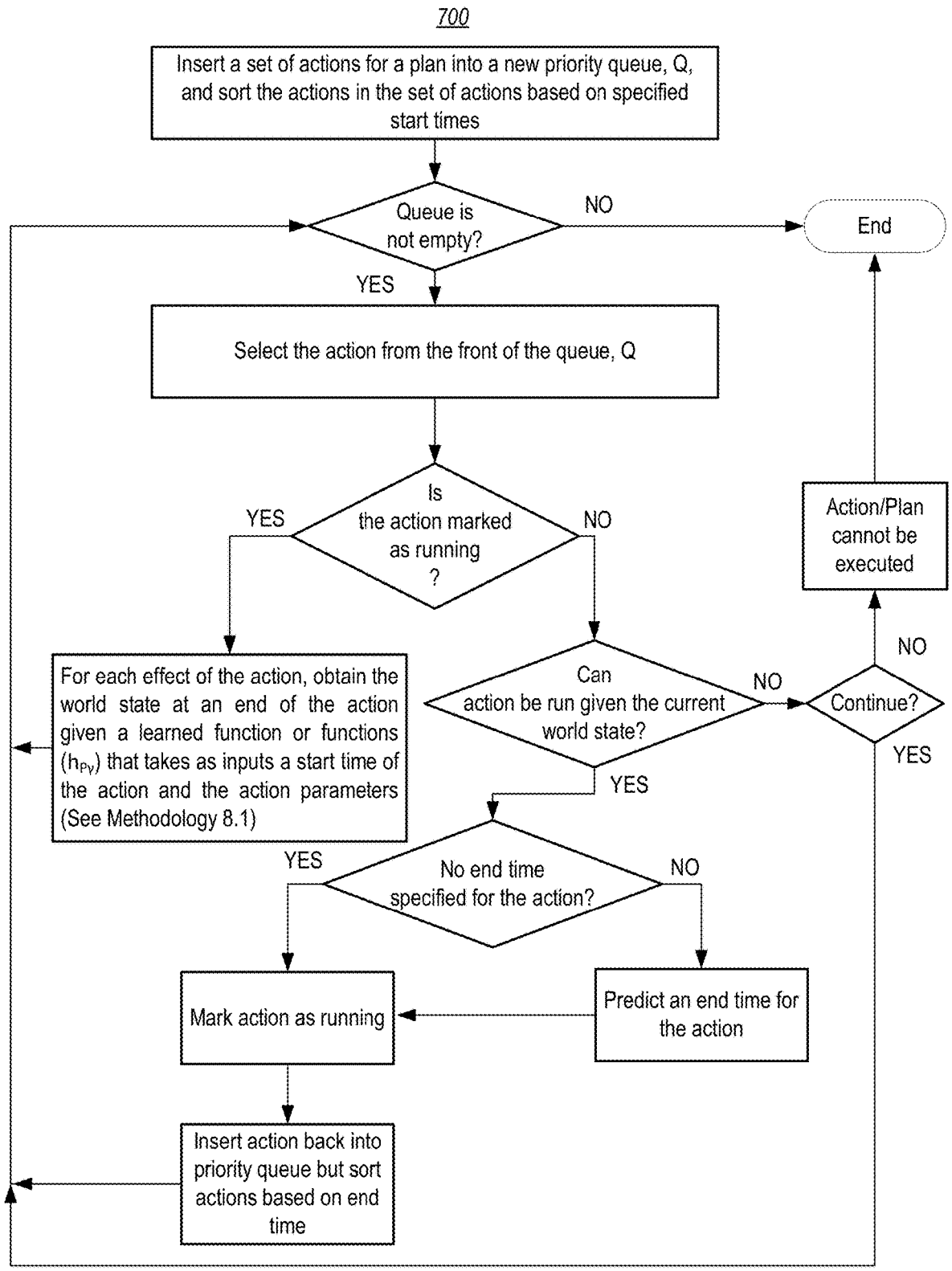
FIG. 7 depicts a flowchart implementation of methodology 8.7, according to embodiments of the present disclosure.

FIG. 7 depicts a flowchart implementation 700 of methodology 8.7, according to embodiments of the present disclosure.

8.8. Learning Entire World Model

Methodology 8.8 combines the methods discussed in Sections 8.2, 8.4, and 8.6 to learn the entire world model according to embodiments of the present disclosure.

Methodology 8.8:

```
learnWorldModel( ) {
    for every process in the database {
        learnProcessEffects(process)
        learnProcessDurations(process)
        learnProcessPreconditions(process)
    }
}
```

Figure 8B:
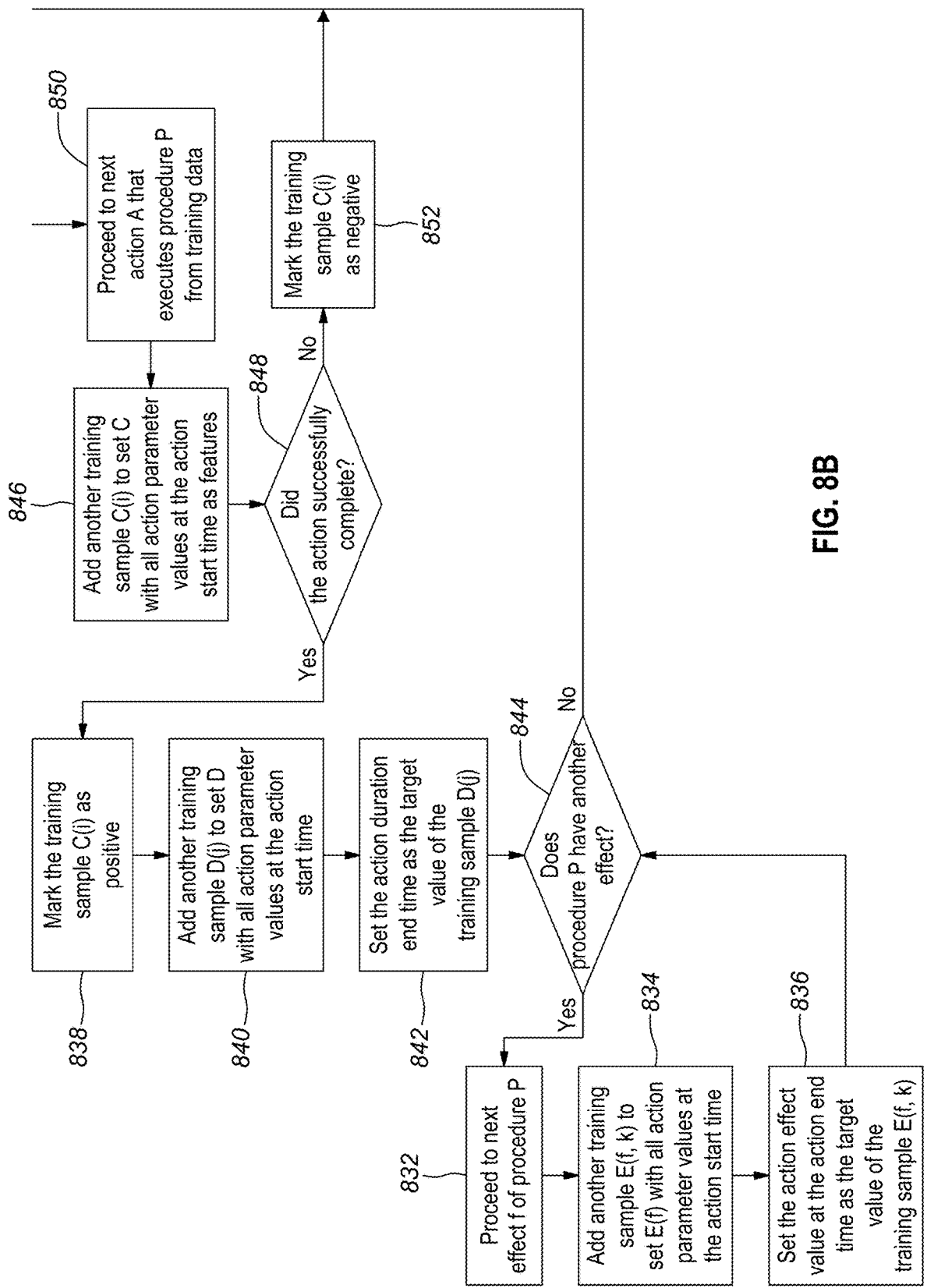

FIGS. 8A & 8B depict a flowchart implementation (steps 804-852) of methodology 8.8, according to embodiments of the present disclosure.

9. PLANNING

Given a partial plan, in one or more embodiments, planning produces a completed plan with optimal parameters and resource selections.

In one or more embodiments, a fully specified plan may comprise the following components:
1. a set of actions;
2. an execution order with action dependencies;
3. start and end times for actions;
4. object assignments for each action; and
5. control parameter specifications for each action.

In one or more embodiments, planning method embodiments discussed herein involve a partial plan that specifies items 1 and 2, above. For instance, it is assumed that the procedures and the general structure of a process are known. As discussed in previous chapters, the process may be manually specified.

In one or more embodiments, partial plans do not need to specify items 3, 4, and 5. However, a subset of parameters and action times may be manually specified. Given an ordered set of actions, the planner discussed here will:

determine values for all unspecified action parameters (items 4 and 5); and/or determine feasible action start and end times (item 3).

Unlike the method embodiments discussed herein, traditional planning tends to focus on items 1 and 2. However, in practice this may be less useful since a process to be executed is frequently known and fixed. For example, it is usually not acceptable for an AI (artificial intelligence) planner to automatically change the model of an entity, automatically build new airports for cargo planes, or change the workflow without approval.

Standard planning methodologies rarely address items 4 and 5 above. At the same time, most of planning uncertainty is related to optimal parameter selection. Furthermore, while certain entities are less flexible about the structure of their processes, it is more practical to experiment with and modify process parameters.

Item 3 is usually addressed via scheduling methods and discussed here since action durations may, in embodiments, depend on the selections for items 4 and 5.

9.1. Plan Learning

Traditional planning methods assume that the world model is fully known. For instance, in traditional planning the preconditions and effects of all procedures must be manually specified. However, in practice the world model is rarely known and too complex to be manually specified with all relevant nuances. Furthermore, manual specification is labor intensive and may require months of work making it impossible for some to react to rapidly changing conditions.

Also, traditional planning does not specify how optimal action parameters could be learned, which is address by embodiments herein.

Unfortunately, supervised machine learning is in general not suitable to learn plans. Supervised machine learning requires that the expected result is known. While in prediction, the expected result is a future world state—which may be easily obtained from historic data, in planning, the expected result is an optimal plan. In general, the optimal plan is not known. In addition, minor changes to plans may result in large changes in world states, making it more difficult to properly credit approximation error. In other words, unlike a prediction function, a planning function is much less smooth and may not be easily approximated.

One solution is the use of reinforcement learning discussed in section 9.3. Instead of expected function outputs, reinforcement learning embodiments use the definition of a utility function discussed next.

9.2. Utility Functions

In one or more embodiments, a utility function assigns a utility value to a world state. As discussed in Section 7.7, the goal state may be specified via a utility function.

If the goal is to reach a specific world state $g$, the utility of a state $s$ may be defined as the inverse of the distance between $g$ and $s$. Thus, the utility may be maximized when the goal state is reached. Note that "distance" is not necessarily the vector distance and may be some estimate of the cost to reach $g$ from $s$ (e.g., a measure like path length).

However, utility functions may also be used to maximize (or minimize) a more general objective. Common objectives have been discussed in Section 2. This section provides an overview on how utility functions may be specified for some of these objectives.

As discussed in Section 7.5, the world state may be based on the values of object properties. Thus, all objectives are expressed as a function of object properties. In fact, in embodiments, only one object property is required to express any objective.

In one or more embodiments, the following general methodology may be used to define a utility function:
1. define a utility object;
2. add a utility property to the utility object;
3. add a utility procedure that measures or computes the value of the utility property; and
4. use the executor discussed in Section 4 and one or more of the methods discussed in Section 8 to learn the effect of the utility procedure on the utility property.

As discussed in Section 7.6, anything may be considered as an object. While not always necessary, this allows definition of a utility object to represent the utility function. The utility property of this object may represent the output of the utility function.

Since the world state vector may be computed from object properties as discussed in Section 7.8, one element of the world state vector is equal to the utility value.

In one or more embodiments, the utility is computed by the utility procedure. The computation may involve manually specified expressions that are evaluated by the executor discussed in Section 4 or prediction discussed in Section 8. The computation may depend on other object properties that may be provided as arguments to the utility procedure. If necessary or desired, the other object properties may be predicted as well.

The utility procedure will typically be the last procedure in a process and may depend on the completion of all other procedures. Thus, methodology 8.7, which predicts the effect of a plan, may be used to predict the expected utility of executing the plan.

In one or more embodiments, if all property values are known or measured, the executor is able to directly compute the utility of the plan without any prediction.

Frequently, the objective involves an aggregate value over a time period. For example, the goal may be to increase production rate or maximize weekly sales. Usually, these goals measure the sum or average of a set of property values, but other metrics, such as standard deviation, are possible. Other objectives may involve the evaluation of even more complex expressions.

In one or more embodiments, general objective expressions are evaluated by the executor. For the discussion here, it may be assumed that the executor has capabilities to evaluate complex utility expressions. In one or more embodiments, the executor implements a virtual machine that carries out general computations.

In some cases, the utility may depend directly on one property of an actual object. In such cases, a separate utility object may not be introduced.

For example, if the goal is to produce a product that has a low electrical resistance, the resistance would be a property of the product object and at the same time a utility property. The value of the property for each object may be determined via a test procedure that measures resistance, which would also be the utility procedure.

9.3. Reinforcement Learning

Reinforcement learning does not require the specification of expected function outputs in the training data, and thus, it is suitable for plan learning embodiments.

In one or more embodiments, a standard reinforcement learning framework comprises the following components:
1. state space;
2. action space;
3. transition function;
4. utility function; and
5. policy.

In one or more embodiments, the state space is essentially the set of all world state vectors (i.e., outputs of methodology 7.8.2). In one or more embodiments, the action space is the set of all procedures. Note that standard reinforcement learning does not support parameterized actions, which is a major focus of certain method embodiments herein. However, some more advanced techniques can deal with action parameters.

In one or more embodiments, the transition function is equal to the world model discussed in Section 8 and learned by methodology 8.8. That is, in embodiments, given a state and an action, the transition function provides the expected future state.

Instead of requiring expected outputs during training, reinforcement learning embodiments use definition of a utility function that computes the utility of a world state. Utility function embodiments have been discussed in Section 9.2.

In one or more embodiments, a policy is learned by a reinforcement learning methodology and thus is the output of machine learning. A standard reinforcement learning policy is typically a function that returns an action given a world state. In general, a standard reinforcement learning agent may continuously invoke the policy to obtain the next action in a given world state. Methodology 9.3 summarizes the behavior of a standard reinforcement learning agent according to embodiments of the present disclosure. The input vector s is the initial world state.

Methodology 9.3:

```
runStandardAgent(policy, s) {
    repeat until goal is reached {
        next_action = policy(s)
        execute(next_action)
        s = updated world state after action execution
    }
}
```

The standard agent methodology shown above executes one action at a time. If the policy is optimal, the agent is expected to maximize the output of the utility function.

Usually, a standard reinforcement learning methodology will attempt to maximize the expected cumulative future output of the utility function.

Reinforcement learning methodologies are typically categorized as follows:
- model-free
  - policy iteration
  - value iteration
- model-based Table 9.3 provides a comparison of the methodologies based on what components specified above are learned. Reinforcement learning methodologies typically require the manual specification of the state space (component 1) and the action space (component 2).

TABLE 9.3

Comparison of reinforcement learning methodologies.

| Learning Methodology | Learns Transition Function (3) | Learns Utility Function (4) | Learns Policy (5) |
|---|---|---|---|
| Policy Iteration | no | no | yes |
| Model-free Value Iteration | no | yes | yes |
| Model-based | yes | yes | yes |

Generally, the model-free versions do not learn or make use of a transition function. Policy iteration essentially learns the policy directly (component 5 only). In general, policy iteration does not learn state utilities and typically requires that the utility function is manually specified and can be evaluated for all states.

Model-free value iteration learns both the policy and the utility function (components 4 and 5). More specifically, value iteration may learn to predict the value of the utility property discussed in Section 9.2. Unlike policy iteration, value iteration learns a limited world model to the extent that it can predict the utility property and thus is strictly speaking not completely model-free. Despite this fact, value iteration is frequently advertised as model-free since it learns no other aspect of the world model.

The policy learned by value iteration returns the action that leads to the next state with maximum predicted utility. Thus, value iteration first predicts the utility of executing each candidate from a set of actions and then picks the candidate associated with maximum predicted utility.

There are also model-based variations of value iteration, but most popular methodologies implement the model-free variant.

In general, model-based reinforcement learning learns the policy, the utility function, and the transition function (components 3, 4, and 5). Thus, model-based reinforcement learning learns a full world model.

The methods discussed in this document use model-based reinforcement learning, which is further discussed in section 9.4.

9.4. Model-Based Reinforcement Learning

Model-based reinforcement learning is one of the most powerful reinforcement learning methodologies since it can learn a full world model.

Method embodiments discussed here may use the same world model for both prediction and planning Thus, as discussed in Section 8, the world model may be represented with a set of neural networks or neural fields. Methodology 8.8 is used to learn the world model according to embodiments of the present disclosure.

The world model may be learned via supervised machine learning using standard neural network learning methodologies or a neural field learning methodology embodiments. While the world model may be learned via supervised machine learning, the entire planning framework may be based on reinforcement. In one or more embodiments, the world model itself does not provide a plan. Additional steps that use the utility function may be employed to compute a plan. Moreover, in one or more embodiments, plan learning does not require expected plan outputs for learning but uses the utility function following a reinforcement learning paradigm.

Methodology 8.8 learns both the transition function and utility function (components 3 and 4 in section 9.3) according to embodiments of the present disclosure. In one or more embodiments, the utility function is automatically learned, since its output is represented by a utility property and property effect prediction is learned by methodology 8.2.1, which is a subroutine of methodology 8.8.

While the world model may be used in a straightforward way for prediction, planning involves using the world model in the reverse direction. For instance, in planning the goal is known and the methodology seeks to find appropriate parameter inputs to achieve the goal.

Methodology embodiments used to produce a plan from a world model learned for prediction are discussed in detail in Section 10.

9.5. Learning to Plan with Model-Based Policies

Standard reinforcement learning learns a policy for a fixed goal. Since each plan has a different goal, standard reinforcement learning learns one plan. If the goal changes, the reinforcement learning methodology must be repeated.

Embodiment disclosed herein can produce a plan given both an initial world state and a goal state. In one or more embodiments, the same world model may be used to produce distinct plans with different goals; no additional learning is required to account for changes in the goal. This result is possible since the embodiments discussed here learn a full world model, which is agnostic to plan goals.

In one or more embodiments, the policy learned by the reinforcement learning methodologies discussed here is a "model-based policy." Essentially, in one or more embodiments, the policy applies the world model in the inverse direction to generate a plan.

Thus, unlike standard reinforcement learning methodologies, the method embodiments discussed here learn to plan, i.e., are able to produce many different plans given one world model. Thus, with the reinforcement learning methodology embodiments discussed here, re-planning in changing conditions does not require re-learning and is very fast.

More specifically, in one or more embodiments, the policy learned by the reinforcement learning methodology embodiments return a full plan given both an initial world state and a goal state. As a consequence, in one or more embodiments, methodology 9.3 is not used by agents to use the policies learned by the method embodiments discussed herein. Instead, an agent may use an embodiment as depicted in methodology 9.5.

The methodology 9.5 embodiment uses periodic re-planning to account for changing conditions during the execution of the plan according to embodiments of the present disclosure. Also, re-planning can correct issues that arise during the execution of the plan. Alternatively, the entire plan may be executed in one iteration of the loop.

$\underline{s}$ is the initial world state and $\underline{g}$ is the goal state. The constraints are discussed in more detail in Section 9.6.

Methodology 9.5:

```
runAgentWithGoal(policy, s, g, constraints) {
    repeat until goal g is reached {
        plan = policy(s, g, constraints)
        execute one or more steps of the plan
        s = updated world state after partial plan execution
        if necessary update constraints given the new state s
    }
}
```

Figure 9:
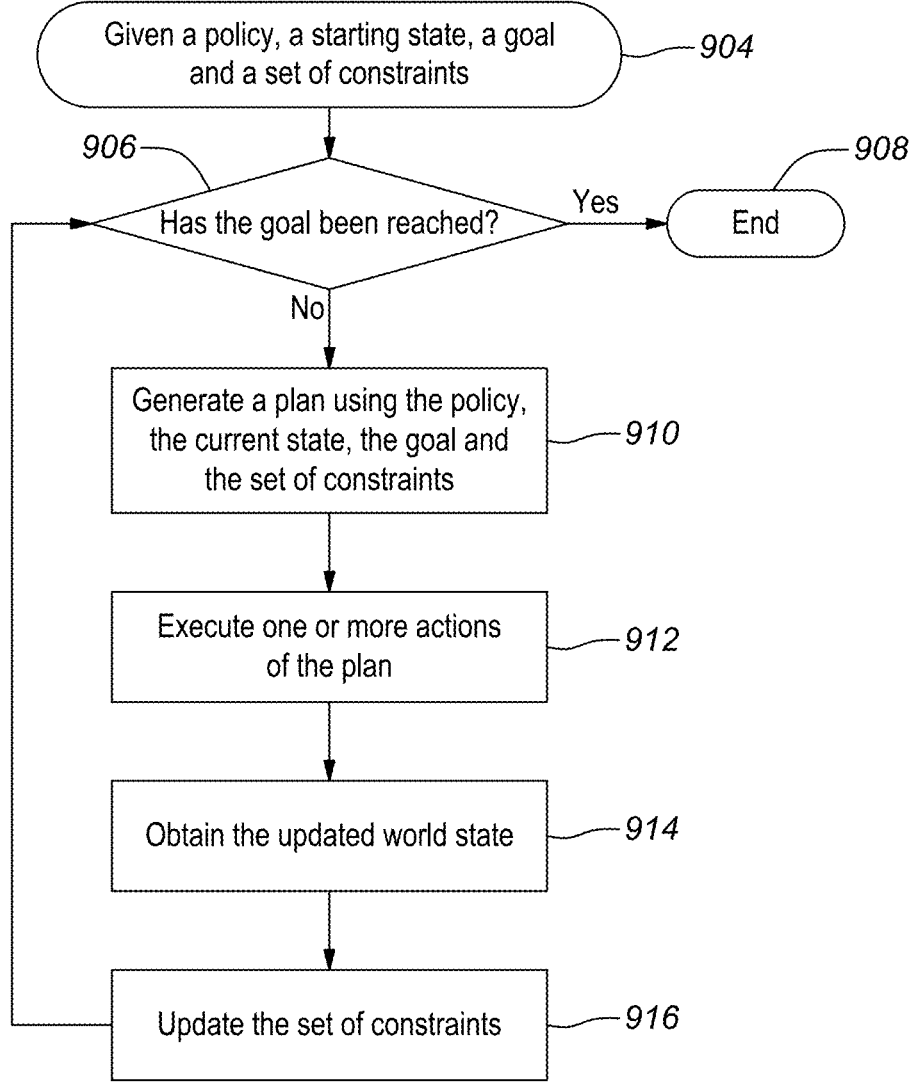
FIG. 9 depicts a flowchart implementation of methodology 9.5, according to embodiments of the present disclosure.

FIG. 9 depicts a flowchart implementation (steps 904-916) of methodology 9.5, according to embodiments of the present disclosure 9.6. Plans As discussed in Section 9.5, the policies learned by embodiments discussed herein return an entire plan. Each plan may comprise a set of actions.

As discussed in Section 7.3, each action typically comprises the following components:
1. specification of procedure;
2. (planned) start time;
3. (planned) end time;
4. object assignments to each object parameter; and
5. value assignments to each control parameter.

As mentioned in previous sections, certain method embodiments focus on items 4 and 5, above. Item 1 is given by the specification of the plan, i.e., the procedure to be executed is fixed. Items 2 and 3 use action scheduling. While a full plan has scheduling, scheduling is not a focus here. In embodiments, either a scheduling methodology is used or actions are executed as soon as all of their dependencies have completed.

In one or more embodiments, action control parameters have a numeric type or may be converted into a number. Control parameters may control certain aspects of action execution, and may include parameters such as temperature, rotations per minute, error tolerance, and so on. For each action, the control parameters of the action may be represented via a vector $\theta$.

In one or more embodiments, the methods described herein may be used to guide the selection of objects assigned to an action. As shown in methodology 7.8.2 all parameters, including both object and control parameters, may be converted into an action parameter vector $x$. In one or more embodiments, the part of $x$ that represents the objects, i.e., excluding $\theta$, comprise property values of the objects assigned to the action. In fact, in one or more embodiments, this part of $x$ represents the relevant world state $s$, i.e. $x=[s, \theta]$.

In one or more embodiments, each element of $s$ corresponds to a property of an object assigned to the action. By specifying values for $s$, desired or required property values for assigned objects may be specified. This may be used to select objects for assignment that match or are similar to the specified value.

For example, consider an action that attaches a capacitor to a piece of electronics. The capacitor would be an object assigned to the action. The capacitance is a property of the capacitor and is thus represented by some element of $s$, e.g., $s[i]$. By specifying a value for $s[i]$, the plan may require a certain capacitance. Given an inventory of capacitors with various capacitances, the value specified by $s[i]$ may be used to choose a capacitor with the prescribed capacitance or the next closest capacitor available.

The specification of desired object properties can be used to experiment with the assignment of objects with different properties and find the optimal assignment. In the example above, given training data of capacitor assignments with various capacitances, the planner can learn the optimal capacitance that maximizes the final utility. Moreover, the planner can learn a relationship between the optimal capacitance and other properties. For example, the optimal capacitance may depend on the resistance of some other component of the electronics. The planner may then choose the optimal capacitance based on the choice for the other component.

In one or more embodiments, the assigned object parameters and control parameters of each action are represented by a joint action parameter vector $x$, which essentially specifies both items 4 and 5 above. In one or more embodiments. a complete plan specifies a full parameter vector for each action of the plan.

Since the procedure is given and scheduling is not addressed, a plan essentially comprises a set of parameters vectors $\{x_a\}$, where $x_a$ is the parameter vector of action a.

A partial plan may specify the values of some elements of each parameter vector, leaving only a subset unspecified. In one or more embodiments, the planner completes the plan by selecting optimal values for the unspecified values.

In one or more embodiments, the specified part of the partial plan are constraints to the planner. These constraints may be represented by the plan constraints parameter in methodology 9.5. In one or more embodiments, the planner tries to obey the constraints while finding optimal values for the unspecified part of the partial plan.

In one or more embodiments, given a partial plan, an initial state, and a goal, a policy returns a completed plan given an initial state and a goal. Since, a main component of a plan is the set of action parameter vectors, the policy essentially returns a set of vectors $\{x_a\}$ for each action a. A partial plan may already contain this set and the policy methodology fills in missing values.

10. MODEL-BASED POLICY LEARNING

As discussed in Section 9.4, a world model learned by methodology 8.8 may be used to produce plans. This chapter discusses embodiments of how a plan to execute a process is computed given a world model, an initial state, a goal, and a partial plan with constraints. Thus, this section discusses embodiments of the policy component.

10.1. Deep Argmax Function

In one or more embodiments, an optimal policy tries to maximize the utility function discussed in Section 9.2. The utility function may be learned as part of the world model. The output of the utility function may be represented by a utility property of an object. The utility property is affected by a utility procedure. In one or more embodiments, the world model comprises a neural network or neural field that predicts the effect of the utility procedure on the utility property. Let $u(x)$ be the function learned by this neural network or neural field. Essentially, $u(x)$ is the learned utility function (component 4 in Section 9.3).

In one or more embodiments, an optimal policy tries to maximize $u(x)$. This may be achieved by finding an input $x$ that produces a maximum output. Thus, in one or more embodiments, the optimal policy computes argmax $\{x\}(u(x))$.

Since $u(x)$ is represented by a neural network or a neural field, the problem becomes finding the argmax of a neural network or neural field. Since multi-layer neural networks and neural fields are typically "deep" (i.e., highly non-linear)

function approximators, this problem may be referred to herein as the "Deep Argmax."

10.2. Deep Argmax with Constraints

As discussed in Section 9.6, the planner may be required to satisfy plan constraints specified in a partial plan. The constraints may specify known property values or restrictions on plan effects.

Thus, in one or more embodiments, the Deep Argmax may be computed subject to a set of constraints C. For instance, instead of finding just any input vector $\underline{x}$ that maximizes the output of the neural network or neural field, the input vector $\underline{x}$ is required to also satisfy the constraints in C. The constraints may exclude the unconstraint argmax, such that the maximum achievable utility may be reduced due to the constraints.

Typical constraints may require that some elements of $\underline{x}$ are equal to specific values. However, method embodiments discussed here support more general inequality constraints that require elements of $\underline{x}$ to be within a certain range or be larger or less than certain values.

This section assumes the existence a function deepArgmax(net, constraints) or alternatively deepArgmax(field, constraints) that computes the argmax of a neural network or neural field, respectively, subject to the constraints. The implementation of the Deep Argmax function is discussed in the following sections. This section discusses embodiments of how the Deep Argmax is used in planning

10.3. Inverse Function

Another problem in planning is to ensure that a specific effect is achieved. As discussed in Section 8.1, each effect γ of a procedure P may be represented by a function $h_{P\gamma}$ that may be learned by a neural network or neural field. In one or more embodiments, requiring that a specific effect is achieved requires that $h_{P\gamma}(\underline{x})=y$, where y is the desired value of the effect and $\underline{x}$ is the function input.

Thus, this problem involves inverting a neural network or neural field. For instance, given a desired output the method seeks to find an input that causes the neural network or neural field to produce the desired output.

In one or more embodiments, this is achieved via the "Inverse" function. Given a desired value y, inverse(net, y) returns the neural network input vector $\underline{x}$ such that net (inverse(net, y))=net($\underline{x}$)=y. Similarly, inverse(field, y) inverts a neural field.

In general, a small error c is acceptable. Thus, in one or more embodiments, the requirement for the inverse is:

⇒$h_{P\gamma}(\underline{x})=y\pm\varepsilon$
⇒$h_{P\gamma}(\underline{x})-y=\pm\varepsilon$
⇒$-\varepsilon \leq h_{P\gamma}(\underline{x})-y \leq +\varepsilon$ The inverse value y may be identified via optimization by minimizing ε. In one or more embodiments, if ε is optimized to be zero, $h_{P\gamma}(\underline{x})$ must be equal to y since both the left and right hand of the constraint above are zero.

Minimizing ε is the same as maximizing -ε. Thus, if the utility function is defined as u($\underline{x}$)=-ε, the inverse may be computed via a Deep Argmax with constraints.

In one or more embodiments, three constraints are specified to use the Deep Argmax with u($\underline{x}$) as defined above:

$\varepsilon \geq 0$
$h_{P\gamma}(\underline{x})-y \geq -\varepsilon$
$h_{P\gamma}(\underline{x})-y \leq +\varepsilon$ With the constraints above, the argmax $\underline{x}$ produces the desired y when provided as input to the neural network or neural field.

In general, it may not be possible to find an inverse with zero error. In such a case, the Deep Argmax will minimize the error, i.e. find the best possible inverse.

In one or more embodiments, the inverse may not be unique, i.e., more than one $\underline{x}$ may produce the desired output y. In such a case, the Deep Argmax will return any or all feasible $\underline{x}$ that produce y.

10.4. Inverse of Multiple Effects

In one or more embodiments, a procedure may have more than one effect. Some planning problems may place simultaneous requirements on more than one effect of a procedure. Each effect may be represented by a distinct neural network or neural field. Thus, this problem involves the simultaneous inverse of a set of neural networks or neural fields. Note that, in embodiments, all neural networks and neural fields in the set receive the same input vector $\underline{x}$.

Let $H_P$ be a family of functions that represents all effects of procedure P. In one or more embodiments, $H_P$ comprises all functions $h_{P\gamma}$ for a every effect γ of the procedure P. Now, the desired values for all effects may be represented by a vector $\underline{y}$ that has an element for each effect. Following the derivation in Section 10.3, the multiple effect inverse involves:

⇒$H_P(\underline{x})=\underline{y}\pm\varepsilon$

⇒$-\varepsilon \leq H_P(\underline{x})-\underline{y} \leq +\varepsilon$

⇒$-\varepsilon \leq (h_{P0}(\underline{x})-\underline{y}[0])+ \ldots +(h_{P\gamma}(\underline{x})-\underline{y}[\gamma])+ \ldots +(h_{Pn}(\underline{x})-\underline{y}[n]) \leq +\varepsilon$ The last step above replaces $H_P$ with its component functions. The procedure is assumed to have n effects that require inversion.

Thus, the multiple effect inverse may also be computed with the Deep Argmax with constraints. As discussed in Section 10.3, the utility function to be maximized is still u($\underline{x}$)=-ε.

However, the multiple effect inverse may involve additional constraints. The following constraints may be specified:

$\varepsilon \geq 0$
$h_{P0}(\underline{x})-\underline{y}[0] \geq -\varepsilon$
$h_{P0}(\underline{x})-\underline{y}[0] \leq +\varepsilon$
. . .
$h_{P\gamma}(\underline{x})-\underline{y}[\gamma] \geq -\varepsilon$
$h_{P\gamma}(\vec{x})-\underline{y}[\gamma] \leq +\varepsilon$
. . .
$h_{Pn}(\underline{x})-\underline{y}[n] \geq -\varepsilon$
$h_{Pn}(\underline{x})-\vec{y}[n] \leq +\varepsilon$ Thus, two constraints are specified for each effect of the procedure that is to be inverted. If the total number of effects that require inversion is n, the total number of constraints is 2n+1.

Again, more details are provided when the implementation of the Deep Argmax is discussed. This section assumes the existence of a function inverse(nets[ ], $\underline{y}$, constraints) or alternatively inverse(fields[ ], $\underline{y}$, constraints) that computes the input $\underline{x}$ to an array of neural nets or an array of neural fields, respectively, that produces the desired output vector $\underline{y}$ subject to the constraints. As noted earlier, all neural networks and neural fields in the set receive the same input vector $\underline{x}$ and each produces a component of $\underline{y}$ as an output.

10.5. Process Graph Reversal

In one or more embodiments, the planning methodology presented here works backwards starting with the final procedure of a process. Typically, the final procedure is a utility procedure that provides the utility value to be maximized as one of its effects.

In one or more embodiments, this involves traversing the process graph in the reverse direction. As discussed in Section 7.1, the process graph has directed edges in the direction of execution flow. If procedure $P_2$ depends on procedure $P_1$, then there is an edge from $P_1$ to $P_2$. The methodology presented in Section 10.6 involves the reversal of all edges.

If the process graph is acyclic, all edges can be easily reversed. It should be noted that any loops may be replaced with a loop process that contains the entire loop as a sub-process. In such cases, the methods discussed here may then be recursively applied to the sub-process.

In one or more embodiments, the loop process has a control parameter that specifies the number of times the loop is iterated. Thus, during planning of the outer process, the number of iterations may be optimized. If a loop contains nested loops, the method above may be recursively repeated until an acyclic sub-process is obtained.

Once the process graph has been converted into an acyclic graph and has been reversed, it may be traversed in the reverse direction producing a queue of procedures such that procedure $P_2$ appears before procedure $P_1$ in the queue, if $P_2$ depends on $P_1$. Thus, the order of procedures in the queue is the reverse of the execution flow.

It may be assumed that the method discussed above is implemented by a function called reverseFlow(process), which provides the above queue given a process.

10.6. Plan Generation

Given a process and a partial plan with constraints, methodology 10.6 generates a complete plan according to embodiments of the present disclosure. The completed plan is returned via the updated plan parameter.

As discussed in Section 9.6, a plan comprises a set of vectors. In one or more embodiments, each k-th vector in the plan specifies both the object and control parameters of the k-th action in the plan. The k-th vector in the plan is referenced via plan[k] in methodology 10.6. The expression plan[k][y] refers to the y-th entry in the parameter vector plan[k], or in other words the entry that represents the property y.

If the plan is applied in the forward direction, plan[k+1] and subsequent vectors contain the effects of procedure $P_k$.

The last procedure of the plan may be assumed to be the utility procedure $P_u$. The utility value is an output of the utility procedure. The neural network or neural field that predicts the final utility value is called $h_{P_u}$.

In one or more embodiments, methodology 10.6 first computes the argmax of the utility function $h_{P_u}$.

Methodology 10.6 merges the result of the argmax into the parameter vector of the utility procedure specified by the partial plan. This updates any unspecified object and control parameters for $P_u$.

Next, methodology 10.6 moves backwards towards the first procedure in the process. This part of the methodology ensures that the parameter requirements for the next procedure (k+1) in the plan are satisfied. In one or more embodiments, the requirements for procedure k+1 are computed by the previous iteration of the loop or are equal to the parameter vector of $P_u$ during the first iteration.

The above may be achieved by inverting the set of neural networks or neural fields that represent all effects of procedure k, i.e. $H_k$. This makes use of the multi-effect inverse discussed in Section 10.4. In one or more embodiments, the results of the multi-effect inverse are merged into the parameter vector of the k-th procedure. This updates all unspecified object and control parameters of $P_k$.

In one or more embodiments, constraints are obtained from the current plan during each step. Thus, as the plan is updated during each iteration of the loop, additional constraints may be added, or existing constraints may change.

In one or more embodiments, when the methodology returns, all parameter vectors in the plan have been fully specified.

Methodology 10.6:

```
generatePlan(process, plan) {
    Q = reverseFlow(process)
    P_u = pop Q
    x = deepArgmax(h_{P_u}, constraints from plan)
    merge x into plan[u]
    while Q is not empty {
        P_k = pop Q
        for each effect γ of P_k with a value specified in plan[k+1] {
            y[γ] = plan[k+1][γ]
        }
        x = inverse(H_P, y, constraints from plan)
        merge x into plan[k]
    }
}
```

It should be noted that the embodiment of methodology 10.6 depicted above does not address scheduling of actions, which may be performed after or during plan generation.

Methodology 9.5 may be used to execute the plan produced by methodology 10.6. The k-th parameter vector in the plan specifies both object and control parameters of the k-th action. In one or more embodiments, control parameters are directly supplied to the action. The object parameters may be used to make appropriate object assignments that satisfy the object parameters. Thus, the object parameters may be used as a template to find appropriate objects to be assigned.

Once all assignments have been finalized, the parameter vector of an action may be updated with actual values. For example, the actually assigned object may have somewhat different property values than the values specified in the plan if a perfect match could not be made.

Figure 10B:
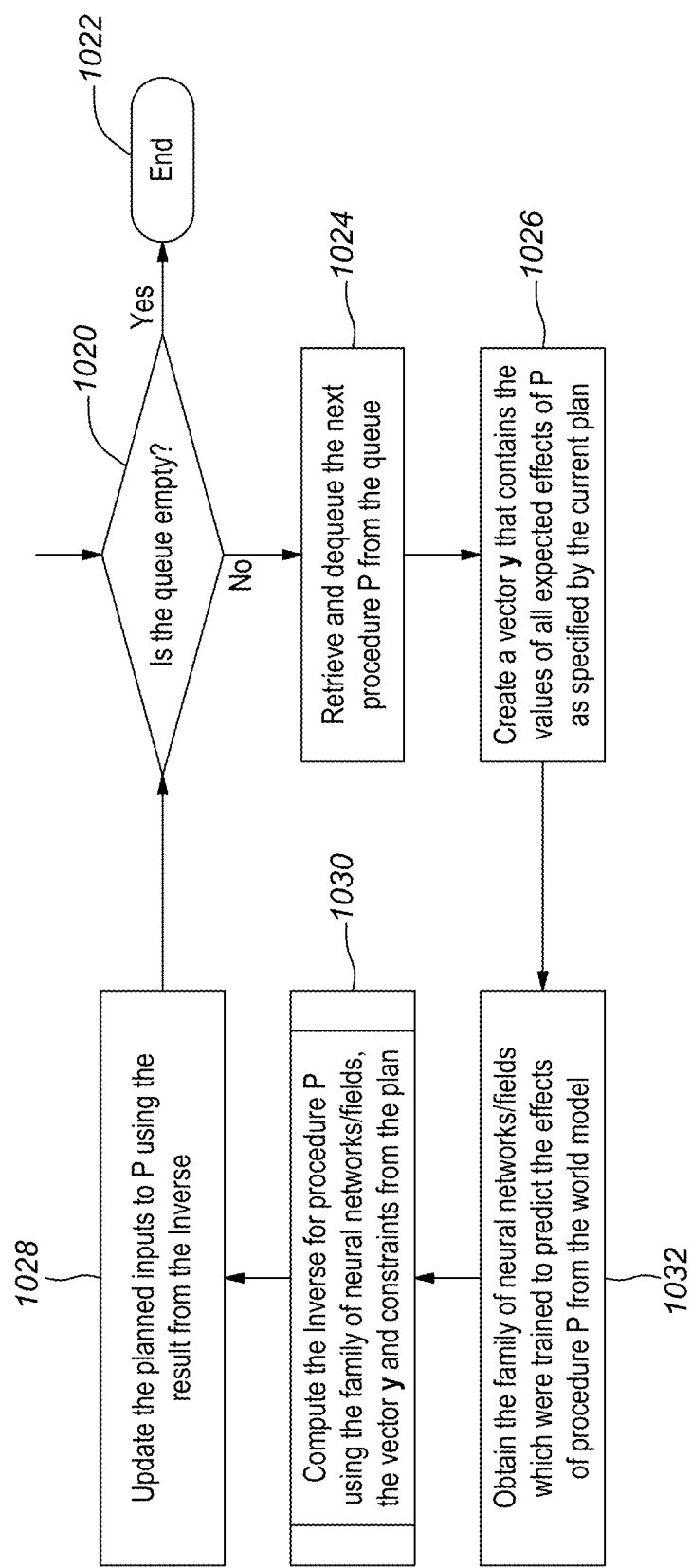

FIGS. 10A & 10B depict a flowchart implementation (steps 1004-1032) of methodology 10.6, according to embodiments of the present disclosure.

Since processes are represented as graphs, the methodologies presented in Sections 8, 9, and 10 provide a method to do model-based reinforcement learning using graphs as mentioned in Section 3.6.

11. Neural Networks

As explained in Section 8, neural networks may be used to learn the world model. In fact, at its core the world model comprises a set of neural networks (or alternatively neural fields). Each neural network learns to predict a variable of interest in the world.

As discussed in Section 9 and 10, a world model learned for prediction may also be used for planning Thus, neural networks may also be important for planning. This section discusses and analyzes neural networks in general. Using the insights from this section, the next section introduces the Deep Argmax for neural networks.

11.1. Definition

A neural network is a general function approximator. Given some function f and an input vector of function parameters $\underline{x}$, let $y=f(\underline{x})$ be the function output. Assuming f is a reasonably well-behaved function, a neural network may be trained to approximate f, such that net($\underline{x}$)≈f($\underline{x}$) for any $\underline{x}$ within some domain Neural networks both learn and compactly represent an unknown function f.

Neural networks may be trained via supervised machine learning using training examples that comprise both the input vector $\underline{x}$ and the corresponding function output y. The learned function may be a continuous function approximator or a classifier, i.e., map the input $\underline{x}$ to some integer class.

The methods introduced in this document are compatible with all widely available neural network training methods, such as back-propagation, genetic algorithms, or other methodologies.

A standard neural network comprises several layers of neurons. Each neuron is associated with one weight vector ($\underline{w}$). The neurons of a neural network perform the following computation:

$$\text{neuron}(\underline{x}) = g(\underline{w}^* \underline{x})$$

where
$\underline{x}$ is the augmented input vector
$\underline{w}$ is the weight vector of the neuron
g is a squashing function For simplicity, the example methods discussed here use augmented vectors to deal with bias weights. In general, other techniques to represent bias may be used and are compatible with the methods discussed here.

In one or more embodiments, the augmented input vector has a constant 1 appended to it as the last element, which is the "bias input." For instance, if $\underline{x}_{data}$ is the raw input vector from the data, then the augmented input vector is:

$$\underline{x} = [\underline{x}_{data}, 1]$$

In one or more embodiments, the weight vector $\underline{w}$ has one weight for each element of $\underline{x}$. The last weight is the bias weight.

In one or more embodiments, the squashing function g is a monotonic function that limits the range of the neuron output. Some common choices for g include:
hyperbolic tangent
logistics function
linear rectifier (max(0, $\underline{w}^*\underline{x}$))
step function (if $\underline{w}^*\underline{x}$>0, return 1, else return -1)

Other choices are possible and the discussion here applies to any choice of g. Typically the output range of the neuron is limited to be between -1 and +1, or between 0 and +1, or is only limited on one side such as with the rectifier (larger than 0).

In one or more embodiments, the weight vectors of all neurons in one layer may be represented via one weight matrix W. The i-th row of W is equal to the transpose of the weight vector of the i-th neuron in the layer. W has one additional bias row. Thus, if the layer has n neurons, W has n+1 rows. The bias row comprises zeroes for all elements, except for the final bias weight, which is 1. W has the same number of columns as the number of neurons weights, including the bias weight.

For example, if a layer has 2 neurons and each neuron has 4 weights, the weight matrix W would be:

$$[w_{00}, w_{01}, w_{02}, b_0]$$

$$W = [w_{10}, w_{11}, w_{12}, b_1]$$

$$[0, 0, 0, 1]$$

$w_{00}$ is the first weight of the first neuron, $w_{01}$ is the second weight of the first neuron, and so on. $b_0$ is the bias weight of the first neuron.

Now, the computation of an entire layer of neurons may be summarized via a matrix-vector multiplication:

$$\text{layer}(\underline{x}) = g(W^*\underline{x})$$

The squashing function g may be applied element-by-element to the vector result of the matrix-vector multiplication. For instance, if $\underline{y} = W^*\underline{x}$, then $$g(\underline{y}) = [g(\underline{y}[0]), g(\underline{y}[1]), g(\underline{y}[2]), \ldots]$$

A neural network has one weight matrix $W_k$ for each layer k. Methodology 11.1 defines the computation of an entire neural network given an input $\underline{x}$ according to embodiments of the present disclosure.

Methodology 11.1:

```
net(x) {
    x = [ x, 1 ] // bias augmentation
    for each layer k of the neural network {
        x = g(W_k * x)
    }
    return x
}
```

Thus, the input to each layer is the output of the previous layer. The input to the first layer is the augmented input of the neural network. The output of the last layer is the output of the neural network.

11.2. Neurons are Local Linear Function Approximators

Figure 11:
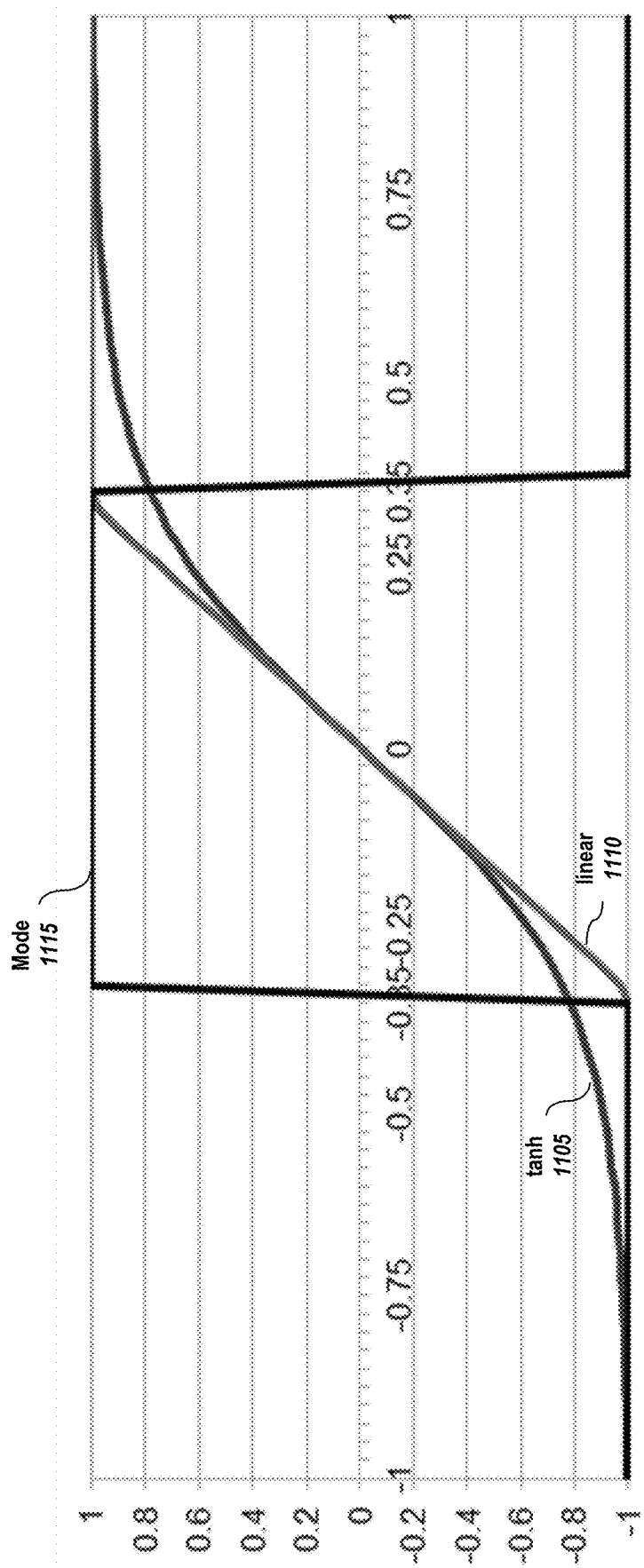
FIG. 11 illustrates outputs of a one-dimensional neuron, according to embodiments of the present disclosure.

Without the squashing function, each neuron essentially computes a linear function. A key to understanding neurons is that the squashing function not only limits the range of the neurons but also the domain over which the neuron provides a linear approximation. FIG. 11 illustrates outputs of a one-dimensional neuron, according to embodiments of the present disclosure.

The tanh curve 1105 is the output of the neuron. For illustration purposes, the neuron in FIG. 11 uses the hyperbolic tangent as the squashing function, but the discussion here applies to all squashing functions. The linear graph 1110 is a linear approximation to the output of the neuron. The mode line 1115 segments the output into three distinct modes of the neuron.

As can be seen in FIG. 11, over the domain of the input (the x-axis) the neuron is one of three modes:
1. roughly negative constant (if x<-0.33)
2. approximately linear (if -0.33≤x≤0.33)
3. roughly positive constant (if x>0.33)

The linear approximation is almost exact near the origin. Far from the origin, the neuron output is constant for all practical purposes. The neuron smoothly transitions from one mode to the next around the two mode boundaries.

Thus, within a local domain a single neuron provides a linear function approximation. Outside of this domain, the output of the neuron is roughly constant. A neuron provides no useful contribution to the neural network output outside of its domain, since its output is roughly constant. A neuron is useful within its linear mode.

Thus, a neuron may be considered active within its local domain and inactive outside of this domain.

The analysis above in one dimension extends to higher dimensions. Thus, the output of a neuron may be approximated with one of three expressions depending on the mode of the neuron:
1. neuron($\underline{x}$)=-c if $\underline{w}^*\underline{x} \leq -\lambda$
2. neuron($\underline{x}$)=$\underline{w}^*\underline{x}$ if $-\lambda < \underline{w}^*\underline{x} < \lambda$
3. neuron($\underline{x}$)=+c if $\underline{w}^*\underline{x} \geq \lambda$ $\lambda$ is a threshold value for the mode boundaries. c is a constant.

11.3. Neural Networks are Piecewise Linear Function Approximators

Many complex functions may be approximated via piecewise linear approximation. While the entire function may be complex, many functions tend to be almost linear within a small neighborhood around a point. In one or more embodiments, the function may be approximated by a tangent hyperplane within this neighborhood, which is essentially a linear approximation.

The entire complex function may be approximated with a set of linear functions. Each linear function in the set covers one small piece of the domain of the larger complex function.

As shown in Section 11.2, each neuron of a neural network is a local linear function approximator over some small domain Taken together, the entire neural network is a piecewise linear function approximator.

In one or more embodiments, within the domain of each approximated function piece, each neuron is either active or inactive. The linear approximation for the piece is essentially the linear combination of all active neurons.

If a neural network has N neurons, then there are $2^N$ possible combinations of active and inactive neurons. Thus, in principal, a neural network may represent up to $2^N$ distinct piecewise linear approximations. The power of a multi-layer neural network derives to a significant extent from its ability to combine an exponential number of piecewise linear approximations. This allows a neural network to learn a good approximation to a wide range of functions.

In practice, neurons with standard squashing functions, such as the hyperbolic tangent, have 2 inactive modes (negative and positive constant). Thus, for these neural networks there is actually a total of $3^N$ possible combinations of modes. However, the 2 inactive modes differ only by a constant and thus provide the same approximation shifted by a constant.

The next sections introduce modulated and effective weights, which further clarify how a neural network acts a piecewise linear function approximator.

11.4. Modulated Weights

For the analysis in this section, it is not important which squashing function is used. The important feature of any squashing function is that it restricts the active domain of the neuron over which it provides a linear approximation. Ideally, the computation of a neural network is expressed independent of the squashing function. This section introduces weight modulation which allows elimination of squashing functions.

In one or more embodiments, while the weights of a standard neural network are constant, a modulated weight is variable and depends on the input. Given an input $\underline{x}$, a modulated weight vector may be denoted by $\underline{\omega}(\underline{x})$. The value of the weight vector changes depending on the input.

A neuron is active if the input $\underline{x}$ is within its local domain. The modulated weights of an active neuron are equal to its standard weights. If the neuron is inactive, i.e. $\underline{x}$ is outside the local domain, the neuron outputs a constant. Thus, the modulated weights are zero, except for the inactive bias which is equal to the constant.

As an example, for a neuron with the hyperbolic tangent squashing function, a modulated weight vector may be defined for each of its 3 modes as follows:

1. $\underline{\omega}(\underline{x}) = [0, -c]$ if $\underline{w}^*\underline{x} \leq -\lambda$
2. $\underline{\omega}(\underline{x}) = \underline{w}$ if $-\lambda < \underline{w}^*\underline{x} < \lambda$
3. $\underline{\omega}(\underline{x}) = [0, +c]$ if $\underline{w}^*\underline{x} \geq \lambda$ While the above does not provide an exact match to the output of the neuron, it does capture the core behavior of the neuron. In a similar may, modulated weights may be defined for other squashing functions. Thus, modulated weights provide a uniform way to express the computation of a neuron:

$$\text{neuron}(\underline{x}) = g(\underline{w}^*\underline{x}) \approx \underline{\omega}(\underline{x})^*\underline{x}$$

The non-linearity of the neuron is captured by the variability of the modulated weight vector $\underline{\omega}$.

As discussed in Section 11.1, a layer of neurons may be represented with a weight matrix. With modulated weights, a layer of neurons may be represented with a modulated weight matrix $\Omega(\underline{x})$. The modulated weight matrix is similar to the standard weight matrix, except that its rows represent the modulated weight vectors of each neuron. The last bias row of the modulated weight matrix is identical to the bias row of the standard matrix.

With modulated weights, the computation of an entire layer of neurons becomes:

$$\text{layer}(\underline{x}) = g(W^*\underline{x}) \approx \Omega(\underline{x})^*\underline{x}$$

The computation of the entire neural network is now given by methodology 11.4.

Methodology 11.4:

```
net(x) {
    x = [ x, 1 ] // bias augmentation
    for each layer k of the neural network except the last layer {
        x = Ω_k(x) * x
    }
    x = W_last_layer * x
    return x
}
```

In the methodology 11.4 embodiment, the neurons in the last layer are assumed to be active. If an output neuron were inactive, the corresponding neural network output would just be a constant regardless of the input. Thus, in general there is little use in having inactive output neurons. As a consequence, the modulated weights of all output neurons may be assumed to be equal to their standard weights.

11.5. Effective Weights

For a given neural network input $\underline{x}$, the modulated weights of all neurons may be computed. Thus, if the input is fixed, all modulated weight matrices are constant and the loop in methodology 11.4 essentially performs a sequence of matrix multiplications. For a neural network with m layers this may be expressed via:

$$\text{net}(\underline{x}) \approx (W_m^*\Omega_{m-1}(\underline{x})^* \ldots {}^*\Omega_2(\underline{x})^*\Omega_1(\underline{x}))^*\underline{x} = E_{net}(\underline{x})^*\underline{x}$$

The matrix $E_{net}(\underline{x})$ above is the effective weight matrix of the neural network for the input $\underline{x}$. Thus, for a given input, the computation of a neural network collapses to a simple matrix-vector multiplication. This is expected since the neural network computes a piecewise linear function approximation.

In fact, the effective weight matrix $E_{net}(\underline{x})$ is identical for all input vectors $\underline{x}$ within the domain of an approximated function piece. Thus, there is exactly one effective weight matrix for each piece of the piecewise function approximation.

Sometimes it is necessary to refer to the effective weight matrix that represents all input vectors within the domain of a function piece. This may be done with the help of the mode vector $\underline{m}$. The mode vector of a neural network specifies the mode of each neuron in the neural network. For instance, $\underline{m}[i]$ specifies the mode of the i-th neuron.

Each input vector $\underline{x}$ corresponds to exactly one mode vector that specifies the mode of every neuron given the input. The mode vector is identical for all vectors $\underline{x}$ within the domain of a function piece. Thus, the effective weight matrix may also be expressed in terms of the mode vector instead of an input vector, i.e., $E_{net}(\underline{m})$ is the effective weight matrix for the combination of neuron modes specified by $\underline{m}$.

Given N neurons, a neural network can have $2^N$ effective weight matrices since it has $2^N$ combinations of active and inactive modes. For squashing functions with multiple inactive modes (such as the hyperbolic tangent), the neural network has $3^N$ effective weight matrices. However, as noted earlier, in embodiments, the difference between each inactive mode is just a constant.

In one or more embodiments, the set of all effective weight matrices of a neural network embody the piecewise linear approximation of the neural network. Each piece corresponds to one effective weight matrix, and the effective weight matrix provides the local linear approximation for the piece.

For the discussion in the next sections, it is useful to be able to compute an effective weight matrix for each layer of the neural network. Methodology 11.5.1 computes the effective weights for any layer of the neural network according to embodiments of the present disclosure. The loop proceeds in reverse direction towards the first layer and $\underline{x}$ is assumed to be augmented.

Methodology 11.5.1:

```
effectiveWeights(layer, x) {
    E = W_layer
    for k = layer - 1 down to 1 {
        E = E * Ω_k(x)
    }
    return E
}
```

Alternatively, methodology 11.5.2 computes the effective weights for a layer given a combination of neuron modes represented by the mode vector $\underline{m}$ according to embodiments of the present disclosure. Here, $\Omega_k(\underline{m})$ is the modulated weight matrix given the mode of each neuron.

Methodology 11.5.2:

```
effectiveWeightsForMode(layer, m) {
    E = W_layer
    for k = layer - 1 down to 1 {
        E = E * Ω_k(m)
    }
    return E
}
```

Figure 12B:
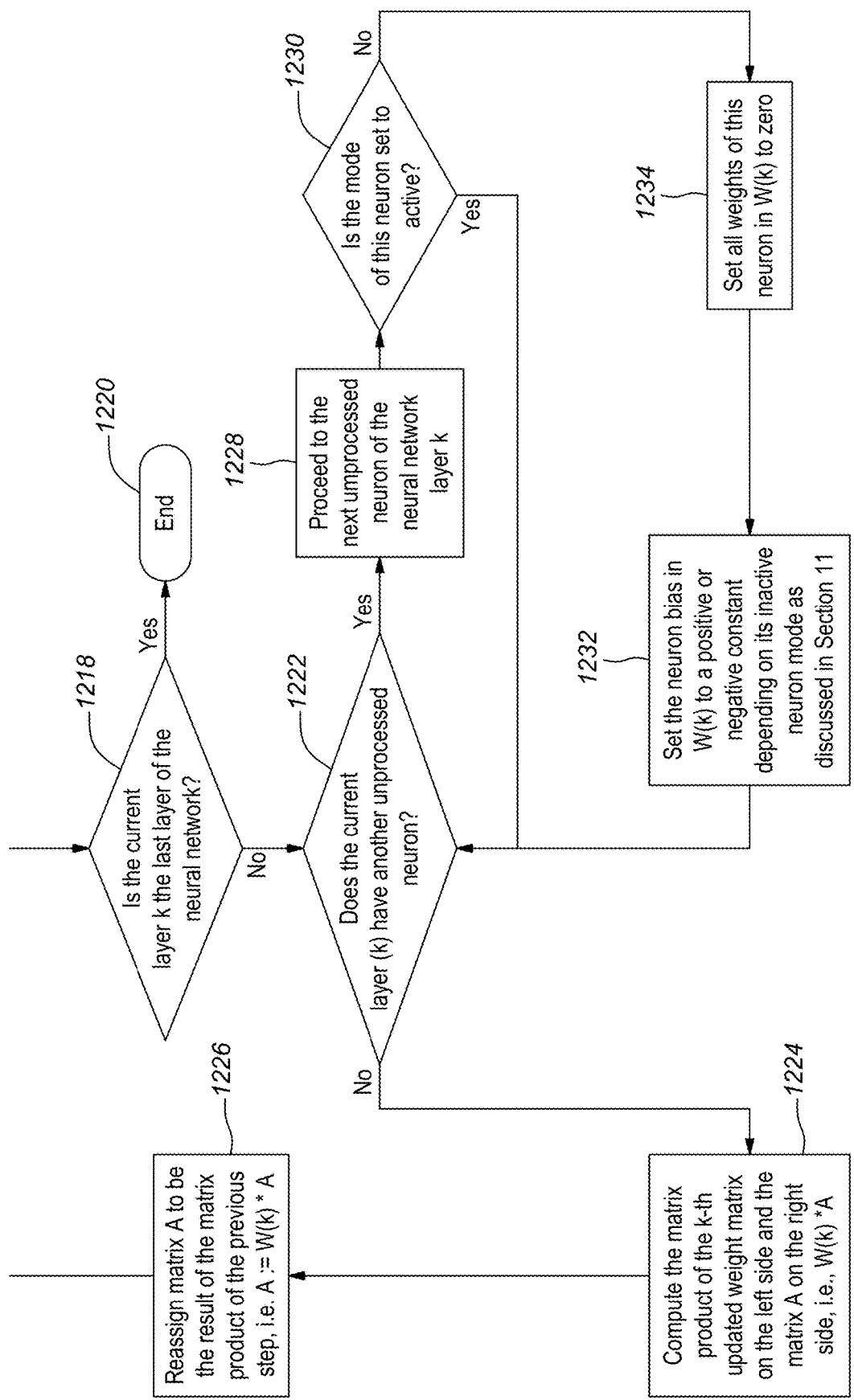

FIGS. 12A & 12B depict a flowchart implementation (steps 1204-1234) of methodology 11.5.2, according to embodiments of the present disclosure.

Finally, in one or more embodiments, methodology 11.5.3 uses methodology 11.5.1 to simplify methodology 11.4 (neural network output).

Methodology 11.5.3:

```
net(x) {
    x =[ x, 1 ] // bias augmentation
    return effectiveWeights(last_layer, x) * x
}
```

If the neural network has only one output, the effective weight matrix essentially has one row for the output, which may be expressed by an effective weight vector $\underline{e}_{net}(\underline{x})$. Now, the output of the entire neural network is just a vector dot product:

$$net(\underline{x}) = \underline{e}_{net}(\underline{x}) * \underline{x}$$

Figure 13A:
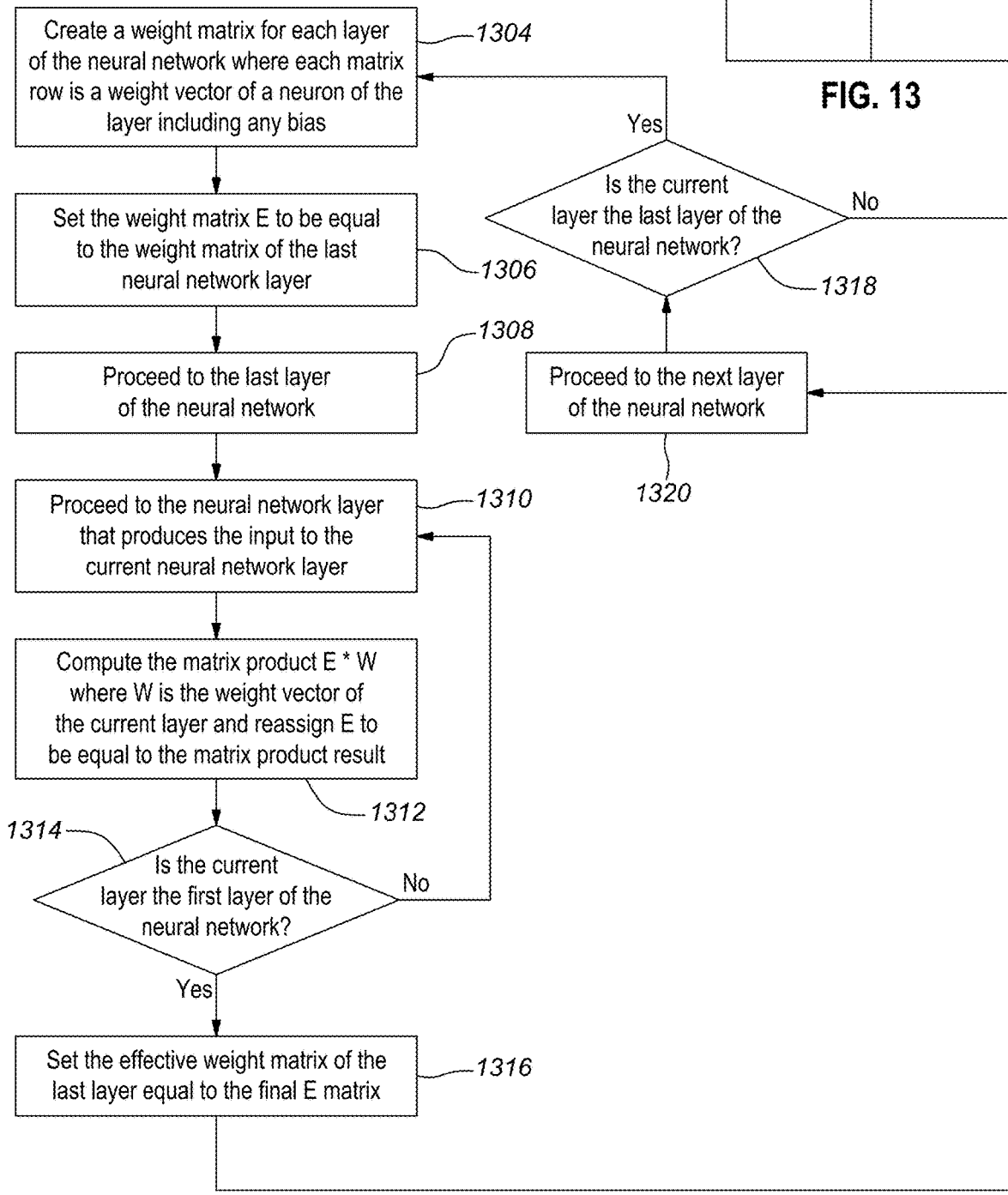
FIGS. 13A & 13B depict a flowchart implementation of methodology 11.5.3, according to embodiments of the present disclosure.
Figure 13B:
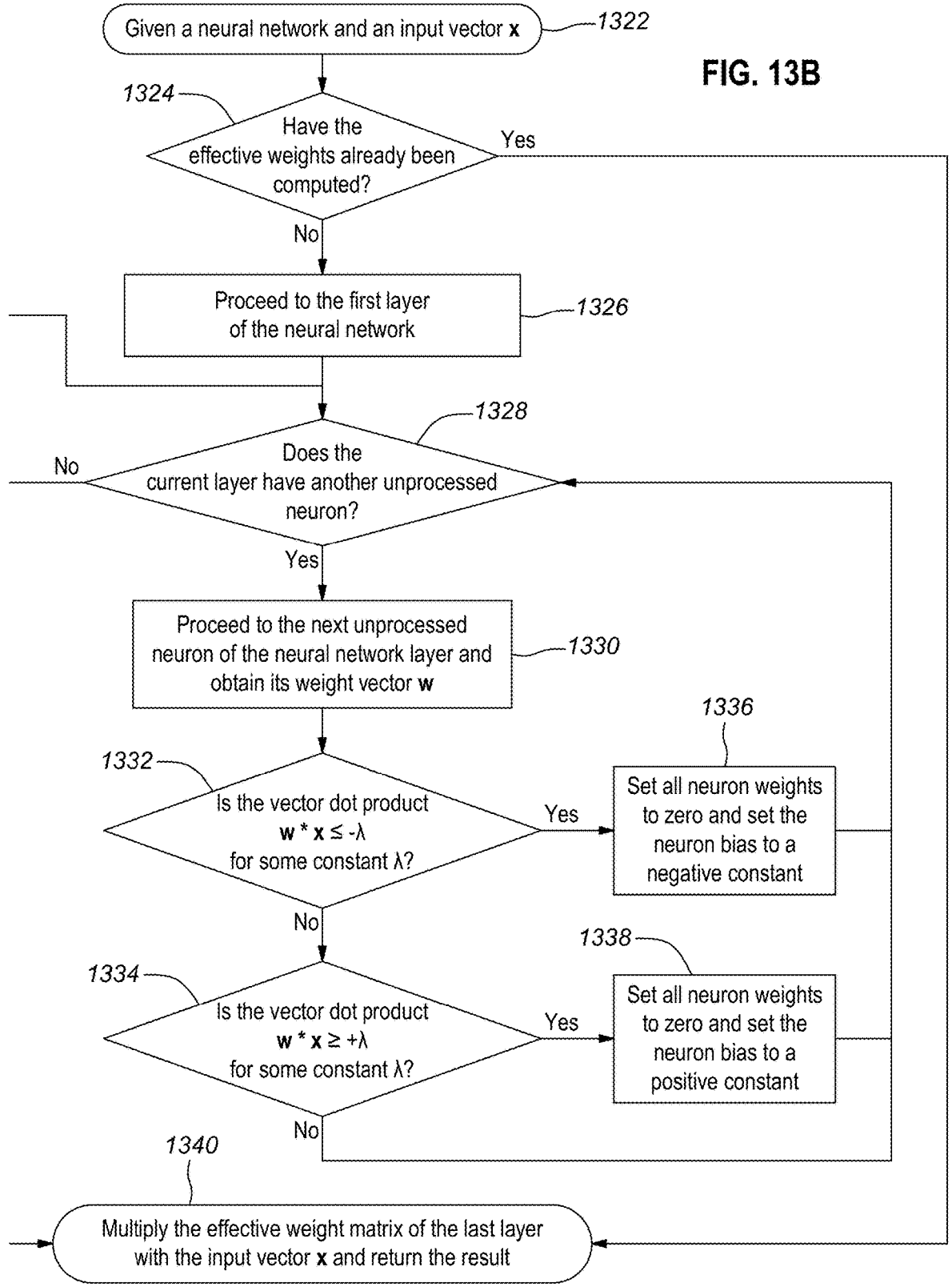

FIGS. 13A & 13B depict a flowchart implementation (steps 1304-1340) of methodology 11.5.3, according to embodiments of the present disclosure.

12. Deep Argmax of a Neural Network

In one or more embodiments, the Deep Argmax of the neural network is an input $\underline{x}$ that maximizes the output of the neural network. Section 11 presented neural networks as piecewise linear function approximators. Thus, in embodiments, the Deep Argmax of a neural network is the same as finding the argmax of a piecewise linear function. In one or more embodiments, the argmax of a piecewise linear function may be computed by finding the argmax of each piece and then picking the piecewise argmax with the maximum function output.

Each piece is a linear function. Linear functions do not have an interior point that is a maximum, since the derivative of a linear function is a constant. However, since the function is restricted to a local domain, it has a boundary. The maximum is located along the boundary of the function domain.

The function boundaries are specified by the neuron mode constraints discussed in Section 11.2. In one or more embodiments, the mode constraints are linear inequalities that depend on the dot product between the neuron weight vector and the input vector.

The problem of finding the maximum of a linear function subject to a set of linear constraints is called linear programming. Thus, the argmax of each piece may be found via a linear programming methodology. Then, the argmax with the maximum function output may be chosen for the entire neural network.

12.1. Linear Programming

The general format of a linear program is:

maximize $\underline{c}^*\underline{x}$ subject to $A^*\underline{x} \leq \underline{b}$ A linear program typically comprises the following components:

1. $\underline{x}$ is the function input vector to be maximized
2. $\underline{c}$ is the coefficient vector and consists of constant weights similar to a weight vector
3. $A$ is the constraint matrix
4. $\underline{b}$ is the boundary vector A linear program may be solved via the Simplex algorithm, although different approaches exist and may be employed. The methods discussed in this patent document are compatible with any linear program solver.

If a linear program solver finds an optimum, it provides both the optimal value and arguments, i.e., the maximum and the argmax. If no optimum exists, the solver may report that the function is unbounded (i.e., the constraints are always satisfied) or infeasible (i.e., the constraints are never satisfied).

12.2. Piecewise Argmax

In one or more embodiments, finding the argmax for a piece of the piecewise function approximation of a neural network comprises the following steps:

1. computation of effective weight matrices $E_k$ for each layer k;
2. formulation of the linear program to find the argmax; and 3. solving the linear program.

12.2.1. Computation of Effective Weights

Step 1 above may be computed by calling methodology 11.5.2 for each layer of the neural network. As explained in section 11.5, the modes of all neurons are constant within the domain of a function piece. Thus, in one or more embodiments, each function piece is associated with exactly one mode vector m.

As discussed in Section 8, in embodiments, all neural networks in the world model have one output neuron. For simplicity this section will assume one output neuron. However, the methods discussed herein also apply to neural networks with multiple output. Basically, the methods may be repeated independently for each output neuron.

With one output neuron, the effective weight matrix for the entire neural network $E_{net}$ has one row and is thus essentially an effective weight vector $\underline{e}_{net}$.

12.2.2. Formulation of Linear Program

Formulating the linear program comprises:
1. transformation of variables to deal with negative values
2. definition of coefficient vector $\underline{c}$
3. definition of constraint matrix A
4. definition of boundary vector $\underline{b}$

12.2.2.1. Transformation of Variables

A standard linear program typically requires that all function input values are non-negative, i.e. $\underline{x}[i] \geq 0$. Since neural network inputs may be both positive and negative a mathematical trick may be used to deal with negative inputs.

Any real number x may be written as the difference between two non-negative numbers: $x = x^+ - x^-$, where $x^+ \geq 0$ and $x^- \geq 0$. Essentially, $x = x^+$ if $x \geq 0$ and $x = -x^-$ if $x \leq 0$. By substituting $(x_i^+ - x_i^-)$ for each $x_i$, all variables can be non-negative.

As a result of the substitution above, the linear program has twice as many variables as neural network inputs. Thus, the dimensions of the linear program input and coefficient vectors c are twice the dimension of neural network input vectors.

Methodology 12.2.2.1 performs the variable transformation according to embodiments of the present disclosure.

Methodology 12.2.2.1:

```
transform(x) {
    z = [ x, -x ]
    return z
}
```

12.2.2.2. Definition of Coefficient Vector

In one or more embodiments, the coefficient vector c is equal to the transform of the effective weight vector $\underline{e}_{net}$ of the neural network defined above. The bias adds a constant to the function output and thus does not affect the argmax. As a result, the bias weights and inputs may be ignored during computation of the piecewise argmax.

Methodology 12.2.2.2 computes the coefficient vector given the neuron mode vector $\underline{m}_p$ for the current function piece p according to embodiments of the present disclosure.

Methodology 12.2.2.2:

```
coefficients(net, m_p) {
    e_net = effectiveWeightsForMode(net.layers[last_layer], m_p)
        [0, 0 ... d − 1]
    c = transform(e_net)
    return c
}
``` netlayers[last_layer] denotes the last layer of the neural network. d is the input dimension of the neural network. The first statement retrieves the first row of the effective weight matrix (the effective weight vector) and excludes the bias weight.

12.2.2.3. Definition of Constraint Matrix

There are two kinds of linear constraints: exterior boundary constraints and interior boundary constraints. Exterior boundary constraints limit the domain of input variables and thus form an exterior boundary around the total domain of the piecewise linear function approximation.

Exterior boundary constraints prevent the linear program from becoming unbounded. In addition, exterior boundary constraints allow specifying more restrictive constraints on input variables.

While various exterior boundaries may be considered, embodiments assume a bounding box as the most relaxed exterior boundary. In general, it is good practice to normalize inputs to a neural network such that all inputs are in the range −1 and +1. Such normalization may be achieved via translating all input values to have mean 0 and then rescaling all values to be between −1 and +1. If this normalization is not performed, adjustments to the constraint values specified here may need to be performed.

The exterior boundary constraints may be made tighter for some variables resulting in an actual exterior boundary that is a subset of the bounding box. One way to tighten the exterior boundary is by independently limiting the domain of each element of the input vector to be within a range specified by a lower bound vector $\underline{\delta}_{low}$ and an upper bound vector $\underline{\delta}_{high}$. If it is known that a certain input $\underline{x}[i]$ has some specific value $y_i$, then the upper and lower bounds may be exactly set to the specific value, i.e., $\underline{x}[i] = y_i = \underline{\delta}_{low}[i] = \underline{\delta}_{high}[i]$. This may be used to integrate known state values into the linear program during planning. Furthermore, $\underline{\delta}_{low}[i]$ and $\underline{\delta}_{high}[i]$ may be made to differ by a small amount c to account for some uncertainty.

In summary, in one or more embodiments, there are two exterior boundary constraints for each neural network input dimension (d):

$\underline{\delta}_{low}[i] \leq \underline{x}_i$ and $\underline{x}_i \leq \underline{\delta}_{high}[i]$, for all $i < d$.

In general, other constraints restricting the input are possible. The general form of all exterior boundary constraints is similar, but more complex constraints may involve a mix of variables.

Methodology 12.2.2.3.1 adds the exterior boundary constraints to the constraint matrix A according to embodiments of the present disclosure.

Methodology 12.2.2.3.1:

```
exteriorBoundaryMatrix(A) {
    for i = 0 ... d-1 {
        A[2i, i] = 1
        A[2i, i + d] = -1
        A[2i + 1, i] = -1
        A[2i + 1, i + d] = 1
    }
}
```

Interior boundary constraints specify the boundaries between the local domain of the function piece in consideration and all of the local domains of its neighboring pieces.

The interior boundary constraints are jointly specified by all neuron mode constraints that specify the local domain of the piece.

As explained earlier, the mode of every neuron may be fixed within a given piece of the piecewise function. Each neuron may be either in its active mode or in one of its inactive modes. For simplicity, the remainder of this section will assume that inactive neurons have two modes, which is the case with the most popular squashing functions, such as the hyperbolic tangent. The discussion can be easily extended to other squashing functions.

The following neuron mode constraints were discussed in section 11.2:

1. neuron($\underline{x}_k$)=−c (inactive) if $\underline{w}^*\underline{x}_k \leq -\lambda$
2. neuron($\underline{x}_k$)=$\underline{w}^*\underline{x}_k$ (active) if $\underline{w}^*\underline{x}_k > -\lambda$ and $\underline{w}^*\underline{x}_k < \lambda$
3. neuron($\underline{x}_k$)=+c (inactive) if $\underline{w}^*\underline{x}_k \geq \lambda$ The constraints are listed in the right-hand column. However, in one or more embodiments, it is important to note that the input vector $\underline{x}_k$ is the input to the k-th layer of the neural network and not the neural network input $\underline{x}_0$. $\underline{x}_k$ and $\underline{x}_0$ are the same for the first layer, but the input for all subsequent layers is the output of the previous layer. For the purposes of the linear program, in one or more embodiments, all variables are expressed in terms of the neural network input $\underline{x}_0$.

All variables may be rewritten in terms of the network input by using effective weights. In fact, if $\underline{w}_{kn}$ is the weight vector and $\underline{e}_{kn}(\underline{x}_0)$ is the effective weight vector of the n-th neuron of the k-th layer given input $\underline{x}_0$, then the following holds:

$$\underline{w}_{kn} * \underline{x}_k = \underline{e}_{kn}(\underline{x}_0) * \underline{x}_0$$

The effective weight vector of the n-th neuron of the k-th layer is equal to the transpose of the n-th row of the effective weight matrix of the k-th layer, i.e. $\underline{e}_{kn}(\underline{x}_0) = E_k(\underline{x}_0)[i, \ldots]$. Since the input $\underline{x}_0$ is not available to the linear program, the effective weight matrix of the k-th layer may be computed with methodology 11.5.2 using the neuron mode vector instead, i.e. $\underline{e}_{kn}(\underline{x}_0) = \underline{e}_{kn}(\underline{m}_p)$, where $\underline{m}_p$ specifies all neuron modes within the domain of the function piece p.

With effective weights, the neuron modes may be defined in terms of $\underline{x}_0$:

1. neuron$_{kn}$($\underline{x}_0$)=−c (inactive) if $\underline{e}_{kn}(\underline{m}_p)*\underline{x}_0 \leq -\lambda$
2. neuron$_{kn}$($\underline{x}_0$)=$\underline{e}_{kn}(\underline{m}_p)*\underline{x}_0$ (active) if $\underline{e}_{kn}(\underline{m}_p)*\underline{x}_0 > -\lambda$ and $\underline{e}^{kn}(\underline{m}_p)*\underline{x}_0 < \lambda$
3. neuron$_{kn}$($\underline{x}_0$)=+c (inactive) if $e_{kn}(\underline{m}_p)*\underline{x}_0 \geq \lambda$ As can be seen above, in one or more embodiments, the active mode is associated with two constraints, while the inactive modes are associated with one constraint.

In one or more embodiments, the final output neuron may be assumed to be always active and thus no constraints are needed for the output neuron. If the output neuron were inactive, the output of the neural network would be just a constant.

Thus, if the neural network has a total of N neurons and $N^+$ many of those neurons are active within the domain of the function piece in consideration, then the total number of interior boundary constraints is equal to $(N-1)+(N^+-1)$. Together with the exterior boundary constraints, the total number of all constraints is equal to $2d+N^+-2$. This is also the number of rows of the constraint matrix A.

Methodology 12.2.2.3.2 adds the interior boundary constraints to the constraint matrix A starting at row i according to embodiments of the present disclosure.

Methodology 12.2.2.3.2:

```
interiorBoundaryMatrix(A, net, m_p, i) {
    for every layer k in net {
        E_k = effectiveWeightsForMode(net.layers[k], m_p)
        for every neuron n in layer k {
            e_kn = E_k[n, 0 ... d-1]
            if (m[n] == active) {
                A[i, ...] = transform(-e_kn)
                A[i+1, ...] = transform(e_kn)
                i = i + 2
            } else {
                if ( m[n] == negative constant) {
                    A[i, ...] = transform(e_kn)
                } else {
                    A[i, ...] = transform(-e_kn)
                }
                i = i + 1
            }
        }
    }
}
```

Methodology 12.2.2.3.3 combines methodologies 12.2.2.3.1 and 12.2.2.3.2 to define the entire constraint matrix according to embodiments of the present disclosure.

Methodology 12.2.2.3.3:

```
constraintMatrix(net, m_p) {
    A = new matrix with (2d + N + N^+ − 2) rows and 2d columns
    clear all entries of A
    exteriorBoundaryMatrix(A)
    interiorBoundaryMatrix(A, net, m_p, 2d)
    return A
}
```

Note that in general the order of rows of matrix A may be changed. Thus, other implementations may use a different ordering of rows and achieve the same results. In particular, exterior boundary constraints may be added after interior boundary constraints or in some mixed order. However, any such row reordering should also be applied to the boundary vector $\underline{b}$.

12.2.2.4. Definition of Boundary Vector

The i-th row of the boundary vector $\underline{b}$ corresponds to the i-th row of the constraint matrix A. Thus, following the construction in section 12.2.2.3, the first 2d rows of $\underline{b}$ deal with exterior boundary constraints and the remaining rows deal with interior boundary constraints. In one or more embodiments, exterior boundary constraints depend on the lower and upper bound vectors $\underline{\delta}_{low}$ and $\underline{\delta}_{high}$. In one or more embodiments, the interior boundary constraints depend on the choice of for the neuron mode constraints discussed in section 11.2 and the effective bias of each neuron. d is still the neural network input dimension.

Methodology 12.2.2.4.1 adds exterior boundary constraints to the boundary vector according to embodiments of the present disclosure. Methodology 12.2.2.4.2 adds interior boundary constraints starting at row i according to embodiments of the present disclosure. Finally, methodology 12.2.2.4.3 combines both subroutines to construct the entire boundary vector according to embodiments of the present disclosure.

Methodology 12.2.2.4.1:

```
exteriorBoundaryVector(b, constraints) {
    δ_high = upper bound vector from constraints
    δ_low = lower bound vector from constraints
    for i = 0 ... d-1 {
        b[2i] = δ_high[i]
```

```
        b[2i+1] = -δ_low[i]
      }
   }
```

Methodology 12.2.2.4.2:

```
interiorBoundaryVector(b, net, m_p, i) {
   for every layer k in net {
      E_k = effectiveWeightsForMode(net.layers[k], m_p)
      for every neuron n in layer k {
         effective_bias = E_k[n, d]
         if (m[n] == active) {
            b[i] = effective_bias + λ
            b[i+1] = -effective_bias + λ
            i = i + 2
         } else {
            if ( m[n] == negative constant) {
               b[i] = -effective_bias - λ
            } else {
               b[i] = effective_bias - λ
            }
            i = i + 1
         }
      }
   }
}
```

Methodology 12.2.2.4.3:

```
boundaryVector(net, constraints, m_p) {
   b = new vector with (2d + N + N^+ - 2) rows
   exteriorBoundaryVector(b, constraints)
   interiorBoundaryVector(b, net, m_p, 2d)
   return b
}
```

12.2.3. Solving the Linear Program

Any standard linear program solver may be used to solve the linear program defined by methodologies 12.2.2.2, 12.2.2.3.3, and 12.2.2.4.3.

In one or more embodiments, the linear program solver returns one of two results:

infeasible; or a finite optimum.

If the result is infeasible, the domain of the function piece is empty and there is no argmax for this piece. A result of infeasible means that the specific combination of modes of the neurons is never achieved in practice by the neural network. Infeasible results may be ignored.

If the result is a finite optimum, the linear program solver provides the argmax that produces the optimal function value. However, in embodiments, the transformation applied by methodology 12.2.2.1 should be reversed to make the result of the solver useful.

Methodology 12.2.3 summarizes the piecewise argmax methodology according to embodiments of the present disclosure. If an optimum is found, the argmax vector is returned by the methodology. p is the index of the function piece for which the argmax is computed.

Methodology 12.2.3:

```
piecewiseArgmax(net, constraints, p) {
   m_p = neuron mode vector for piece p
   linear_program = {
      c = coeffients(net, m_p)
      A = constraintMatrix(net, m_p)
      b = boundaryVector(net, constraints, m_p)
   }
   solve linear_program
   if solution is infeasible return null
   z = argmax returned by solver
   x = new vector with d rows
   for i = 0 ... d-1 {
      x[i] = z[i] - z[i+d]
   }
   return x
}
```

12.3. Deep Argmax Method for Neural Network

In one or more embodiments, the argmax for the entire neural network is simply the piecewise argmax that produces the maximum neural network output.

This is summarized by methodology 12.3, which implements the Deep Argmax for a neural network, according to embodiments of the present disclosure. The index p is used to enumerate over all function pieces, which are equivalent to combinations of neuron modes. In general, the index p may be a number that is incremented during each step of the loop. If the neurons have M modes and the neural network has N neurons, p would be a base M number with N−1 many digits. For instance, for the case discussed here, M=3 and p would be a base 3 number that is incremented during each loop iteration.

The constraints may be used to specify known or required values for some inputs or to express an uncertainty in the input values.

Methodology 12.3:

```
deepArgmax(net, constraints) {
   x* = new vector with d many rows
   y* = -∞
   for each combination of neuron modes (p) {
      x_p = piecewiseArgmax(net, constraints, p)
      if x_p is null continue with next p
      y_p = net(x_p)
      if y_p > y* {
         y* = y_p
         x* = x_p
      }
   }
   return x*
}
```

Figure 14B:
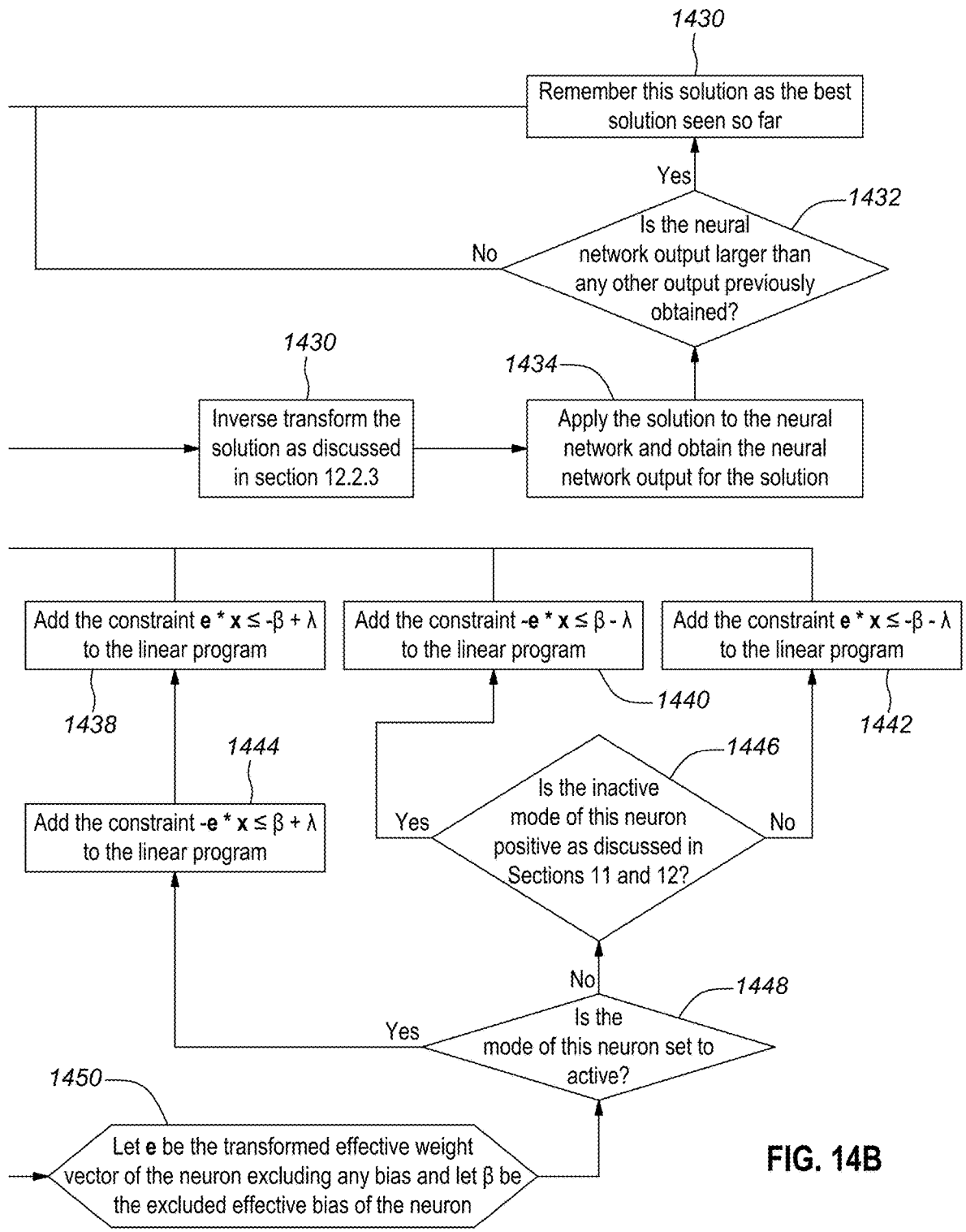

FIGS. 14A & 14B depict a flowchart implementation (steps 1404-1450) of methodology 12.3, according to embodiments of the present disclosure.

12.4. Piecewise Inverse

As discussed in Sections 10.3 and 10.4, in embodiments, the Inverse function is computed via the Deep Argmax function. As discussed in Sections 12.2 and 12.3, in embodiments, the Deep Argmax is first computed piecewise and then the argmax for the entire neural network is identified.

In one or more embodiments, the computation of the Inverse function follows the general method used for the Deep Argmax with a few changes. First, the piecewise inverse may be computed. As explained in Sections 10.3 and 10.4, the inverse may be computed by introducing an error variable c. As long as the error is allowed to be arbitrarily large, an inverse may always be found except if the neuron mode constraints of the function piece are infeasible. The second step discussed in section 12.5 identifies the inverse with lowest error.

In one or more embodiments, the linear program used to compute the inverse function has one additional variable, the error c. Thus, together with the transformation discussed in Section 12.2.2.1, if the neural network input dimension is d, the inverse linear program has 2d+1 many variables. In one or more embodiments. the error does not need to be transformed since it is always positive.

In one or more embodiments, the linear program objective is to minimize the error, or in other words maximize the negative of the error. Methodology 12.4.1 implements the change to the objective according to embodiments of the present disclosure.

Methodology 12.4.1:

```
inverseCoefficients( ) {
    c = new vector with (2d + 1) rows
    clear all elements of c
    c[2d] = -1
    return c
}
```

As discussed in Section 10.4, multiple neural networks associated with one procedure may need to be simultaneously inverted. In one or more embodiments, each neural network predicts a function $h_{P\gamma}(\underline{x})$, where P is the procedure and y is one procedure effect. As discussed in Section 8.1, in embodiments, procedure effects are independent and thus may be inverted independently. In one or more embodiments, for each neural network to be inverted, the following two constraints should be satisfied, where $y_{P\gamma}$ is the desired neural network output given the inverse input $\underline{x}$:

$h_{P\gamma}(\underline{x}) - y_{p\gamma} \geq -\varepsilon$
$h_{P\gamma}(\underline{x}) - y_{P\gamma} \leq +\varepsilon$ Thus, for each neural network to be inverted, the two constraints may be appended to the constraint matrix A and boundary vector $\underline{b}$ of the linear program.

In addition, in one or more embodiments, interior boundary constraints should now cover all neural networks to be inverted. Thus, there is one set of interior boundary constraints for each neural network. Since all neural networks share the same input, only one set of exterior boundary constraints needs to be defined for the entire linear program.

In one or more embodiments, given the following values:
$N_{total}$=total number of neurons in all neural networks to be inverted
$N^+_{total}$=total number of neurons in all neural networks to be inverted that are active within the domain of the function piece
d=input dimension of input shared by all neural networks to be inverted the total number of constraints is $2d+N_{total}+N^+_{total}$, which is also the number of rows of the constraint matrix A and the boundary vector $\underline{b}$.

Methodologies 12.4.2 and 12.4.3 implement the changes to the computation of the constraint matrix A and the boundary vector b according to embodiments of the present disclosure. In one or more embodiments, both methodologies take the array of neural networks nets[ ] to be simultaneously inverted as an argument. nets.length is the length of the array.

In one or more embodiments, each neural network nets[k] is associated with its own neuron mode vector $\underline{m}_p[k]$ that specifies the modes of all of its neurons within the domain of the function piece. $\underline{y}$ is the vector of desired output values for each network in the set of neural networks.

Methodology 12.4.2:

```
inverseConstraintMatrix(nets[], m_p[]) {
    A = new matrix with (2d + N_total + N^+_total) rows and (2d + 1) columns
    clear all entries of A
    exteriorBoundaryMatrix(A)
    i = 2d
    for k = 0 ... nets.length-1 {
        e_net = effectiveWeightsForMode(nets[k].layers[last_layer], m_p[k])[0, 0 ... d - 1]
        A[i, 0 ... 2d-1] = transform(-e_net)
        A[i, 2d] = -1
        A[i+1, 0 ... 2d-1] = transform(e_net)
        A[i+1, 2d] = -1
        interiorBoundaryMatrix(A, nets[k], m_p[k], i+2)
        i = i + N_net + N^+_net
    }
    return A
}
```

Methodology 12.4.3:

```
inverseBoundaryVector(nets[], m_p[], y, constraints) {
    b = new vector with (2d + N_total + N^+_total) rows
    exteriorBoundaryVector(b, constraints)
    i = 2d
    for k = 0 ... nets.length-1 {
        effective_bias = effectiveWeightsForMode(nets[k].layers[last_layer], m_p[k])[0, d]
        b[i] = effective_bias - y[k]
        b[i+1] = y[k] - effective_bias
        interiorBoundaryVector(b, nets[k], m_p[k], i+2)
        i = i + N_net + N^+_net
    }
    return b
}
```

Methodology 12.4.4 combines the changes in methodologies 12.4.1, 12.4.2, and 12.4.3 to compute the piecewise inverse according to embodiments of the present disclosure. p is the index of the function piece. Methodology 12.4.4 computes the neuron mode vector for each neural network for the given function piece according to embodiments of the present disclosure.

Methodology 12.4.4:

```
piecewiseInverse(nets[], y, constraints, p) {
    m_p[] = new empty array of length nets.length
    for k = 0 ... nets.length-1 {
        m_p[k] = neuron mode vector for piece p of nets[k]
    }
    linear_program = {
        c = inverseCoeffients( )
        A = inverseConstraintMatrix(nets[], m_p[])
        b = inverseBoundaryVector(nets[], m_p[], y, constraints)
    }
    solve linear_program
    if solution is infeasible return null
    z = argmax returned by solver
    x = new vector with d rows
    for i = 0 ... d-1 {
        x[i] = z[i] - z[i+d]
    }
    return x
}
```

12.5. Inverse Method for Neural Network

In one or more embodiments, the inverse for the entire neural network is the piecewise inverse that has the minimum error, i.e., the neural network output that is closest to the desired output.

Since multiple neural networks may need to be simultaneously inverted, the total inverse error may be calculated by summing all individual neural network errors.

Note that, in embodiments, the loop in methodology 12.5 iterates over the joint combination of all neuron modes over all the neural networks in the set according to embodiments of the present disclosure. In one or more embodiments, using the method to iterate over the indices p discussed in Section 12.3, the total number of digits of the number p would be $N_{total}-K$, where $N_{total}$ is the total number of neurons over all neural networks and K is the number of neural networks.

As with the Deep Argmax, additional constraints may be specified for known or required values for some inputs or to express an uncertainty in the input values.

Figure 15:
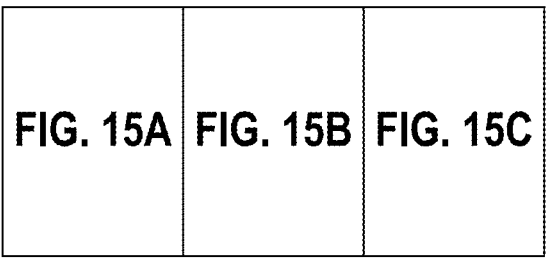
FIG. 15 depicts the relationship among FIGS. 15A-C.
Figure 15A:
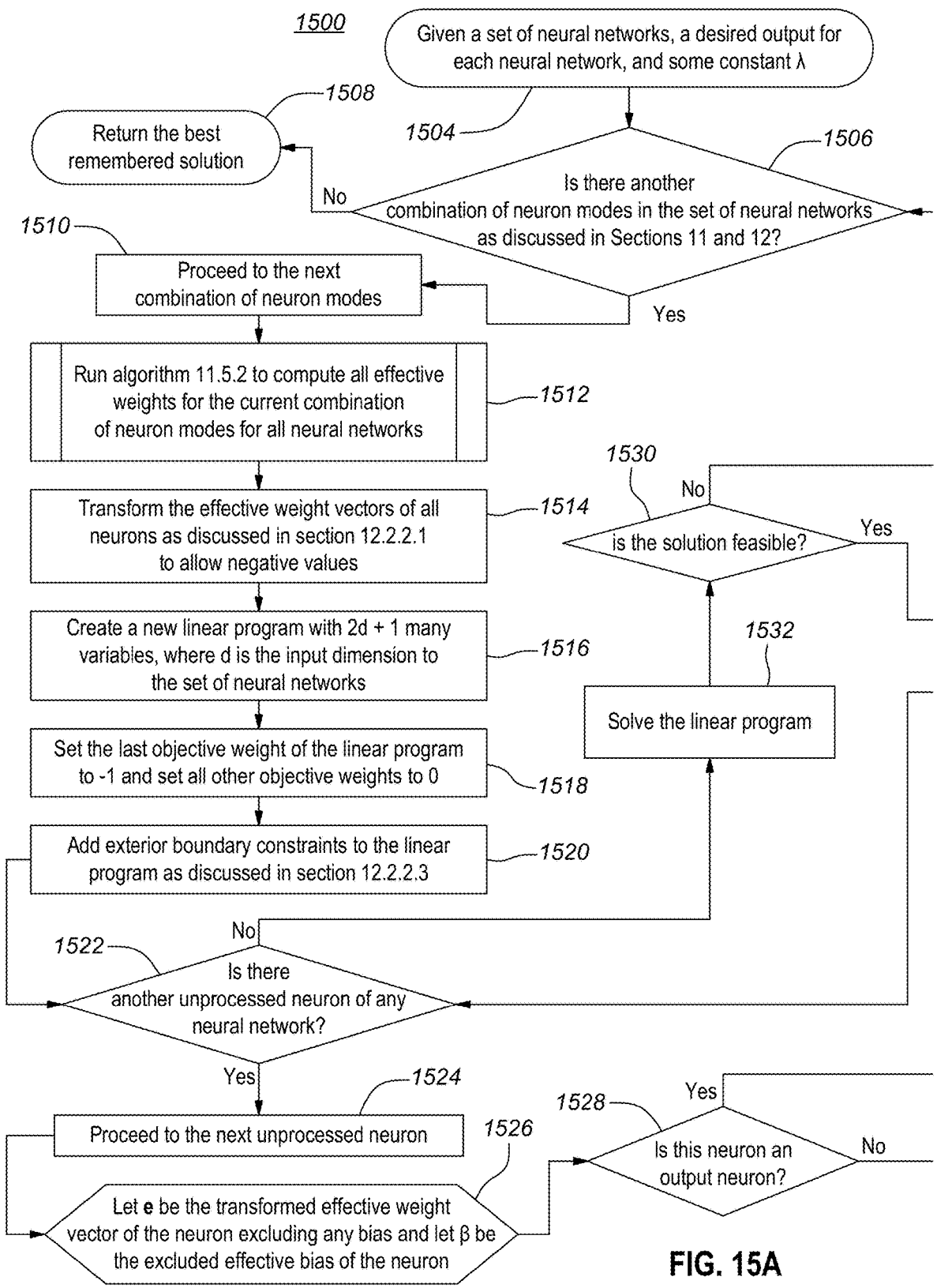
Figure 15C:
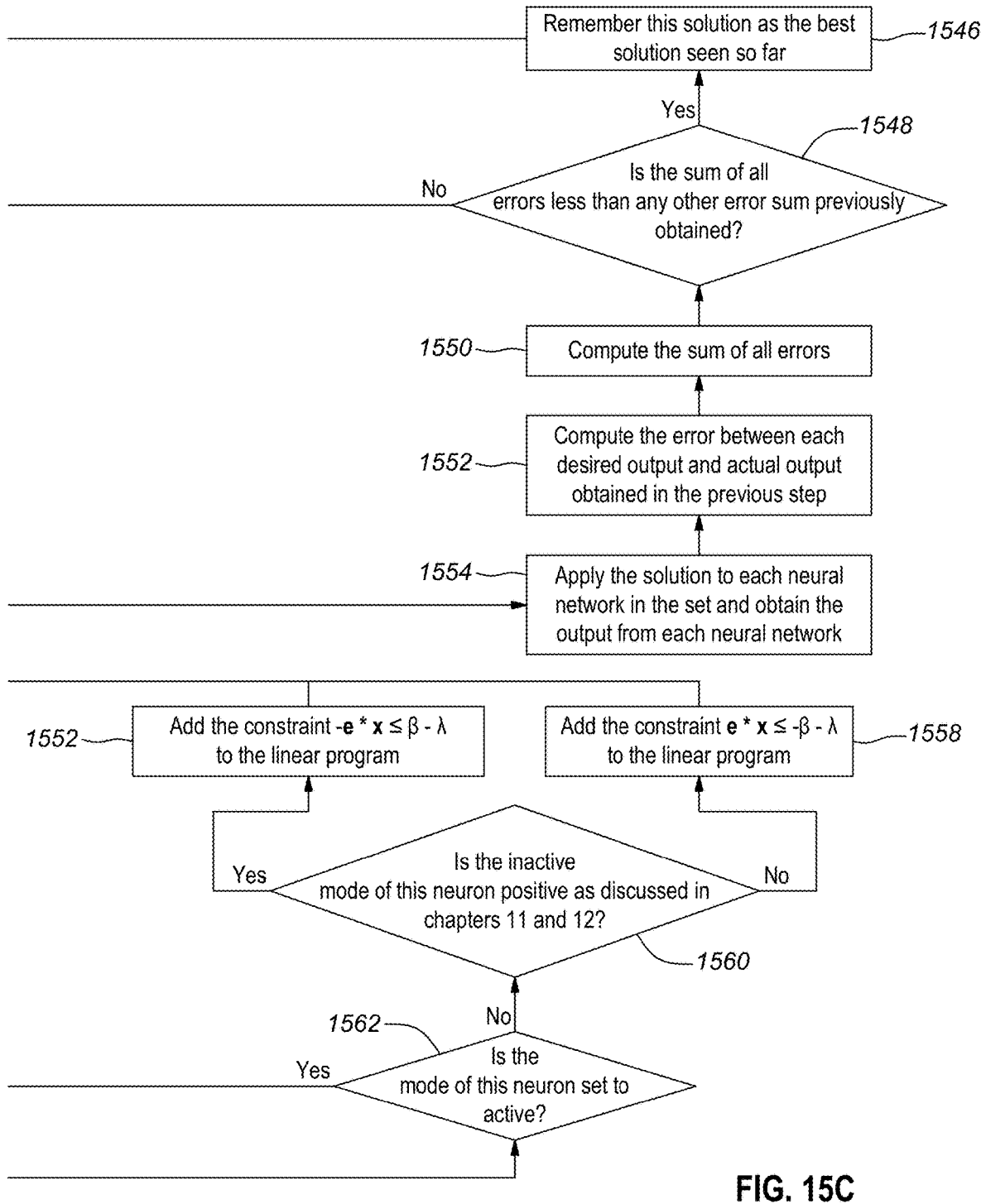

Methodology 12.5:

FIGS. 15A-C depict a flowchart implementation (steps 1504-1562) of methodology 12.5, according to embodiments of the present disclosure.

12.6. Discussion

This section has presented embodiments of implementations of the Deep Argmax and Inverse functions for neural networks. As discussed in Section 10, both functions may be important for planning with neural networks and may be called by a planning method, such as the one shown by methodology 10.6.

12.6.1. Piecewise Linear Programming with Neural Networks

As mentioned in Section 3.3, this Section has presented method embodiments to perform piecewise linear programming with neural networks.

In traditional linear programming, the objective and constraints typically have to be engineered by experts. This requires not only significant manual labor, but also a good knowledge of the world model. Furthermore, this makes linear programming harder to use in cases where there is a significant amount of uncertainty in the world model.

In one or more embodiments, with the use of neural networks, both the linear program objective and constraints are learned. This eliminates the need for experts to design linear programs since the methodologies presented in this section automatically construct the linear program objectives and constraints given a set of neural networks.

The neural networks may be trained via machine learning. This allows the use of linear programming in cases where there is a high uncertainty in the world model.

In one or more embodiments, the set of neural networks not only learns the linear program objectives and constraints but learns a way of partitioning a complex function into smaller linear pieces that can be used in piecewise linear programming as presented here. This opens the door for the use of linear programming with highly non-linear world models.

12.6.2. Reinforcement Learning and Linear Programming

The method embodiments presented in this section may be used to generate a plan as shown by methodology 10.6, which implements the reinforcement learning methodology policy according to embodiments of the present disclosure.

While traditional reinforcement learning uses dynamic programming or similar techniques to propagate utility values to world states, the techniques presented here use linear programming

```
inverse(nets[], y, constraints)
    x* = new vector with d many rows
    ε* = ∞
    for each joint combination of neuron modes over the set of neural networks (p) {
        x_p = piecewiseInverse(nets[], y, net, constraints, p)
        if x_p is null continue with next p
        ε_p = 0
        for k = 0 ... nets.length-1 {
            ε_p = ε_p + | nets[k](x_p) - y[k] |
        }
        if ε_p < ε* {
            ε* = ε_p
            x* = x_p
        }
    }
    return x*
}
```

As discussed in Section 9.2, the utility is usually computed by the last procedure of a process. The methods discussed in this section and Section 10 are used to propagate this utility value to intermediate world states that are obtained during the execution of the process.

Thus, as mentioned in Section 3.4, this patent document introduces new method embodiments for performing reinforcement learning that do not depend on Markov Decision Processes or the Bellman equation.

12.6.3. Efficiency

The computation of the piecewise argmax or inverse is quite efficient. However, one issue with embodiments presented here is that a neural network with N neurons may have in the order of $O(2^N)$ combinations of neuron modes. Thus, the worst-case running time of the methodology may be exponential. This is especially a problem for the inverse for which N is the total number of neurons over the set of neural networks.

Improvements may be made to avoid this worst-case running time. Specifically, in one or more embodiments, given d dimensional input data, each piecewise linear approximation uses at least d+1 many training samples with inputs within the domain of a function piece. Thus, to accurately learn all $2^N$ pieces, at least $(d+1)*2^N$ many training samples would be used.

For larger neural networks, the number of required training samples may far exceed the number of particles in the known universe. Thus, in practice it may not be possible to completely train all piecewise approximations of a neural network and only a small subset of the pieces may be accurately trained.

Note that this is not just a problem for the methodologies discussed here, but a more general problem with standard neural networks that in practice may cause all kinds of issues.

The methodologies in this section may be modified to focus on piecewise approximations that have support in the training data. This is a much more manageable number.

However, instead of discussing further improvements to the methodologies presented above, the core problem is addressed. The inefficiency of the methodology is primarily due to the design of standard neural networks. The next chapter introduces neural fields, which significantly improve the design of standard neural networks and avoid many of its problems.

13. Neural Fields

The ability to compute the Deep Argmax is very useful, but as discussed in Section 12.6.3, its computation with standard neural networks can be inefficient and may be impractical in the worst case.

A piecewise linear function approximation performs two major tasks:

partition the approximated function into pieces; and provide a linear approximation to each piece Neural networks attempt to accomplish the two major tasks at the same time. This is apparent in both the structure and learning methodologies of neural networks. The weight vectors of the neurons encode the linear approximation but are also used to determine the partition of the function over which the neuron provides the linear approximation (i.e., the active domain of the neuron). Furthermore, neural network learning methods, such as back-propagation, simultaneously learn a partitioning and linear approximation.

The following are some problems due to the design of standard neural networks:

inefficient computation (including, for example, inefficient computation of the Deep Argmax and Inverse methods)

inefficient training
  substantial compute resources and time are required
  only a small subset of partitions can be accurately trained in practice
  neural network output for inadequately trained partitions may be erroneous allowing adversarial attacks and unpredictable behavior as reported in the recent literature training requires both positive and negative examples parameter inflexibility since weight vectors are used for both partitioning and approximation, which must be compensated by using more neurons and layers inactive neurons produce non-zero output and may have multiple inactive modes which must be accounted for by downstream neurons low transparency of operation due to mixing of partitioning and approximation This Section introduces embodiments of Neural Fields, which improve the design of neural networks. In one or more embodiments, Neural Fields address, among other factors, the issue of separating partitioning and approximation.

In physics, a vector field associates a vector with a point in some space. Since points in space are also represented by a vector, a vector field associates a point vector with a value vector. Examples of vector fields include the magnetic field or velocity field of a flowing fluid.

In one or more embodiments, a neural field is a vector field that associates each point vector in the data space with a linear approximation that is specified by a weight vector.

13.1. Definition

Similar to a neural network, in one or more embodiments, a neural field is a general piecewise linear function approximator. In one or more embodiments, neural fields comprise a set of neurons, but unlike neural networks, do not arrange neurons into layers.

In one or more embodiments, a neuron of a neural field comprises two components:

a point vector $\underline{p}$ for partitioning; and a weight vector $\underline{w}$ for approximation.

Thus, unlike standard neurons, embodiments of neural field neurons have two vectors. Now, in one or more embodiments, the weight vector is responsible for approximation and not used for partitioning anymore. Responsibility for partitioning may be assumed by the new point vector. This gives neural field neurons great flexibility to approximate a function within any local neighborhood.

In one or more embodiments. in contrast to neural networks, for any given input, only one neuron of a neural field is active at any one time. All other neurons are inactive. Furthermore, inactive neurons do not produce any output. The output of the neural field is simply the approximation provided by the single active neuron.

Methodology 13.1.1 specifies the computation of a neural field given an input vector x according to embodiments of the present disclosure. In one or more embodiments, the methodology comprises two steps: partition and approximate. Partitioning determines the index of the active neuron. Approximation simply uses the weight vector of the active neuron to provide a local linear approximation. As with neural networks, the input vector is augmented with a bias input of 1.

Methodology 13.1.1:

```
field(x) {
    η = partition(x)
    return w_n * [ x, 1 ]
}
```

Figure 16:
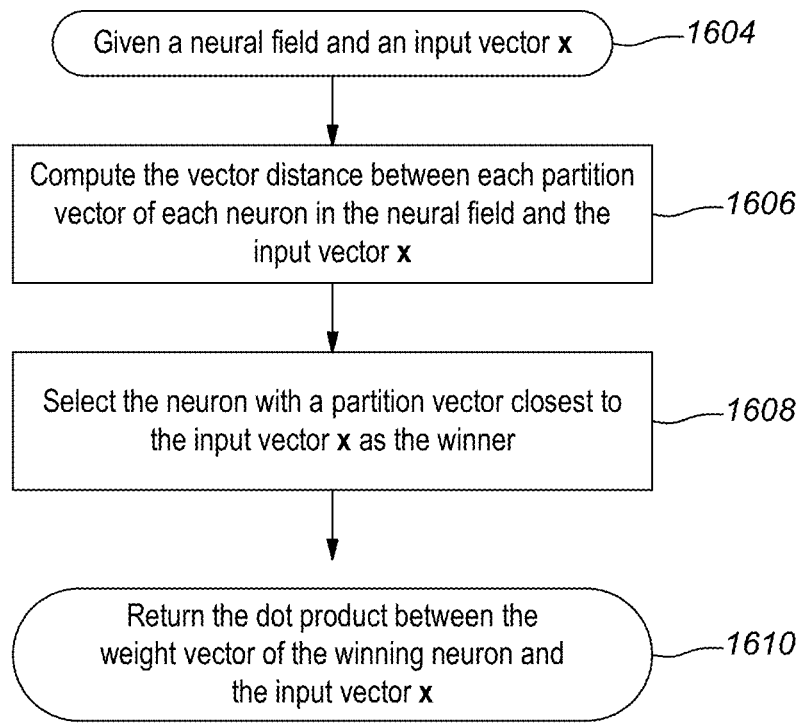
FIG. 16 depicts a flowchart implementation of methodology 13.1.1, according to embodiments of the present disclosure.

FIG. 16 depicts a flowchart implementation (steps 1604-1610) of methodology 13.1.1, according to embodiments of the present disclosure.

Methodology 13.1.2 provides a general implementation of the partition method according to embodiments of the present disclosure. The input may be partitioned based on its vector distance to the point vector of each neuron in the field. The final partition is the index of the neuron with a point vector closest to the input vector.

Methodology 13.1.2:

```
partition(x) {
    η = 0
    Δ_min = ∞
    for each neuron (n) in the field {
        Δ_n = || x - p_n ||
        if (Δ_n < Δ_min) {
            Δ_min = Δ_n
            η = n
        }
    }
    return η
}
```

It shall be noted that other partitioning methods may be used. Most notably, if vectors are normalized, the vector dot product may be used instead of the vector distance. Now, the partition is the neuron index that has the maximum dot product between its point vector and the input vector.

13.2. Comparisons with Similar Techniques

In the literature, using only the "best" neuron for output is sometimes called "winner-take-all". The neurons can be considered to compete with each other. The winning neuron becomes the active neuron and inhibits all other neurons. This is also observed with biological neurons and may be modeled via self-organizing maps (SOM). However, self-organizing maps do not provide function approximation. In fact, self-organizing maps are an unsupervised machine learning technique. Thus, the training methods are very different.

While the description above may appear to have some similarity to a nearest neighbor approach, such as the K-Nearest Neighbor method, there are at least two important differences:

- Neural fields provide a linear function approximation, while K-Nearest Neighbor only computes an average value over the K-Nearest Neighbors. In other words, K-Nearest Neighbor provides a constant approximation over the entire local neighborhood.
- Neural field neurons are learned, while K-Nearest Neighbor does not perform any learning and directly uses the training data, making it very inefficient.

13.3. Neural Field Learning

Similar to neural networks, neural fields may be trained via supervised machine learning. The training of neural fields may comprise two major parts:
- partition learning, which learns point vectors $p$
- approximation learning, which learns the weight vectors $w$ for each partition The input to a neural field learning methodology is identical to the input provided to a standard neural network. More specifically, this discussion assumes that the training data is represented by a data matrix D and an expected value vector $y$. Both the data matrix and expected value vector have been discussed in detail in section 8.2.

One of the advantages of neural field embodiments is that they can be trained with only positive examples. No negative examples are needed as with standard neural networks. This allows neural fields to be used in situations where only positive examples are available. For example, neural fields may be used to learn whether the preconditions of a procedure are satisfied as described by methodology 8.6.2.

In one or more embodiments, a design of neural field embodiments not only allows much more efficient and accurate machine learning, but also eliminates several meta-parameters required for standard neural networks:
- since there are no layers, no network architecture needs to be specified;
- the number of neurons can be learned and does not need to be specified;
- no squashing function needs to be selected; and
- no learning rate or similar parameters need to be specified.

Neural field learning is presented by starting with the approximation part and then discussing partitioning.

13.3.1. Approximation Learning

In one or more embodiments, approximation learning learns the weight vector $w_n$ of each neuron n in the neural field. In one or more embodiments in this section, it may be assumed that all partition point vectors $p_n$ of the neurons have been learned (as discussed in the next section) or are somehow known in advance. Now, each training sample in the training data may be assigned to a partition using methodology 13.1.2.

In one or more embodiments, partitioning essentially splits the rows of the training data matrix D into a set of data matrices $D_n$ for each partition n. Each data matrix $D_n$ contains only samples within the partition n. Similarly, the expected value vector $y$ is partitioned analogously, producing a set of expected value vectors $y_n$ for each partition.

The linear approximation for each partition may be learned via a Linear Least Squares method, which are well known to those of skill in the art. Any Linear Least Squares solver is compatible with the methods discussed herein. In one or more embodiments, for each partition n, the input into the Linear Least Squares solver is simply the data matrix $D_n$ and expected value vector $y_n$.

In one or more embodiments, the output of the Linear Least Squares solver is a weight vector $w_n$. In one or more embodiments, this is the learned approximation weight vector of the neuron n in the neural field. This is summarized by methodology 13.3.1.

Methodology 13.3.1:

```
learnApproximation(field, D, y) {
    for each neuron (n) in the field {
        D_n = new data matrix for neuron n
        y_n = new expected value vector for neuron n
        for each training sample (x, y) in (D, y) {
            if partition(x) is equal to n {
                append x to D_n and y to y_n
            }
        }
        w_n = linearLeastSquares(D_n, y_n)
    }
}
```

13.3.2. Partition Learning

In one or more embodiments, neural field partitions are learned via clustering. Each partition, and thus neural field neuron, corresponds to a cluster of points.

In standard clustering, points are assigned to clusters based on their proximity to a cluster center or other cluster points. However, in neural field clustering, each cluster represents a hyperplane that provides a linear function approximation within the local domain of the cluster. During clustering, points are assigned to clusters based on their distance to the cluster hyperplane in addition to proximity considerations. In other words, points may be assigned to nearby clusters that are approximated well by the cluster hyperplane. At the same time, in one or more embodiments, it may be preferred that clusters have simple boundaries to allow efficient cluster membership computation.

In one or more embodiments, the overall goal is identifying the smallest number of clusters that provides the best approximation to the training data and generalizes well to test data.

In one or more embodiments, the neural field clustering methodology may comprise two major steps:

1. neighborhood learning; and
2. neighborhood clustering.

In one or more embodiments, a neighborhood is a subset of training data points that can be approximated well with the same hyperplane. In principal, each neighborhood could be represented by one neuron. However, in practice, the boundaries of a neighborhood may be complex and determining whether a point is within a neighborhood may be inefficient. In one or more embodiments, the second step of the methodology learns a clustering that allows to quickly identify the neighborhood of any point.

13.3.2.1. Neighborhood Learning

Methodology 13.3.2.1 learns and returns a set of neighborhoods, according to embodiments of the present disclosure. Each neighborhood may comprise:

a set of training data points; and
a weight vector.

In one or more embodiments, methodology 13.3.2.1 first identifies small neighborhoods around either random points or points with a high error. The initial points within a neighborhood may be selected based on proximity to the first point of the neighborhood. The hyperplane parameters may be represented by the neighborhood weight vector. The neighborhood may then be enlarged to include more points that are approximated well by the hyperplane.

If the input data dimension is d, then Linear Least Squares requires the neighborhood to contain at least d+1 many data points. In one or more embodiments, it is better to select somewhat larger initial neighborhoods. In one or more embodiments, the methodology uses a factor r that specifies the additional number of points. r should be a small number larger than 1. Typically, values in the range 1 to 3 work well for r.

Methodology 13.3.2.1 keeps track of a current approximation error $\varepsilon[i]$ for each training data sample $\underline{x}_i$ according to embodiments of the present disclosure. If a new neighborhood approximates a data point better, it may be re-assigned to the new neighborhood and removed from its old neighborhood.

In one or more embodiments, Methodology 13.3.2.1 returns when the error has reached an acceptable low level or a maximum number of neighborhoods has been created, according to embodiments of the present disclosure.

Methodology 13.3.2.1:

```
learnNeighborhoods(D, y) {
    neighborhoods = new empty set of neighborhoods
    ε = [ ∞, ∞, ..., ∞ ] // with dimension equal to dimension of y
    repeat {
        p = a high error or random point
        η = small neighborhood around p with (r * d) many points
        remove all initial points of η from their current neighborhoods if any
        add η to the set of neighborhoods
        D_η = new data matrix with all points inside neighborhood η (subset of D)
        y_η = new expected value vector for all points inside neighborhood η (subset of y)
        η.w = linearLeastSquares(D_η, y_η)
        for each training data sample i {
            x_i = D[i, ...]
            ε_η = | η.w * [ xi, 1 ] - y[i] |
            if ε_η < ε[i] {
                ε[i] = ε_η
                remove the point (x_i, y[i]) from its current neighborhood if any
                add the point (x_i, y[i]) to neighborhood η
            }
        }
    } until || ε || is below a threshold or the number of neighborhoods has reached a limit
    return neighborhoods
}
```

13.3.2.2. Neighborhood Clustering

Since the neighborhoods identified by methodology 13.3.2.1 are just sets of points, the neighborhood boundaries may be complex. Some neighborhoods may even comprise disconnected parts. This makes it inefficient to test whether a new point is a member of a neighborhood. Clustering produces simpler boundaries that allow for faster membership computation.

In one or more embodiments, each cluster is associated with a neighborhood learned by methodology 13.3.2.1. Each training data point may be associated with a cluster. Thus, while methodology 13.3.2.1 maps points to neighborhoods, methodology 13.3.2.2 maps points to clusters and then the clusters to neighborhoods according to embodiments of the present disclosure.

Each cluster may be converted into a neural field neuron. Thus, the set of clusters forms a neural field. Each neuron point vector $\underline{p}$ is equal to one cluster center. Methodology 13.1.2 (partition) may be used to determine the cluster assignment of a data point according to embodiments of the present disclosure.

Methodology 13.3.2.2:

```
clusterNeighborhoods(neighborhoods) {
  field = new empty neural field
  repeat {
    for each neighborhood η in the set of neighborhoods {
      select a point (x, y) from η such that partition(x) ≠ η
      if there is no such point, continue with next neighborhood
      add a new neuron n to the neural field with {
        p_n = x
        w_n = η.w
      }
    }
  } until all points are correctly clustered or the number of neurons has reached a limit
  return field
}
```

13.3.3. Learning the Neural Field

Methodology 13.3.3 combines methodologies 13.3.1, 13.3.2.1, and 13.3.2.2 to learn an entire neural field according to embodiments of the present disclosure.

Methodology 13.3.3:

```
learnField(D, y) {
  neighborhoods = learnNeighborhoods(D, y)
  field = clusterNeighborhoods(neighborhoods)
  learnApproximation(field, D, y)
  return field
}
```

In general, various variations of methodology 13.3.3 may be used. For example, a different clustering methodology may be used. Thus, methodology 13.3.3 highlights the main steps, which may be modified.

Figure 17:
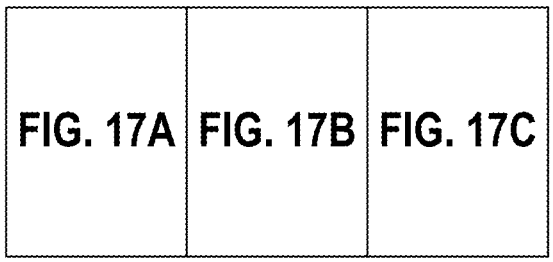
FIG. 17 depicts the relationship among FIGS. 17A-C.
Figure 17A:
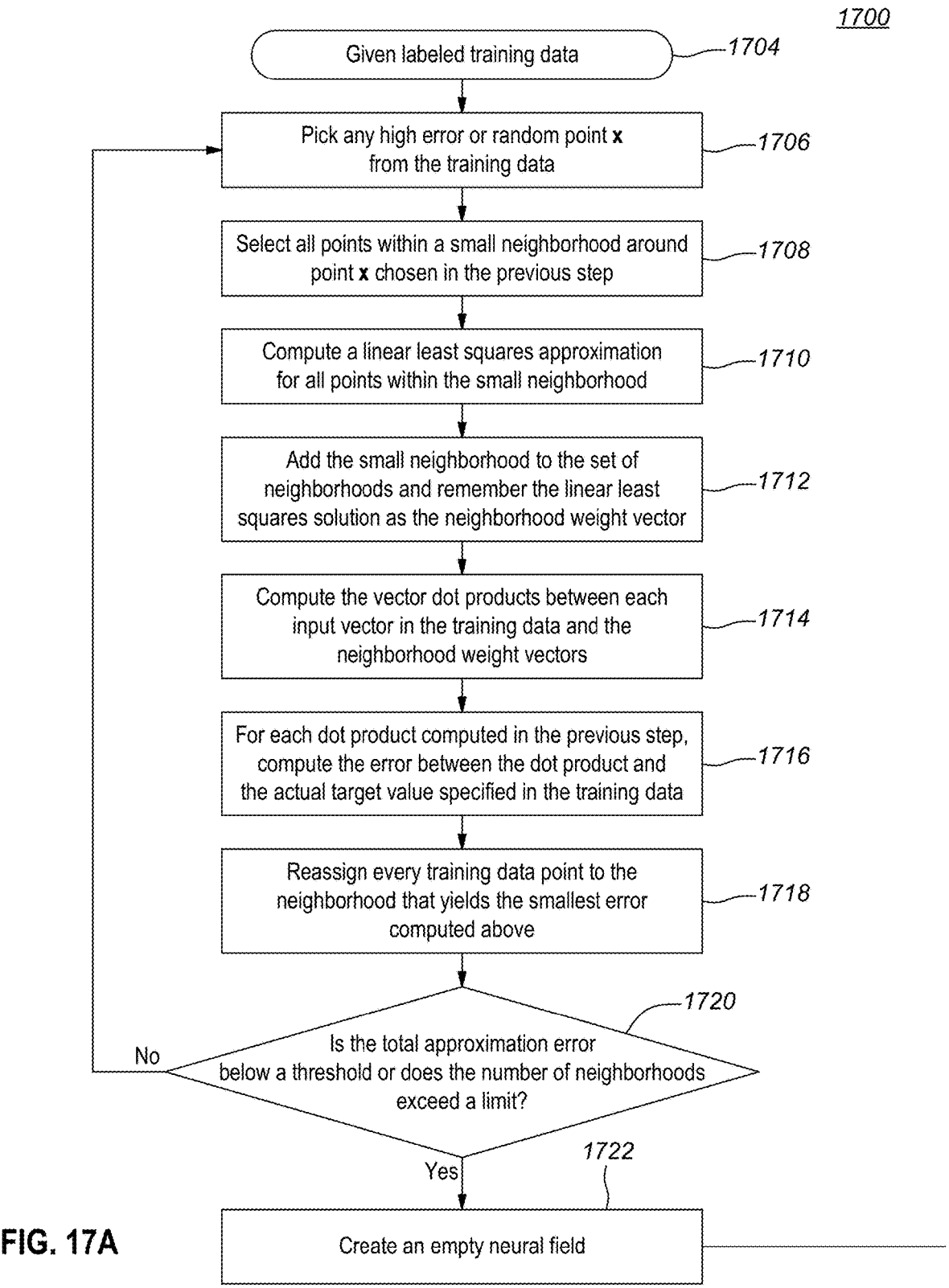
FIGS. 17A-C depict a flowchart implementation of methodology 13.3.3, according to embodiments of the present disclosure.
Figure 17B:
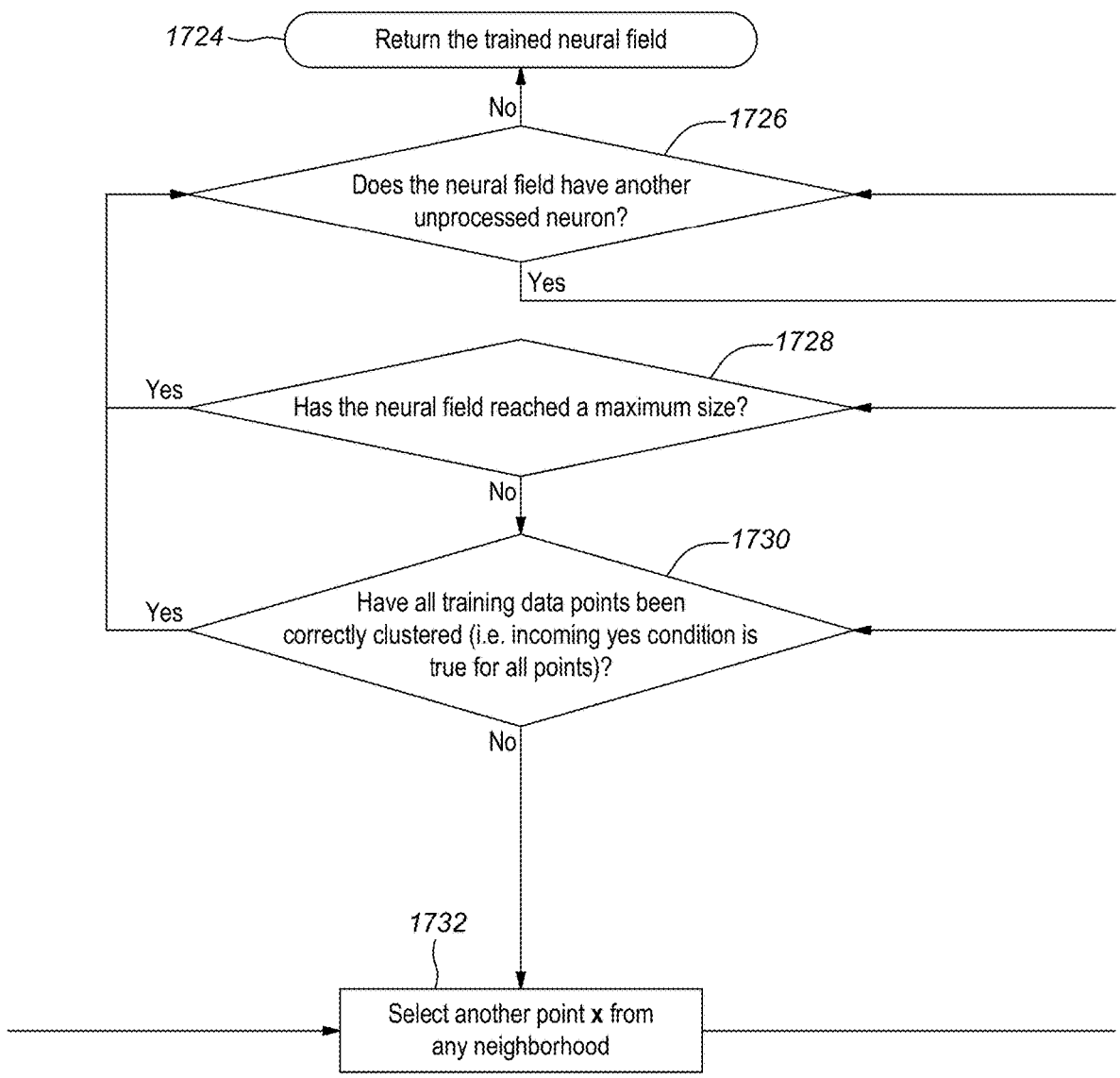
Figure 17C:
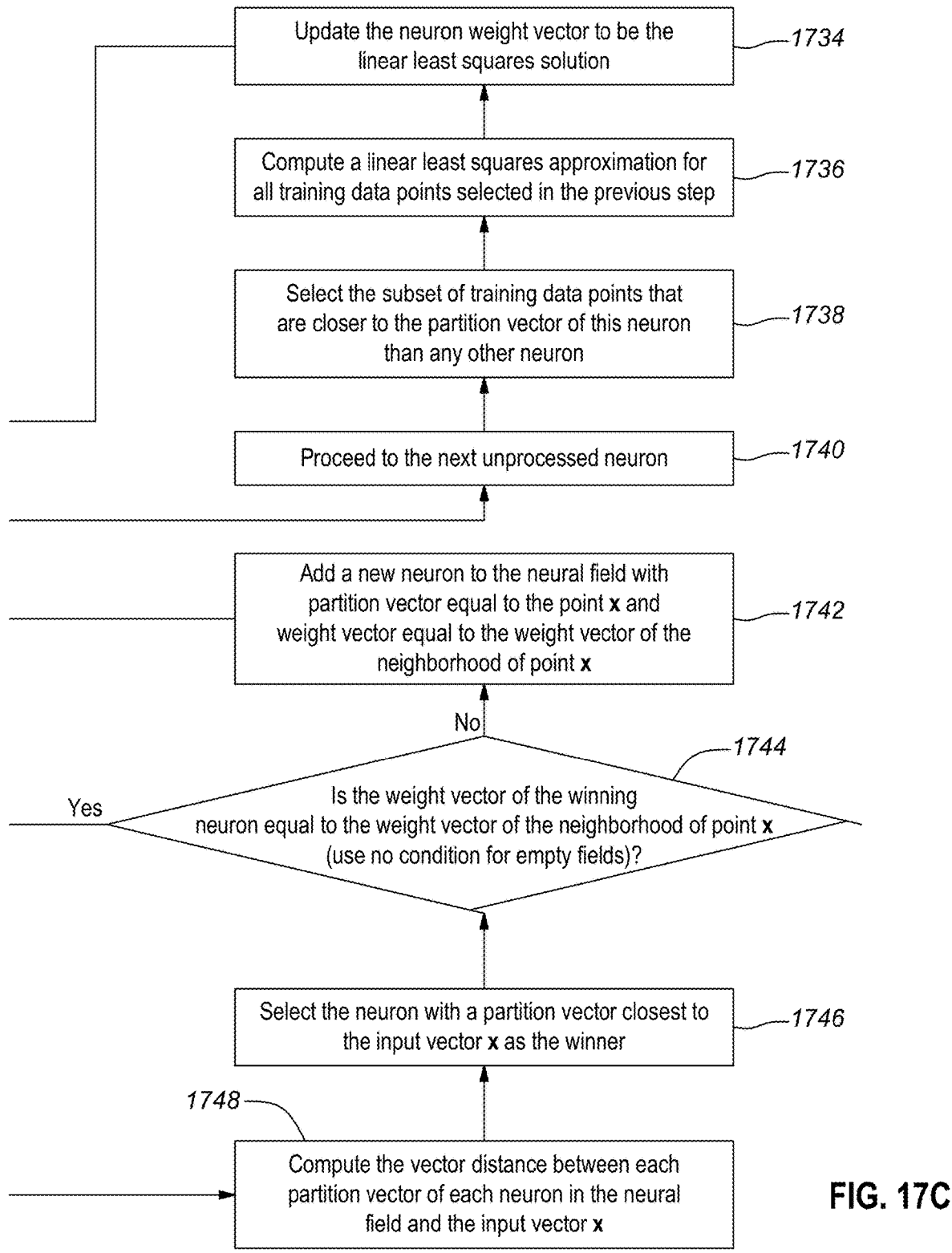

FIGS. 17A-C depict a flowchart implementation (steps 1704-1748) of methodology 13.3.3, according to embodiments of the present disclosure.

13.4. On-Demand Neural Field

In one or more embodiments, on-demand neural fields are a variation of the standard neural fields discussed in the previous section. Instead of pre-learning a neural field as discussed in Section 13.3, a neural field neuron may be learned on-demand when a data point to be approximated is received.

Methodology 13.4.1 modifies methodology 13.1.1 for on-demand neural fields according to embodiments of the present disclosure. In one or more embodiments, given an input data point $\underline{x}$ for prediction, an on-demand neural field forms a local neighborhood around the data point and computes a hyperplane approximation for this neighborhood, in a way similar to methodology 13.3.2.1. Methodology 13.4.1 assumes that the training data represented by the data matrix D and expected value vector $\underline{y}$ is stored and accessible on-demand Methodology 13.4.1:

```
onDemandField(x) {
  η = small neighborhood around x with (r * d) many points
  D_η = new data matrix with all training data points inside neighborhood η (subset of D)
  y_η = new expected value vector for all training data points inside neighborhood η (subset of y)
  w_η = linearLeastSquares(D_η, y_η)
  return w_η * [ x, 1 ]
}
```

Figure 18:
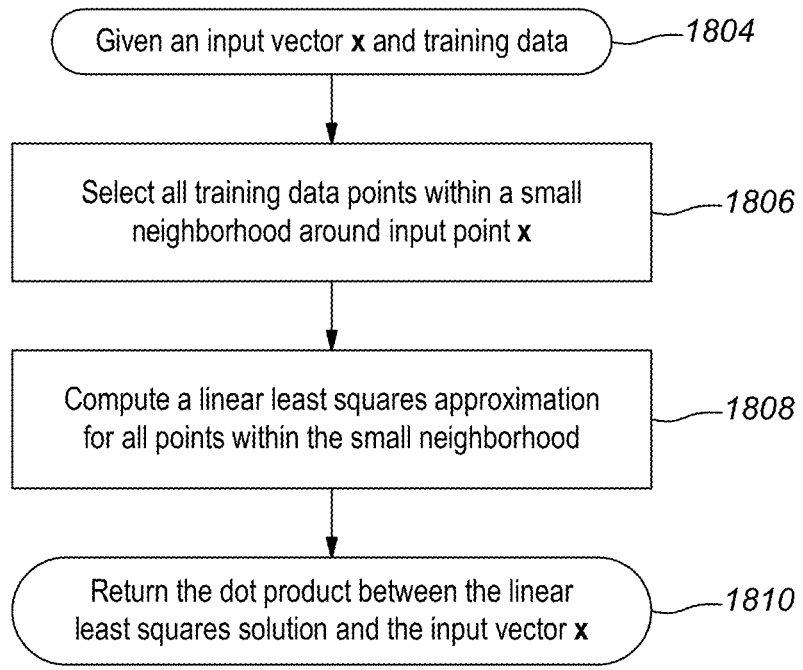
FIG. 18 depicts a flowchart implementation of methodology 13.4.1, according to embodiments of the present disclosure.

FIG. 18 depicts a flowchart implementation (steps 1804-1810) of methodology 13.4.1, according to embodiments of the present disclosure.

One advantage of on-demand learning is that a better approximation may be achieved since the neighborhood is more local. While on-demand neural fields may in some instances be somewhat less efficient than pre-learned neural fields, in some cases on-demand neural fields may provide a better overall performance While methodology 13.4.1 discards the learned weight vector, a hybrid approach may keep approximations learned on-demand and re-use them in the future similar to standard neural fields. One hybrid approach embodiment is shown in methodology 13.4.2; one skilled in the art shall recognize that similar approaches are readily possible.

Methodology 13.4.2:

```
hybridField(x) {
    k = partition(x)
    if || x - p_k || is less than some threshold {
        return w_k * [ x, 1 ]
    } else {
        η = small neighborhood around x with (r * d) many points
        D_η = new data matrix with all training data points inside neighborhood η
        y_η = new expected value vector for all training data points inside neighborhood η
        w_η = linearLeastSquares(D_η, y_η)
        add a new neuron n to the neural field with {
            P_n = x
            w_n = η.w
        }
        return w_η * [ x, 1 ]
    }
}
```

Figure 19:
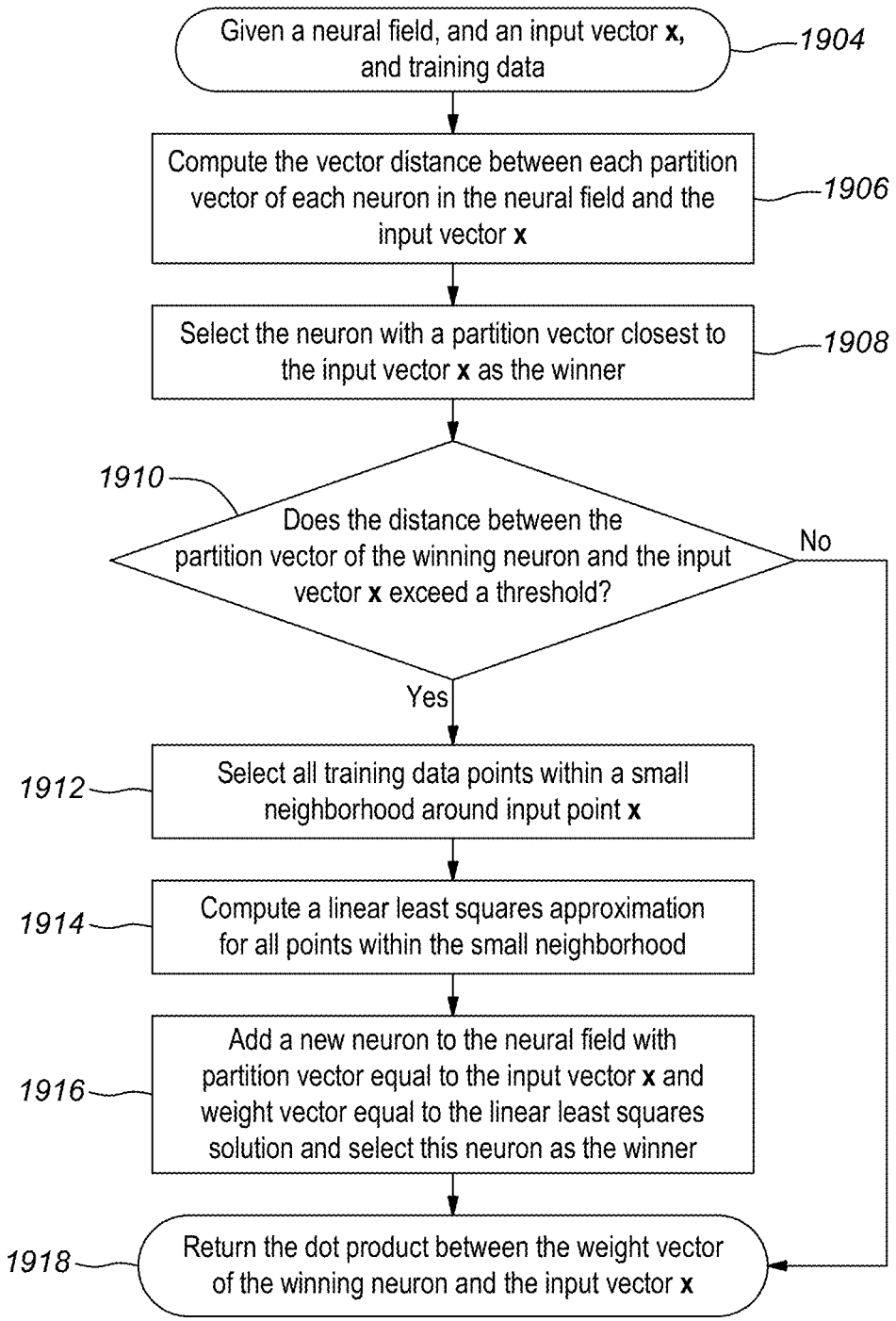
FIG. 19 depicts a flowchart implementation of methodology 13.4.2, according to embodiments of the present disclosure.

FIG. 19 depicts a flowchart implementation (steps 1904-1918) of methodology 13.4.2, according to embodiments of the present disclosure.

13.5. Summary

This section presented embodiments of neural fields, which represent major improvements relative to standard neural networks. In one or more embodiments, neural fields address many of the issues associated with neural networks by separating partitioning and approximation.

Neural fields may be trained very quickly and efficiently. Experiments have shown that neural fields achieve the same or better performance as neural networks with training times that are 100 times faster than a standard neural network. As a consequence, neural fields may be trained with commodity hardware and do not require special hardware or the significant data center resources required by standard neural networks. Furthermore, the speed of neural field learning allows frequent updates to world models represented via neural fields.

Another advantage of neural fields is that they can be trained with only positive examples. This allows using neural fields to learn whether the preconditions of a procedure are satisfied as discussed in Section 8.6. Yet, another advantage of neural fields is that the Deep Argmax can be efficiently computed as discussed in the next chapter.

14. Deep Argmax of a Neural Field

With neural networks, in one or more embodiments, the computation of the Deep Argmax has a worst-case running time that may be exponential with the number of neurons, i.e. given N neurons the running time is $O(2^N)$.

With neural fields, in one or more embodiments, the Deep Argmax has a worst-case running time that is quadratic with the number of neurons, i.e., $O(N^2)$. Thus, Deep Argmax can be efficiently computed with neural fields.

As with neural networks, in one or more embodiments, the Deep Argmax of a neural field is the input to the neural field that maximizes its output, i.e. deepArgmax(field)=argmax{$\underline{x}$}(field($\underline{x}$)). The computation of the Deep Argmax of a neural field is very similar to the computation of the Deep Argmax of a neural network. As with neural networks, the Deep Argmax of a neural field may be computed piecewise via linear programming In one or more embodiments, the Deep Argmax for the entire field is the result associated with the argmax with the maximum optimum.

In one or more embodiments, the linear programs used to find the Deep Argmax of a neural field are similar to the linear programs defined for neural networks with a few key differences.

14.1. Piecewise Argmax

In one or more embodiments, the argmax of a partition of a neural field may be computed in two major steps:

1. formulation of the linear program to find the argmax; and 2. solving the linear program.

Unlike with neural networks, in one or more embodiments, no effective weights are computed, since the output of a neural field is the direct output of one of its neurons.

14.1.1. Formulation of Linear Program

In one or more embodiments, the major steps for formulating the linear program are the same or similar to the steps required for neural networks:

1. transformation of variables to deal with negative values;

2. definition of coefficient vector $\underline{c}$;

3. definition of constraint matrix A; and 4. definition of boundary vector $\underline{b}$.

14.1.1.1. Transformation of Variables

In one or more embodiments, this step is the same or similar to the corresponding step with neural networks. Methodology 12.2.2.1 may be used to perform this step according to embodiments of the present disclosure.

14.1.1.2. Definition of Coefficient Vector

As with neural networks, in embodiments, the coefficient vector c is based on the weight vector $\underline{w}$ of the neurons. Unlike, with neural networks, the weight vector of each neuron may be directly used without computing any effective weights. As with neural networks, the bias weight does not change the argmax and may be ignored in the linear program.

In one or more embodiments, given a neural field and a partition index i, methodology 14.1.1.2 returns the coefficient vector of the linear program. field[i] refers to the i-th neuron in the neural field and field[i].$\underline{w}$ is the weight vector associated with this neuron.

Methodology 14.1.1.2:

```
coefficients(field, i) {
    c = transform(field[i].w[0 ... d−1])
    return c
}
```

14.1.1.3. Definition of Constraint Matrix

As with neural networks, in one or more embodiments, there are two kinds of linear constraints: exterior boundary constraints and interior boundary constraints. Exterior boundary constraints may be handled in the same manner as with neural networks. Methodology 12.2.2.3.1 may be used to compute the exterior boundary part of the constraint matrix.

In one or more embodiments, the interior boundary constraints of a neural field are different from the interior boundary constraints of neural networks. The interior boundaries of a neural field determine which neuron wins the competition among neurons to approximate a given input. In one or more embodiments, a neuron is activated if and only if an input vector $\underline{x}$ is within the interior boundaries of a neuron. This may be computed via the partition method defined by methodology 13.1.2.

Partitioning may be also formulated via interior boundary hyperplanes. Consider a neural field with two neurons i and j and corresponding partition point vectors $\underline{p}_i$ and $\underline{p}_j$. An input $\underline{x}$ may be assigned to neuron i if $\|\underline{x}-\underline{p}_i\|<\|\underline{x}-\underline{p}_j\|$, i.e., $\underline{x}$ is closer to $\underline{p}_i$ than $\underline{p}_j$. This is true for all points $\underline{x}$ that are on the positive side of a hyperplane halfway between neurons i and j. If $\underline{u}_{ij}$ is the normal vector of this hyperplane, i.e., $\underline{u}_{ij}$ is orthogonal to all vectors within the hyperplane, then a point $\underline{x}$ may be assigned to neuron i if $\underline{u}_{ij}*\underline{x}>0$. As with all weight vectors, $\underline{u}_{ij}$ includes a bias weight to allow hyperplanes that do not contain the origin and $\underline{x}$ may be augmented with a corresponding bias input of 1.

In other words, in one or more embodiments, the hyperplane defined by $\underline{u}_{ij}$ acts as a classifier. If this classifier has a positive result, neuron i wins the competition with neuron j.

In one or more embodiments, the vector $\underline{u}_{ij}$ is the difference between $\underline{p}_i$ and $\underline{p}_j$ pointing towards $\underline{p}_i$, i.e., $\underline{u}_{ij}=\underline{p}_i-\underline{p}_j$. In one or more embodiments, the hyperplane separating the points of neuron i from the points of neuron j is located halfway along this vector. The halfway point between the two neurons is given by the vector $\underline{q}_{ij}=\frac{1}{2}*(\underline{p}_i+\underline{p}_j)$. Since $\underline{q}_{ij}$ is on the hyperplane, it may be used to compute the hyperplane bias weight, which is $b_{ij}=\frac{1}{2}*(\underline{p}_i^2-\underline{p}_j^2)$. For instance, $\underline{x}$ is assigned to neuron i if $(\underline{p}_i-\underline{p}_j)*\underline{x}>\frac{1}{2}*(\underline{p}_i^2-\underline{p}_j^2)$.

A similar interior boundary hyperplane may be defined between neuron i and any other neuron j of the neural field. Jointly, all interior boundary hyperplanes of a single neuron form a convex polytope around the neuron. All input points inside the polytope are within the partition of neuron i.

In one or more embodiments, the interior boundary constraints of a neuron are specified via the hyperplanes defining the boundary of the neuron polytope. Since linear programming uses less-than-or-equal-to (i.e., ≤) as the standard inequality, in one or more embodiments, all equations above are inverted. For instance, in linear programming each boundary constraint becomes $-\underline{u}_{ij}*\underline{x}\leq 0$.

In one or more embodiments, there is one interior boundary constraint between each pair of neurons of the neural field. Thus, in a neural field of N neurons, there are N−1 interior boundary constraints for each neuron. Together, with the exterior boundary constraints, the constraint matrix A has 2d+N−1 many rows and 2d many columns, where d is the input dimension.

Methodology 14.1.1.3.1 computes the interior boundary part of the constraint matrix according to embodiments of the present disclosure. As before, field[i] refers to the i-th neuron in the neural field and field[i].$\underline{p}$ is the point vector of this neuron. The index k is the initial row index of the constraint matrix.

Methodology 14.1.1.3.1:

```
interiorBoundaryMatrix(A, field, i, k) {
    for every other neuron j (≠ i) in the field {
        A[k] = transform(field[j].p − field[i].p)
        k = k + 1
    }
}
```

As with neural networks, the rows of A may be reordered. Thus, other implementations may define constraints in an order other than the order presented above.

Methodology 14.1.1.3.2 combines methodologies 12.2.2.3.1 and 14.1.1.3.1 to compute the entire constraint matrix of the linear program according to embodiments of the present disclosure.

Methodology 14.1.1.3.2:

```
constraintMatrix(field, i) {
    A = new matrix with (2d + N − 1) rows and 2d columns
    clear all entries of A
    exteriorBoundaryMatrix(A)
    interiorBoundaryMatrix(A, field, i, 2d)
    return A
}
```

14.1.1.4. Definition of Boundary Vector

As with neural networks, in embodiments, row i of the boundary vector $\underline{b}$ corresponds to row i of the constraint matrix. Thus, the first 2d rows of $\underline{b}$ deal with exterior boundary constraints and the remaining (N−1) rows deal with interior boundary constraints between the N neurons. The exterior boundary part of the vector is the same or similar to the exterior boundary part computed for neural networks. Methodology 12.2.2.4.1 may be used to compute the exterior boundary part according to embodiments of the present disclosure.

In one or more embodiments, the entry for each interior boundary constraint is the negative bias of the corresponding interior boundary hyperplane. This may be computed by methodology 14.1.1.4.1. In one or more embodiments, i is the neuron index, and k is the initial row of the boundary vector.

Methodology 14.1.1.4.1:

```
interiorBoundaryVector(b, field, i, k) {
    for every other neuron j (≠ i) in the field {
        b[k] = ½ * (field[j].p² - field[i].p²)
    }
}
```

Methodology 14.1.1.4.2 combines methodologies 12.2.2.4.1 and 14.1.1.4.1 to compute the full boundary vector of the linear program according to embodiments of the present disclosure.

Methodology 14.1.1.4.2:

```
boundaryVector(field, i, constraints) {
    b = new vector with (2d + N - 1) rows
    exteriorBoundaryVector(b, constraints)
    interiorBoundaryVector(b, field, i, 2d)
    return b
}
```

14.1.2. Solving the Linear Program

The linear program defined by methodologies 14.1.1.2, 14.1.1.3.2, and 14.1.1.4.2 may be solved using a standard linear program solver. With neural fields, the solver should return a finite optimum. As with neural networks, in one or more embodiments, the transformation applied by methodology 12.2.2.1 should be reversed to make the result of the solver useful.

Methodology 14.1.2:

```
piecewiseArgmax(field, constraints, i) {
    linear_program = {
        c = coefficients(field, i)
        A = constraintMatrix(field, i)
        b = boundaryVector(field, i, constraints)
    }
    solve linear_program
    z = argmax returned by solver
    x = new vector with d rows
    for i = 0 ... d-1 {
        x[i] = z[i] - z[i+d]
    }
    return x
}
```

14.2. Deep Argmax of a Neural Field

Methodology 14.1.2 may be applied to every neuron of the neural field to compute the argmax for each partition of the neural field according to embodiments of the present disclosure. In one or more embodiments, the Deep Argmax for the entire neural field is the argmax vector that produces the maximum neural field output.

Note that unlike methodology 12.3, which computes the Deep Argmax of a neural network, the loop in this methodology is linear with the number of neural field neurons. Essentially, enumerating all relevant partitions is a lot faster with neural fields.

Methodology 14.2:

```
deepArgmax(field, constraints) {
    x* = new vector with d many rows
```
```
    y* = -∞
    for each neuron i in the neural field {
        x_p = piecewiseArgmax(field, constraints, i)
        y_p = field(x_p)
        if y_p > y* {
            y* = y_p
            x* = x_p
        }
    }
    return x*
}
```

Figure 20B:
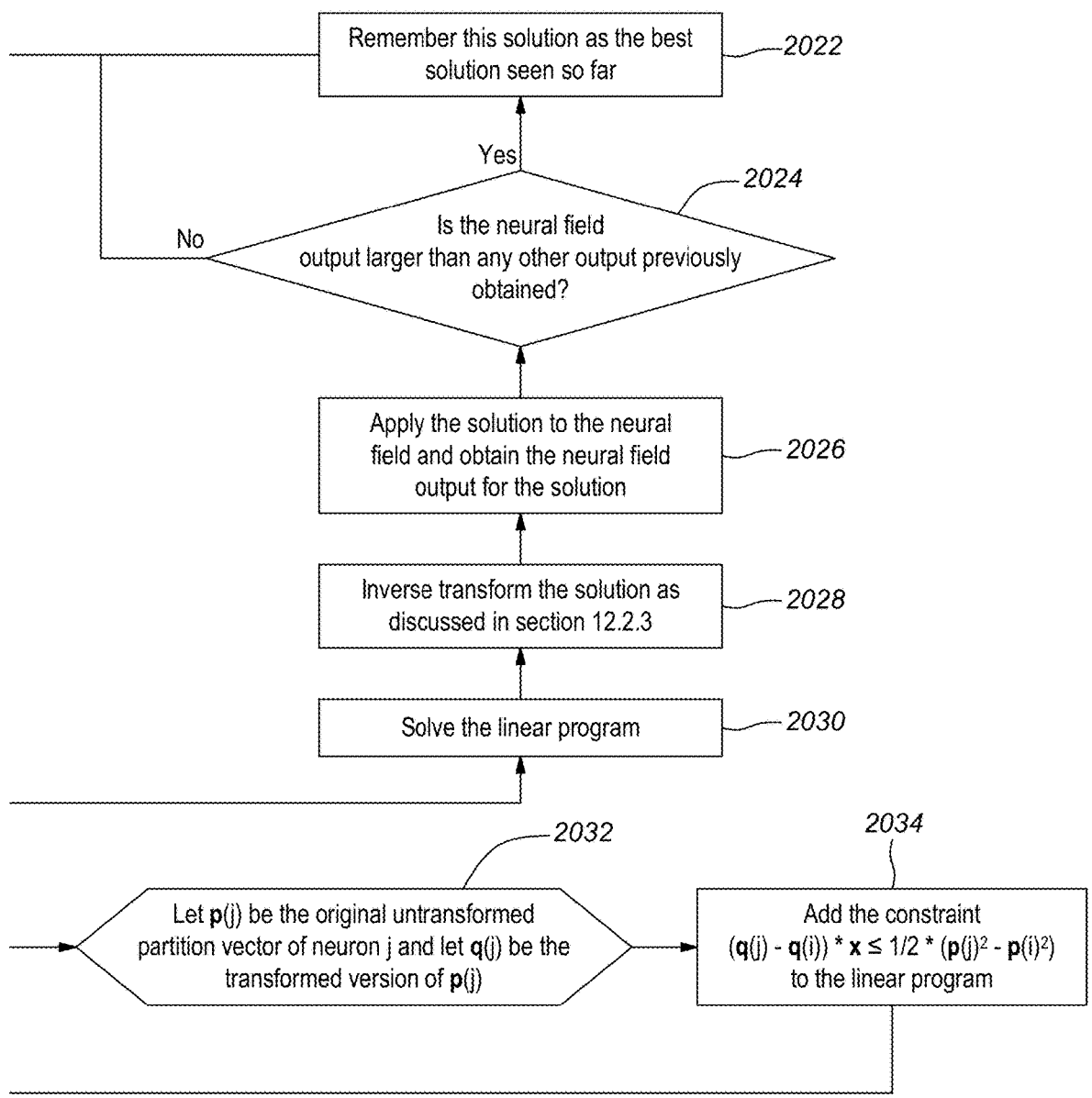

FIGS. 20A & 20B depict a flowchart implementation (steps 2004-2034) of methodology 14.2, according to embodiments of the present disclosure.

14.3. Piecewise Inverse

The computation of the Inverse function is also very similar to the methods used for neural networks discussed in Sections 12.4 and 12.5. In particular, as with neural networks, the inverse may be computed piecewise, by first computing the inverse for each partition and then returning the result with lowest error.

As with neural networks, in one or more embodiments, the linear program objective is updated to minimize the inverse error. The computation of the coefficient vector is the same or similar to the method used for neural networks. Thus, methodology 12.4.1 provides the coefficient vector according to embodiments of the present disclosure.

Furthermore, the exterior boundary constraints are the same or similar to the constraints for the Deep Argmax. Thus, methodologies 12.2.2.3.1 and 12.2.2.4.1 may be used to compute the exterior boundary parts of the constraints matrix A and the boundary vector $\underline{b}$, respectively.

The inverse function may be used to simultaneously invert multiple neural fields. The array of neural fields to be inverted may be specified by the fields[ ] parameter. fields.length is the length of the array.

Each neural field k may be associated with a piecewise partition index $\underline{p}$[k]. The partition index specifies the partition of the neural field to be inverted. The desired output for each field may be specified by $\underline{y}$[k].

Methodology 14.3.1 computes the constraint matrix according to embodiments of the present disclosure, and methodology 14.3.2 computes the boundary vector for the piecewise inverse according to embodiments of the present disclosure. d is the input dimension and $N_{total}$ is the total number neural of neurons in all neural fields. fields[k].size is the number of neurons in the k-th neural field.

Methodology 14.3.1:

```
inverseConstraintMatrix(fields[], p) {
    A = new matrix with (2d + N_total + fields.length)
    rows and (2d + 1) columns
    clear all entries of A
    exteriorBoundaryMatrix(A)
    i = 2d
    for k = 0 ... fields.length-1 {
        A[i, 0 ... 2d-1] = transform(-fields[k]
        [p[k]].w[0 ... d-1])
        A[i, 2d] = -1
        A[i+1, 0 ... 2d-1] = transform(fields
        [k][p[k]].w[0 ... d-1])
        A[i+1, 2d] = -1
        interiorBoundaryMatrix(A,
        fields[k], p[k], i+2)
```

```
    i = i + fields[k].size + 1
  }
  return A
}
```

Methodology 14.3.2:

```
inverseBoundaryVector(fields[],
p, y, constraints) {
  b = new vector with (2d + N_total +
    fields.length) rows
  exteriorBoundaryVector(b, constraints)
  i = 2d
  for k = 0 ... fields.length-1 {
    b[i] = fields[k][p[k]].w[d] - y[k]
    b[i+1] = y[k] - fields[k][p[k]].w[d]
    interiorBoundaryVector
      (b, fields[k], p[k], i+2)
    i = i + fields[i].size + 1
  }
  return b
}
```

Methodology 14.3.3 implements the piecewise inverse method for neural fields according to embodiments of the present disclosure.

Methodology 14.3.3:

```
piecewiseInverse(fields[],
p, y, constraints) {
  linear_program = {
    c = inverseCoefficients()
    A = inverseConstraintMatrix
      (fields[], p)
    b = inverseBoundaryVector
      (fields[], p, y, constraints)
  }
  solve linear_program
  z = argmax returned by solver
  x = new vector with d rows
  for i = 0 ... d-1 {
    x[i] = z[i] - z[i+d]
  }
  return x
}
```

14.4. Inverse Method for Neural Field

The inverse for neural fields is very similar to the inverse for neural networks shown in methodology 12.5. In one or more embodiments, the inverse for the entire neural field is the piecewise inverse that has the minimum error, i.e., the neural field output that is closest to the desired output.

Methodology 14.4 implements the inverse method for neural fields according to embodiments of the present disclosure. Embodiments of partition alignment are discussed in section 14.4.1.

Methodology 14.4:

```
inverse(fields[], y, constraints) {
  alignPartitions(fields[])
  x* = new vector with d many rows
  ε* = ∞
  for each non-empty joint combination
    of partitions over all neural fields (p) {
    x_p = piecewiseInverse(fields[],
      y, constraints, p)
    ε_p = 0
    for k = 0 ... fields.length-1 {
      ε_p = ε_p + | fields[k](x_p) - y[k] |
    }
    if ε_p < ε* {
      ε* = ε_p
      x* = x_p
    }
  }
  return x*
}
```

Figure 21:
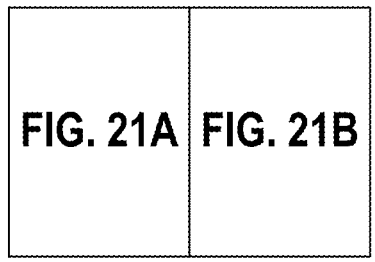
FIG. 21 depicts the relationship between FIG. 21A and FIG. 21B.
Figure 21A:
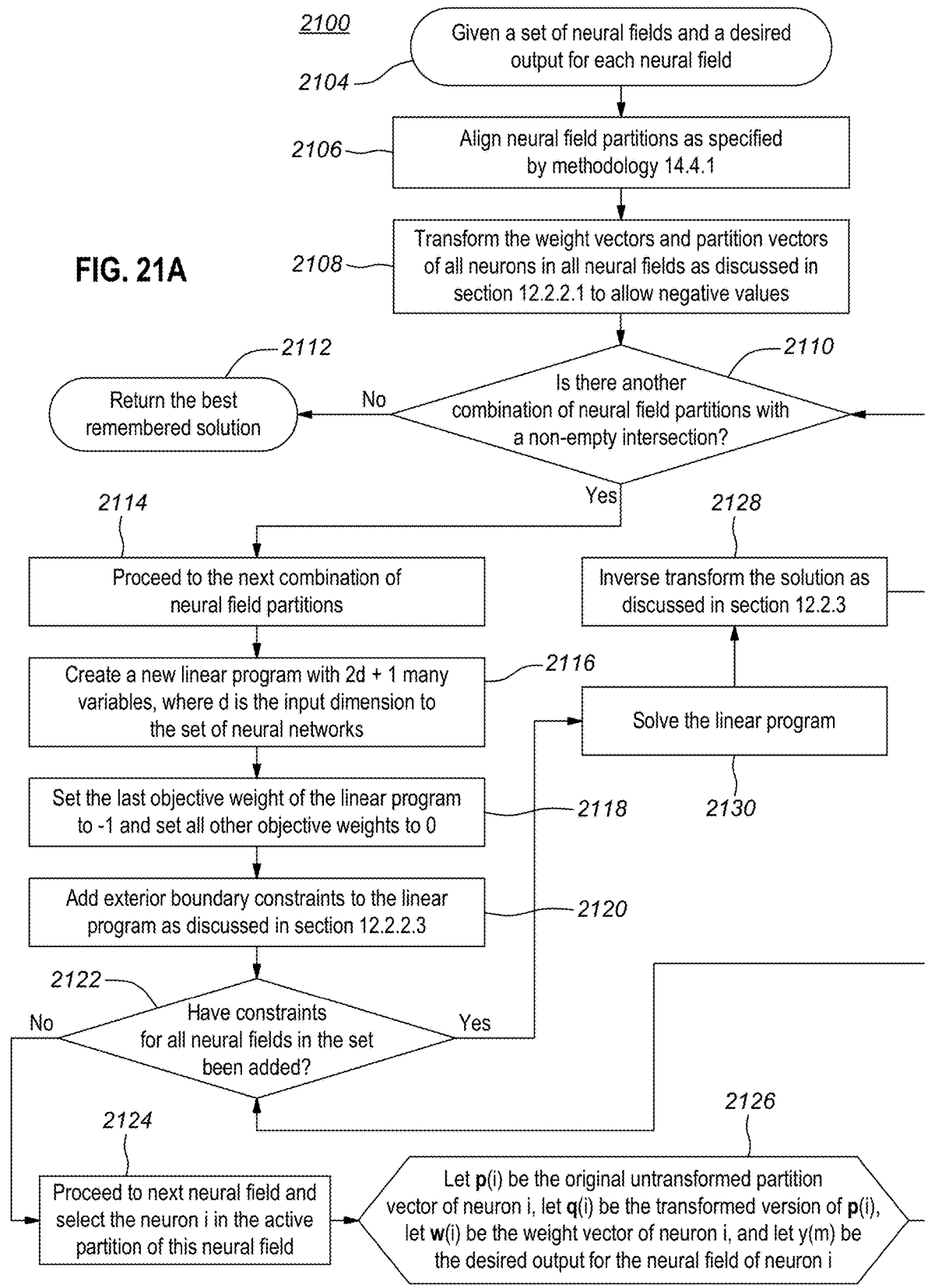
FIGS. 21A & 21B depict a flowchart implementation of methodology 14.4, according to embodiments of the present disclosure.
Figure 21B:
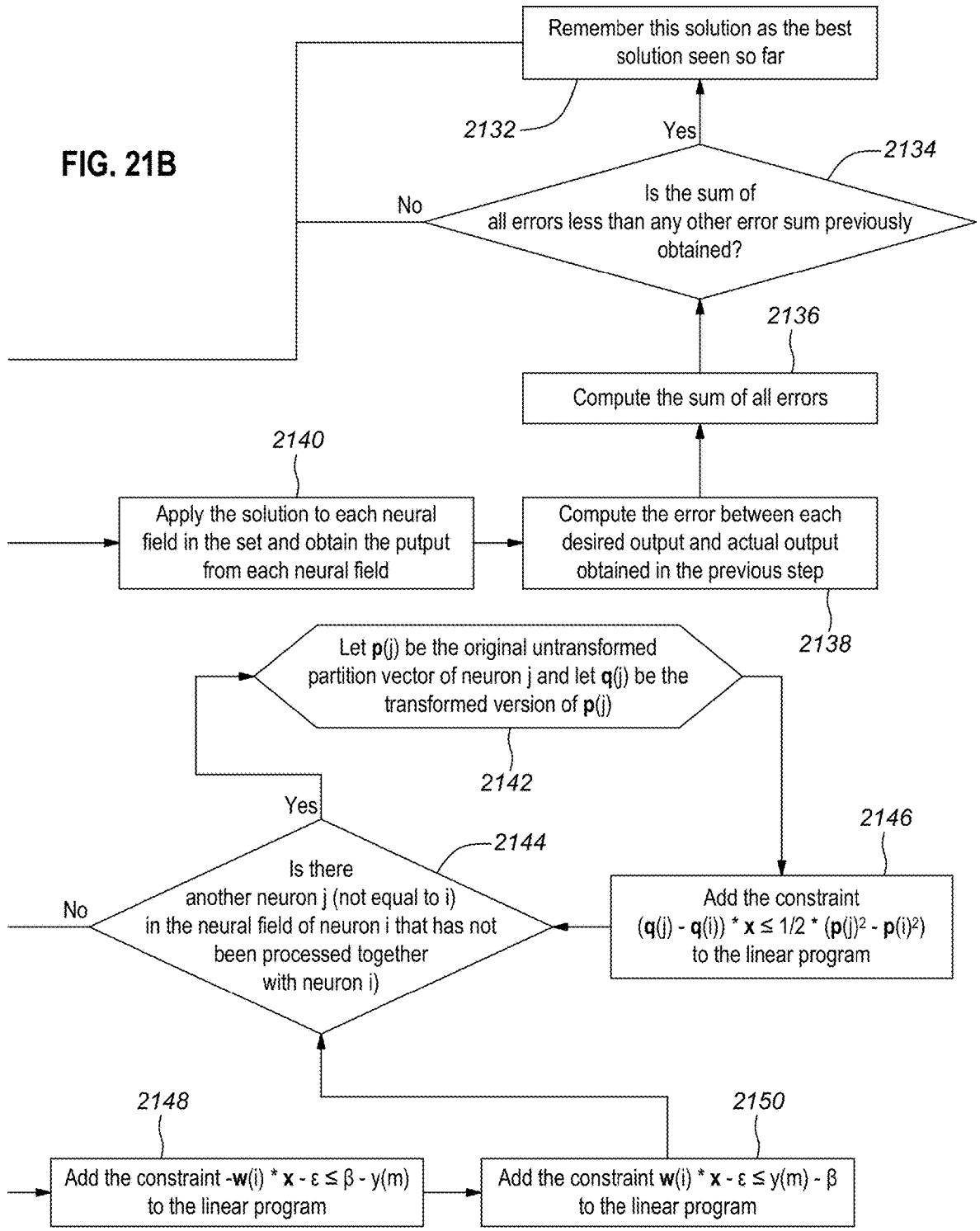

FIGS. 21A & 21B depict a flowchart implementation (steps 2104-2150) of methodology 14.4, according to embodiments of the present disclosure.

14.4.1. Partition Alignment

Computing the inverse of one neural field is very efficient. However, in embodiments, to invert multiple neural fields at the same time, methodology 14.4 computes the joint combination of partitions over all neural fields to be inverted. The number of partitions is equal to the number of neurons.

Without partition alignment, the total number of partition combinations is equal to the product of the number of neurons of all neural fields. If the largest neural field has N neurons and there are K neural fields, this methodology runs in time $O(N^K)$ without any alignment.

Note, that the methodology is exponential in the number of neural fields. In practice, K is a small number and not the main problem.

However, the problem is that N may be a large number. Thus, without partition alignment the inverse of multiple neural fields may be inefficient if the neural fields are very large.

However, with partition alignment, the running time drops to $O(N^2)$ and thus the methodology can be computed efficiently.

In one or more embodiments, partition alignment ensures that the intersection of any two partitions of all neural fields is either equal to one of the two partitions or the empty set. This ensures that many combinations are empty, which are skipped by the for loop in methodology 14.4.

In one or more embodiments, a simple way to achieve partition alignment is to use the partitioning of one of the neural fields for all neural fields. In such cases, all neural fields have the same partitioning. Methodology 13.3.1 may be used to update the weight vectors of all re-partitioned neural fields according to embodiments of the present disclosure. This methodology of alignment is shown in methodology 14.4.1. Methodology 14.4.1 assumes that the training data of each neural field can be accessed. $D_k$ is the training data matrix and $y_k$ is the expected value vector of the k-th neural field.

Methodology 14.4.1:

```
alignPartitions(fields[]) {
  big_field = neural field with the largest
    number of neurons in the array fields[]
  for k = 0 ... fields.length-1 {
    copy all neurons of big_field to fields[k]
    learnApproximation(fields[k], D_k, y_k)
  }
}
```

In general, other partition alignment methods are possible and may be employed.

15. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

Presented herein are benchmark results from five (5) benchmark test in which embodiments were tested against conventional machine learning approaches. As can be seen from the results, the tested embodiments not only had improved performance but also did so faster and while utilizing less computer resources.

15.1. General Introduction, Methodology, Error, And Training Time

Figure 22:
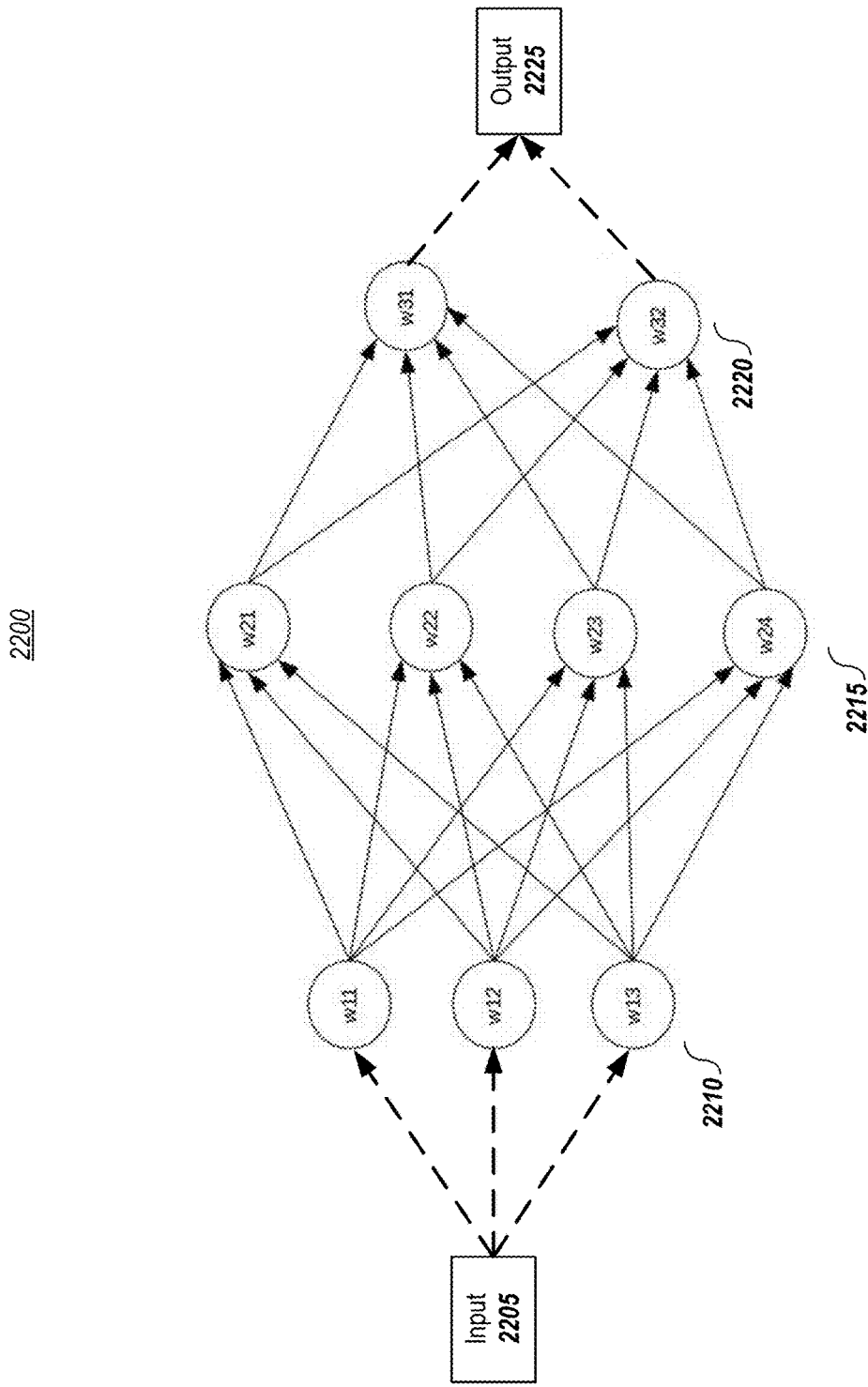
FIG. 22 depicts a standard three-layer neural network.

The comparison Deep Neural Network was a typical implementation of a standard neural network. FIG. 22 depicts a standard three-layer neural network. As depicted, an input 2205 is input into a first layer 2210. That layer's output is propagated through two other layers (layers 2215 and 2220) and an output 2225 from the final layer is achieved. For the tests herein, some effort was spent to pick reasonable hyperparameters for all learning methods. Each method was run multiple times with different initial conditions on the same data and the best result achieved by the method was reported.

Figure 23:
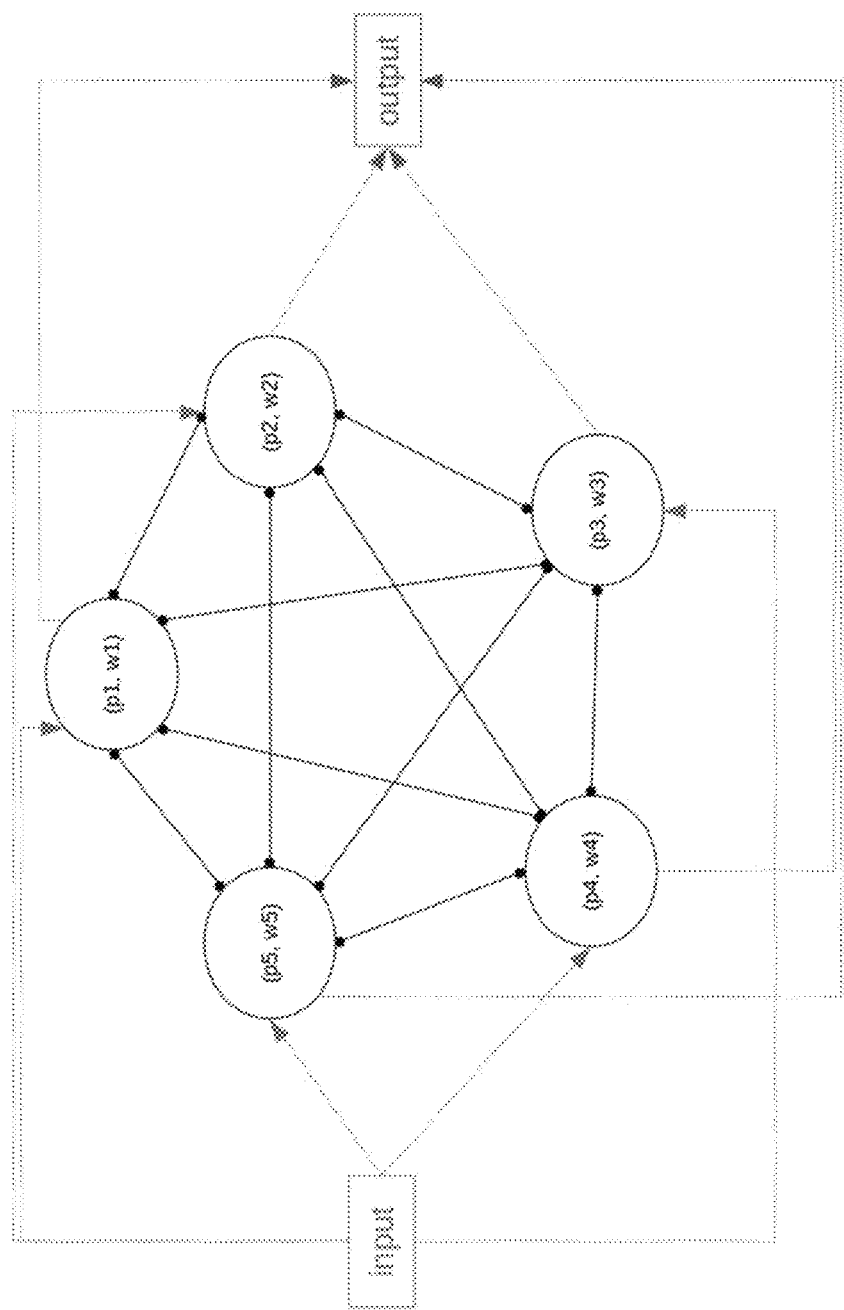
FIG. 23 shows an example neural field model, according to embodiments of the present invention.

By way of comparison, FIG. 23 shows an example neural field model 2300, according to embodiments of the present invention. As illustrated by the embodiment in FIG. 23, there are several structural differences between a neural network (like the one in FIG. 22) and a neural field model. For example, there are no layers and each neuron receives the input. Also, the output is obtained from one neuron, which is deemed to be active based upon its point value, p.

Figure 24A:
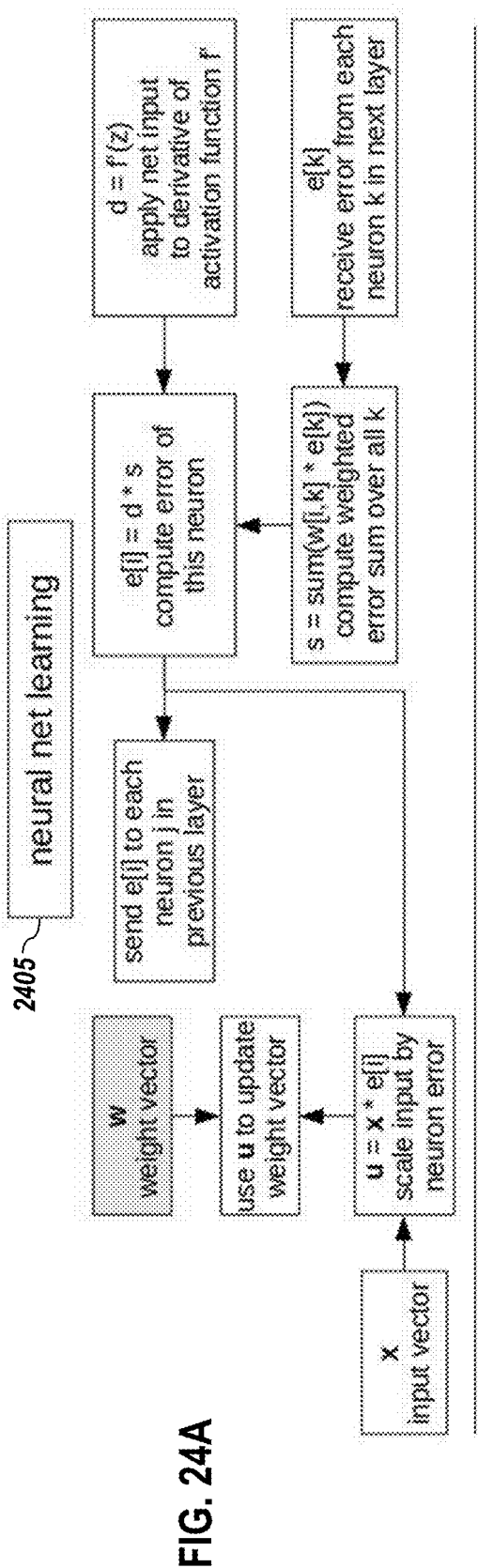
FIG. 24A depicts an example method for training a neural network model according to embodiments of the present disclosure.
Figure 24B:
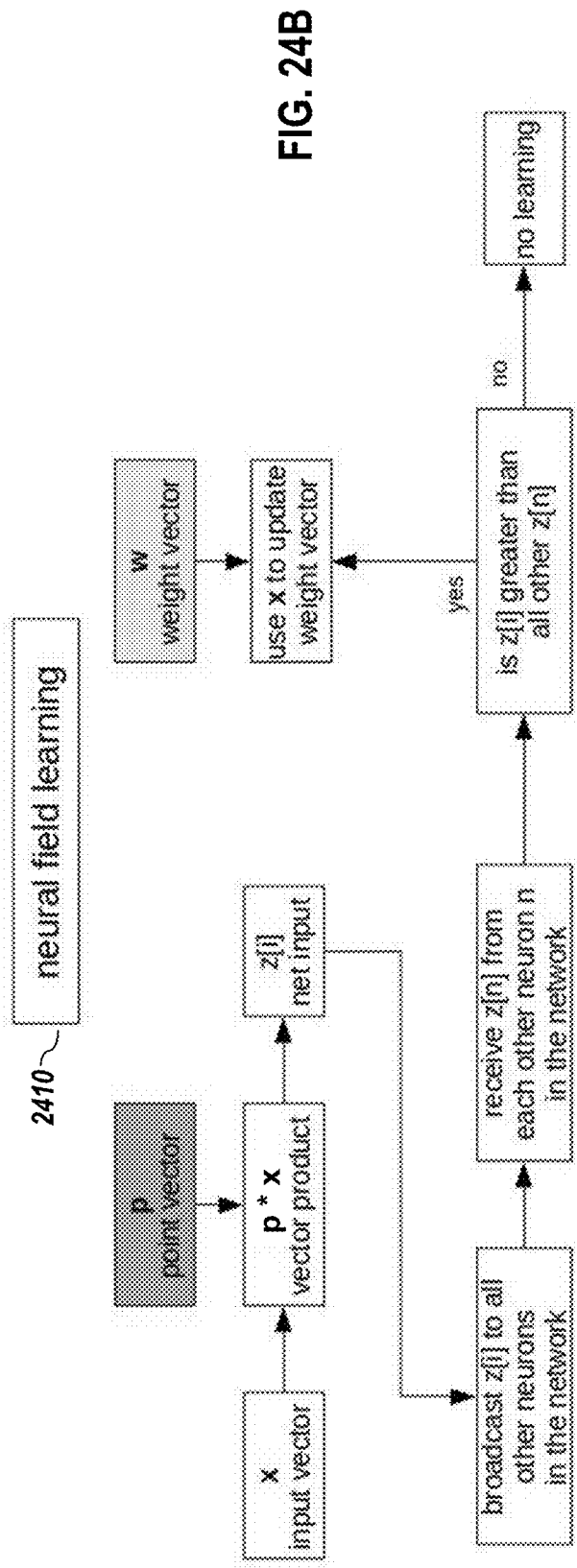
FIG. 24B depicts an example method for training a neural field model according to embodiments of the present disclosure.

FIG. 24A depicts an example method for training a neural network model according to embodiments of the present disclosure. FIG. 24B depicts an example method for training a neural field model according to embodiments of the present disclosure. Comparison of the methods highlights some of the difference between the methodologies. As can be seen in the depicted embodiment 2410 of FIG. 24B, the output for the neural field model embodiment is determined by the neuron that produced the largest z value for the given input. In supervised learning, the output is compared to the ground truth value to update the parameters for the neural field model.

Also by way of comparison, FIG. 25A depicts an example method that a neuron in a neural network model undergoes, according to embodiments of the present disclosure, and FIG. 25B depicts an example method that a neuron in a neural field model undergoes, according to embodiments of the present disclosure. Comparison of the methods once again highlights some of the difference between the methodologies. Note that, unlike the neuron in the neural network that only has a weight value 2515, a neuron in a neural field has both a point value 2520 and a weight value 2525. As can be seen in the depicted embodiment 2505 of FIG. 25A, the output of the neuron undergoes some activation function, in part, because it does not directly represent a linear representation of data. In contrast, the neuron in a neural field does not require any such activation, thereby reducing the number of model elements and calculations used in modeling. Besides not requiring use of an activation function, there are several other beneficial factors to neural fields, including but not limited to: (1) no derivative computation, (2) can be trained with only positive samples, (3) operated at a winner-takes-all approach based on input partition, (4) training has only forward pass, and (5) training has separate partitioning and approximation steps.

For the tests, prediction error is reported for both training and test data. All methods were trained with the same training data and tested with the same test data. Prediction error was measured as the average absolute difference between the predicted value and the actual function value. If the data was a time series (e.g., forecasting), the input vector was extended with recent values of the dependent variable. For example, for a forecast, the input vector at time t includes data for time t−1, t−2, t−3, . . . , t−k in addition to other features.

Some benchmarks include a forecast error in addition to a prediction error. A forecast test recursively applied the output of the method for a number of time steps. For example, starting at time t, with actual initial value x(t), the methods predicted x(t+1). Then, the predicted x(t+1) was recursively used to predict x(t+2), which is used to predict x(t+3), and so on. This may be unlike some simple prediction tests that always use an actual input vector (i.e., the predicted value is discarded after each test). A forecast test requires the model being trained to accurately learn the temporal evolution of the data.

Similar to prediction errors, the reported forecast errors were the average absolute difference between predicted values and actual function values. A main difference was that the output of the model or method was used recursively as the next input. A small early prediction error can cause a large forecasting error, since the error propagates during each step and may be amplified with further prediction errors. Thus, forecast testing tends to be a very challenging test.

Average training time is reported in milliseconds and represents an average over many runs. All methods were compiled with full compiler optimizations. All methodologies were run on a single thread.

15.2. Learning of Polynomial with Simulated Data

A test was performed to verify correct learning of a polynomial function. In the tests, the polynomial function was $f(x_1, x_2, x_3) = x_1^2 + x_2^2 + x_3^2 - x_1 * x_2 * x_3$. The non-linear nature of the function makes it harder for a standard neural network to learn. The tested embodiment (referred to for convenience in the chart and table as "System AI model," "System AI," or "System AI tested embodiment") was designed to learn polynomials quickly and was expected to perform well on this test. The following table (Table 15.1) summarizes the results.

TABLE 15.1

Polynomial Results

| Methodology | Train Error | Test Error | Train Time (ms) |
|---|---|---|---|
| Random | 408.03 | 339.13 | — |
| K-Nearest Neighbor | 45.8 | 49.11 | — |
| Deep Neural Network | 5.14 | 8.58 | 1032 |
| System AI Tested Embodiment | 0.0 | 0.0 | 1 |

"Random" referred to a method that randomly guesses the function value. "K-Nearest Neighbor" was a standard KNN method and was implemented with K=10. The Random and K-Nearest Neighbor methods did not involve training, so no time is provided for that metric. As expected, the polynomial was learned perfectly by the tested embodiment (i.e., no error). Also, it is important to note that the training time was almost instant; the deep neural network model took over 1000 times longer than the test embodiment and had much higher error. Thus, this test shows that not only are embodiments herein better as performing the task of modeling but that they are much more resource efficient (time, processing power, etc.) in terms during training 15.3. Forecasting/Predicting with Simulated Data Forecasting was tested with simulated data that simulates any typical forecasting task. The simulated data had the following components: (1) a long-term trend; (2) periodicity; (3) dependence on current features; (4) effect of special events; and (5) noise. The long-term trend was generated with a logistic function $$\left(\text{i.e., } f = \frac{1}{(1 + e^{-t})}\right).$$

The trend may be thought to simulate a long-term growth. Periodicity was generated via three sine waves with different frequencies and phases. This simulated periodic low, medium, and high frequency fluctuations. The three sine waves were scaled and added to the trend. A weighted value of random features was added. Features may have a positive or negative impact on the function value. Events represent the occurrence of special situations or anomalies Events may be Boolean features, which may be set to 1 if the event was occurring. Events may also be generated with a fixed event probability. If the event occurred, it may increase or decrease the function value at the time of the event.

The input feature vector was extended with the recent time series data (i.e. prediction results for times t−1, t−2, t−3, . . . ). Random noise was added to all input features.

Figure 26:
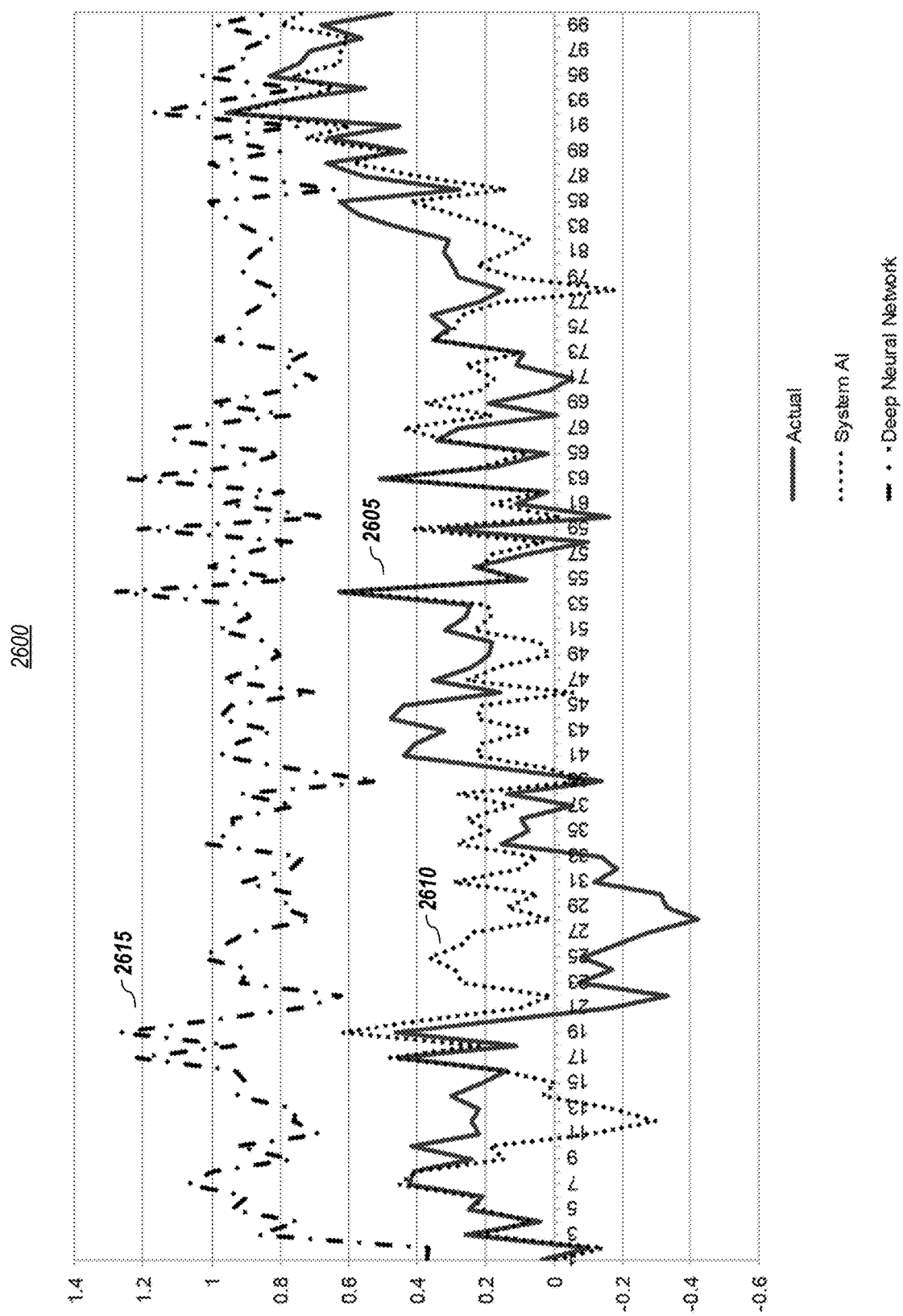
FIG. 26 graphically depicts the output results of a tested embodiment and a deep neural network relative to the ground truth data, according to embodiments of the present invention.

FIG. 26 graphically depicts the output results of the tested embodiment (2610) and the DNN (2615) relative to the ground truth data (2605), according to embodiments of the present invention. This graph 2600 shows the output of one forecast test run. The solid curve 2605 is the actual function generated by the simulator. The dotted curve 2610 is the prediction from the System AI tested embodiment, and the dash-dot line 2615 is the Deep Neural Network prediction. In the forecast test, the predictors were recursively fed their own predictions. For instance, the predictor has to predict the entire time series using its own past prediction with no access to actual function values. Feature and event data were still provided at each time step. The results show that the test embodiment was much better a predicting than the DNN model. Additional results data is provided in Table 15.2, below.

TABLE 15.2

Forecast/Prediction Results

| | Train Error | Test Error | Train Forecast Error | Test Forecast Error | Train Time (ms) |
|---|---|---|---|---|---|
| Random | 0.63 | 0.61 | 0.67 | 0.68 | |
| DNN | 0.18 | 0.19 | 0.79 | 0.79 | 664 |
| System AI Tested Embodiment | 0.04 | 0.05 | 0.24 | 0.26 | 7 |

The benchmark results represent the average of 20 different simulations. In this benchmark, accuracy was improved by about 380% over the deep neural network (DNN) model. Once again, the resource efficiency of the tested embodiment is clearly evident; training speed relative the DNN model was more than 94 times (9400%) faster, all while having better results.

15.4. Forecasting/Predicting with Real Data

Data sets of non-simulated data were used, which represented resource usage over in a time series stretching over about a two-year period. Various event features were also included. The predictors were trained using about half the data set and were tested on the other half. Thus, the forecasting/predicting in this benchmark required a forecast given historic data from other similar groups. The benchmark results represent the average. Some minor preprocessing was performed; such as, for example, normalizing or cleaning the input for prediction/forecasting. Results data is provided in Table 15.3, below.

TABLE 15.3

Results

| | Train Error | Test Error | Test Forecast Error | Train Time (ms) |
|---|---|---|---|---|
| Random | 35692 | 36123 | 36748 | |
| DNN | 4124 | 4304 | 13725 | 2863 |
| System AI Tested Embodiment | 2390 | 2356 | 17109 | 32 |

This test used input optimized for prediction. Both the DNN model and the tested embodiment were significantly better than the random approach. The test prediction error for the tested embodiment was better by about 180% over the DNN model. While the DNN model performed somewhat better on forecast in this test because it tends to predict the average, while the test embodiment tried to be more aggressive. As is shown in the next set of results, if a different approach is used a tested embodiment can also outperform a DNN model. It should also be noted that the tested embodiment was about 89 times faster (8900%) in training, and if slightly more time was spent training the tested embodiment (but still substantially less than the DNN model), the forecast error would likely be reduced and may even be better than the DNN model. Additional test results are provided in Table 15.4, below.

TABLE 15.4

Results

| | Train Error | Test Error | Train Forecast Error | Test Forecast Error | Train Time (ms) |
|---|---|---|---|---|---|
| Random | 35658 | 36246 | 36264 | 37168 | |
| DNN | 10071 | 9378 | 20035 | 19277 | 2856 |
| System AI Tested Embodiment | 8944 | 9743 | 12910 | 14828 | 32 |

This test used input optimized for forecasting/prediction. While prediction on test data for this tested embodiment was slightly worse than the DNN, its forecast performance was about 30% better than the DNN model. Again, the tested embodiment's training speed was still about 89 times faster than for the DNN model.

Another data set of actual data related to resource demand was also used to compare the various approaches. The task was to predict daily or hourly resource usage. The data set contains some event information. Training was done on the first half of the data set and testing is done with the second half.

Figure 27:
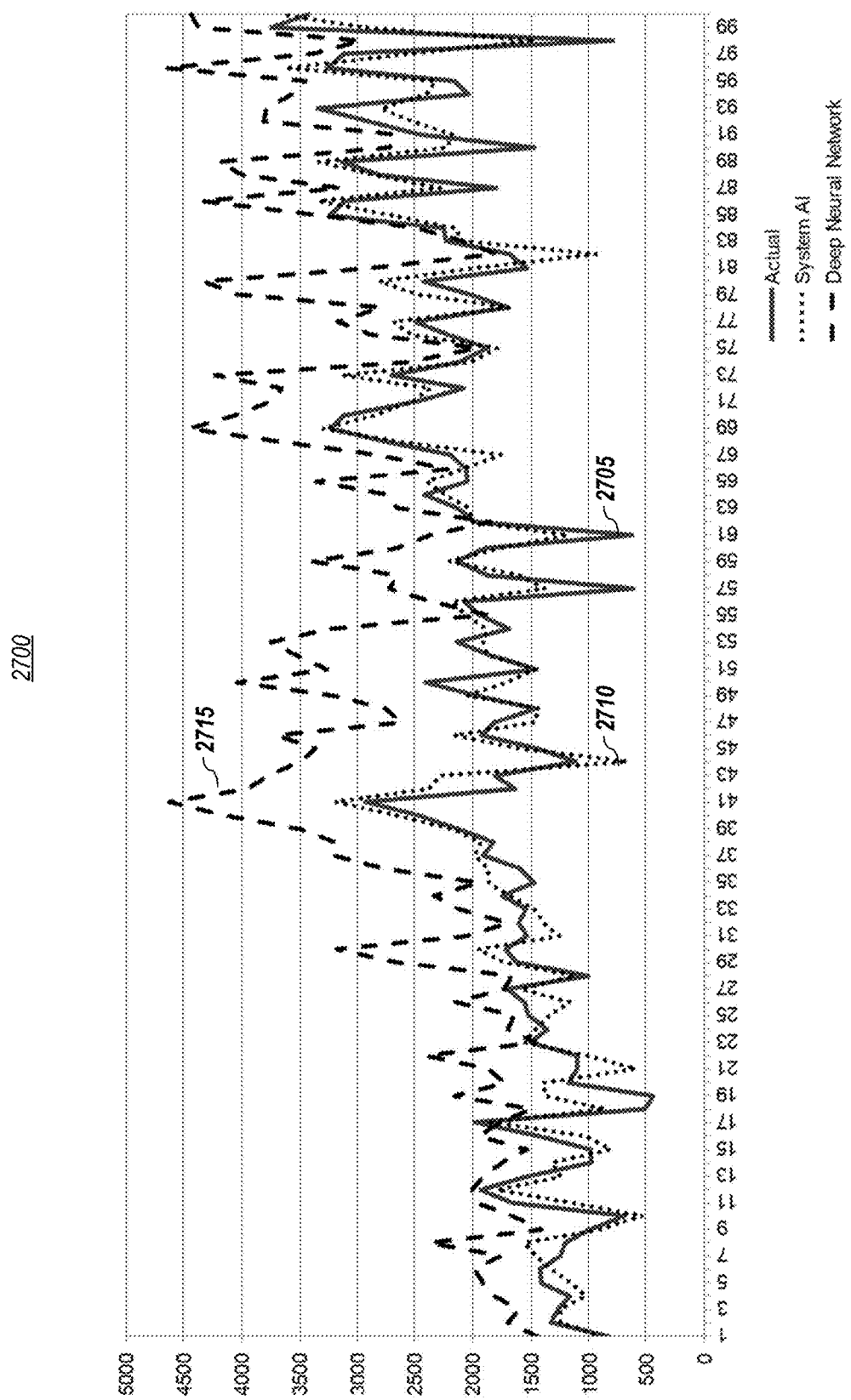
FIG. 27 graphically depicts the output results of a tested embodiment and a deep neural network relative to the ground truth data, according to embodiments of the present invention.

FIG. 27 graphically depicts the output results of the tested embodiment (2710) and the DNN (2715) relative to the ground truth data (2705), according to embodiments of the present invention. The solid curve 2705 is the actual data. The dotted curve 2710 is the prediction from the System AI tested embodiment, and the dashed line 2715 is the Deep Neural Network prediction.

Test results at a daily forecast rate are provided in Table 15.5, below.

TABLE 15.5

| | Results | | | | |
|---|---|---|---|---|---|
| | Train Error | Test Error | Train Forecast Error | Test Forecast Error | Train Time (ms) |
| Random | 2388 | 2566 | 2985 | 1998 | |
| DNN | 315 | 1595 | 259 | 1487 | 97 |
| System AI Tested Embodiment | 338 | 1095 | 295 | 1059 | 1 |

The tested embodiment's prediction was about 45% better than the DNN model, and forecasting was about 40% better. Note that the tested embodiment generalizes better than the other approached and had a better test performance even though its train performance is slightly worse. The training time difference is again remarkable. Where the tested embodiment trained almost instantly, the DNN model took almost 100 times longer.

Test results at an hourly forecast rate are provided in Table 15.6, below.

TABLE 15.6

| | Results | | | | |
|---|---|---|---|---|---|
| | Train Error | Test Error | Train Forecast Error | Test Forecast Error | Train Time (ms) |
| Random | 382 | 350 | 401 | 437 | |
| DNN | 36 | 85 | 102 | 117 | 2306 |
| System AI Tested Embodiment | 33 | 56 | 63 | 117 | 896 |

The tested embodiment's prediction was about 51% better than the DNN model, and forecasting was comparable. Note, however, that the resource usage for training was dramatically less for the tested embodiment as it was about 250% faster than the DNN model.

A final data set comprised data that included up to 122 features. The task was to predict the number of occurrences of certain event in a location given the features of a location. The results are provided in Table 15.7, below.

TABLE 15.7

| | Results | | |
|---|---|---|---|
| | Train Error | Test Error | Train Time (ms) |
| Random | 0.38 | 0.363 | |
| DNN | 0.063 | 0.107 | 698 |
| System AI Tested Embodiment | 0.094 | 0.098 | 17 |

The tested embodiment's performance was about 9% better than the DNN model. The tested embodiment generalized better than the DNN. Note, again, that the training time was dramatically less. The training speed was about 41 times faster.

16. General Summary

This general summary is provided to highlight some, but not all, of the innovative contributions disclosed in this patent document; accordingly, this generally summary section shall not be used to limit the scope of the present disclosure.

This patent document presents several methods to learn a model for various purposes, including but not limited to for prediction and for planning of processes. Among the contributions are the various uses of neural networks, reinforcement learning, and/or linear programming to learn representations and models—even for complex systems and methods. Furthermore, the introduction of neural field embodiments and methods to compute a Deep Argmax, as well to invert neural networks and neural fields with linear programming provide the ability to create models and train models that are accurate and very resource efficient—using less memory, less computations, less time, and, as a result, less energy. The resource efficiencies herein also allow such models to be trained and/or deployed more widely. For example, in situations were computation resources are limited, such as embedded device or other devices with limited computation, power, memory, or some combination thereof, the current embodiments allow for both the ability to train and/or deploy models using such devices that previously would have been too limited to be used.

17. Computing System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 28:
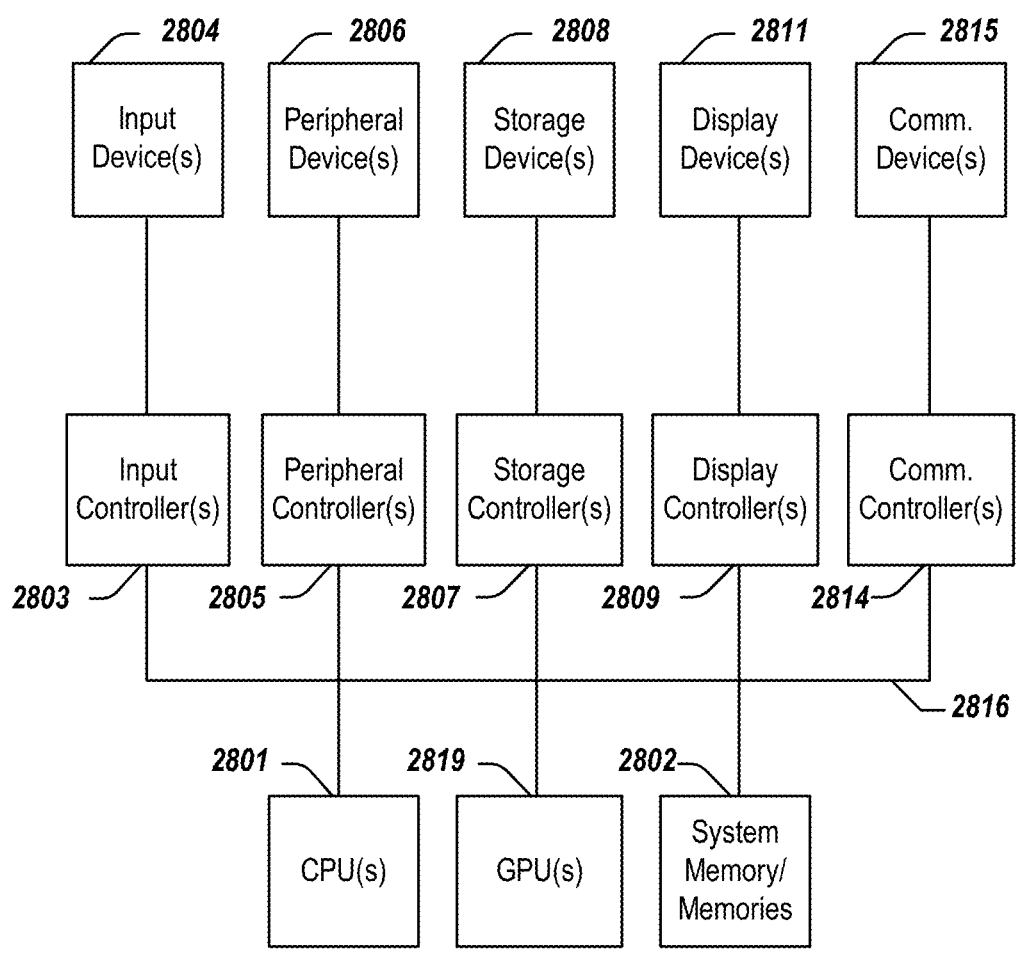
FIG. 28 depicts a simplified block diagram of a computing device/information handling system, in accordance with embodiments of the present document.

FIG. 28 depicts a simplified block diagram of a computing device/information handling system (or computing system) according to embodiments of the present disclosure. It will be understood that the functionalities shown for system 2800 may operate to support various embodiments of a computing system—although it shall be understood that a computing system may be differently configured and include different components, including having fewer or more components as depicted in FIG. 28.

As illustrated in FIG. 28, the computing system 2800 includes one or more central processing units (CPU) 2801 that provides computing resources and controls the computer. CPU 2801 may be implemented with a microprocessor or the like, and may also include one or more graphics processing units (GPU) 2819 and/or a floating-point coprocessor for mathematical computations. System 2800 may also include a system memory 2802, which may be in the form of random-access memory (RAM), read-only memory (ROM), or both.

A number of controllers and peripheral devices may also be provided, as shown in FIG. 28. An input controller 2803 represents an interface to various input device(s) 2804, such as a keyboard, mouse, touchscreen, and/or stylus. The computing system 2800 may also include a storage controller 2807 for interfacing with one or more storage devices 2808 each of which includes a storage medium such as magnetic tape or disk, or an optical medium that might be used to record programs of instructions for operating systems, utilities, and applications, which may include embodiments of programs that implement various aspects of the present disclosure. Storage device(s) 2808 may also be used to store processed data or data to be processed in accordance with the disclosure. The system 2800 may also include a display controller 2809 for providing an interface to a display device 2811, which may be a cathode ray tube (CRT), a thin film transistor (TFT) display, organic light-emitting diode, electroluminescent panel, plasma panel, or other type of display. The computing system 2800 may also include one or more peripheral controllers or interfaces 2805 for one or more peripherals 2806. Examples of peripherals may include one or more printers, scanners, input devices, output devices, sensors, and the like. A communications controller 2814 may interface with one or more communication devices 2815, which enables the system 2800 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 2816, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for generating a plan, the method comprising:
    modelling a policy as a directed graph, in which each vertex of the directed graph represents a procedure and each edge of the directed graph represents at least one dependency between connected procedures;
    for each procedure of at least some of the procedures of the directed graph, using a neural model, a set of feature values, and one or more parameters for the procedure to predict an outcome from execution of the procedure; and learning a plan using the policy by performing the steps comprising:
using information obtain from the directed graph related to the policy to obtain a set of procedures and an order for the procedures of the set of procedures;
setting one or more values for a set of constraints;
selecting, according to the order, a procedure from the set of procedures that has not been processed;
partitioning a neural model associated with the selected procedure into a piecewise linear form;
using linear programming on the piecewise linear form of the neural model associated with the selected procedure and at least one value from the set of constraints to obtain a set of model constraints for the neural model that achieves an acceptable outcome;
updating the set of constraints given the set of model constraints;
responsive to the selected procedure not being a last procedure in the order of the set of procedures, returning to the step of selecting, according to the order, a procedure from the set of procedures that has not been processed; and
responsive to the selected procedure being the last procedure in the order of the set of procedures, outputting the set of constraints for the plan.

2. The computer-implemented method of claim 1 wherein the step of updating the set of constraints given the set of model constraints comprises:
adding one or more constraints to the set of constraints;
removing one or more constraints to the set of constraints;
limiting one or more values for one or more constraints to the set of constraints; or
a combination of one or more of the above.

3. The computer-implemented method of claim 1 wherein a value for a constraint from the set of constraints comprises a range of parameter values for the neural model that achieves an acceptable outcome.

4. The computer-implemented method of claim 1 further comprising:
responsive to the linear programming on the piecewise linear form of the neural model associated with the selected procedure failing to find a value for at least one model constraint that is acceptable given the at least one value from the set of constraints, selecting a value for the at least one model constraint.

5. The computer-implemented method of claim 1 wherein the neural model is a neural field, which comprises a neural network of neurons, in which each neuron of a set of neurons in the neural network is associated with a first parameter set for model partitioning and a second parameter set for model approximation.

6. The computer-implemented method of claim 5 wherein the first parameter set for model partitioning are used to partition the neural field model.

7. The computer-implemented method of claim 1 wherein the set of constraints for the plan that are output comprises a constraint parameter that is a range, and a valid value within the range is selected for the plan.

8. A system comprising:
one or more processors; and
a non-transitory processor-readable medium or media comprising one or more sets of instructions which, when executed by at least one of the one or more processors, causes steps to be performed comprising:
modelling a policy as a directed graph, in which each vertex of the directed graph represents a procedure and each edge of the directed graph represents at least one dependency between connected procedures;
for each procedure of at least some of the procedures of the directed graph, using a neural model, a set of feature values, and one or more parameters for the procedure to predict an outcome from execution of the procedure; and
learning a plan using the policy by performing the steps comprising:
using information obtain from the directed graph related to the policy to obtain a set of procedures and an order for the procedures of the set of procedures;
setting one or more values for a set of constraints;
selecting, according to the order, a procedure from the set of procedures that has not been processed;
partitioning a neural model associated with the selected procedure into a piecewise linear form;
using linear programming on the piecewise linear form of the neural model associated with the selected procedure and at least one value from the set of constraints to obtain a set of model constraints for the neural model that achieves an acceptable outcome;
updating the set of constraints given the set of model constraints;
responsive to the selected procedure not being a last procedure in the order of the set of procedures, returning to the step of selecting, according to the order, a procedure from the set of procedures that has not been processed; and
responsive to the selected procedure being the last procedure in the order of the set of procedures, outputting the set of constraints for the plan.

9. The system of claim 8 wherein the step of updating the set of constraints given the set of model constraints comprises:
adding one or more constraints to the set of constraints;
removing one or more constraints to the set of constraints;
limiting one or more values for one or more constraints to the set of constraints; or
a combination of one or more of the above.

10. The system of claim 8 wherein a value for a constraint from the set of constraints comprises a range of parameter values for the neural model that achieves an acceptable outcome.

11. The system of claim 8 wherein the non-transitory processor-readable medium or media further comprises one or more sets of instructions which, when executed by at least one of the one or more processors, causes steps to be performed comprising:
responsive to the linear programming on the piecewise linear form of the neural model associated with the selected procedure failing to find a value for at least one model constraint that is acceptable given the at least one value from the set of constraints, selecting a value for the at least one model constraint.

12. The system of claim 8 wherein the neural model is a neural field, which comprises a neural network of neurons, in which each neuron of a set of neurons in the neural network is associated with a first parameter set for model partitioning and a second parameter set for model approximation.

13. The system of claim 12 wherein the first parameter set for model partitioning are used to partition the neural field model.

14. The system of claim 8 wherein the set of constraints for the plan that are output comprises a constraint parameter that is a range, and a valid value within the range is selected for the plan.

15. A non-transitory processor-readable medium or media comprising one or more sequences of instructions which, when executed by at least one processor, causes steps to be performed comprising:
    modelling a policy as a directed graph, in which each vertex of the directed graph represents a procedure and each edge of the directed graph represents at least one dependency between connected procedures;
    for each procedure of at least some of the procedures of the directed graph, using a neural model, a set of feature values, and one or more parameters for the procedure to predict an outcome from execution of the procedure; and
    learning a plan using the policy by performing the steps comprising:
        using information obtain from the directed graph related to the policy to obtain a set of procedures and an order for the procedures of the set of procedures;
        setting one or more values for a set of constraints;
        selecting, according to the order, a procedure from the set of procedures that has not been processed;
        partitioning a neural model associated with the selected procedure into a piecewise linear form;
        using linear programming on the piecewise linear form of the neural model associated with the selected procedure and at least one value from the set of constraints to obtain a set of model constraints for the neural model that achieves an acceptable outcome;
        updating the set of constraints given the set of model constraints;
        responsive to the selected procedure not being a last procedure in the order of the set of procedures, returning to the step of selecting, according to the order, a procedure from the set of procedures that has not been processed; and
        responsive to the selected procedure being the last procedure in the order of the set of procedures, outputting the set of constraints for the plan.

16. The non-transitory processor-readable medium or media of claim 15 wherein the step of updating the set of constraints given the set of model constraints comprises:
    adding one or more constraints to the set of constraints;
    removing one or more constraints to the set of constraints;
    limiting one or more values for one or more constraints to the set of constraints; or
    a combination of one or more of the above.

17. The non-transitory processor-readable medium or media of claim 15 wherein a value for a constraint from the set of constraints comprises a range of parameter values for the neural model that achieves an acceptable outcome.

18. The non-transitory processor-readable medium or media of claim 15 further comprising one or more sets of instructions which, when executed by at least one processor, causes steps to be performed comprising:
    responsive to the linear programming on the piecewise linear form of the neural model associated with the selected procedure failing to find a value for at least one model constraint that is acceptable given the at least one value from the set of constraints, selecting a value for the at least one model constraint.

19. The non-transitory processor-readable medium or media of claim 15 wherein the neural model is a neural field, which comprises a neural network of neurons, in which each neuron of a set of neurons in the neural network is associated with a first parameter set for model partitioning and a second parameter set for model approximation.

20. The non-transitory processor-readable medium or media of claim 19 wherein the first parameter set for model partitioning are used to partition the neural field model.

* * * * *